United States Patent
Sano

Patent Number: 5,944,393
Date of Patent: Aug. 31, 1999

[54] TURN CONTROL APPARATUS FOR A VEHICLE

[75] Inventor: Yoshiaki Sano, Tokyo, Japan

[73] Assignee: Mitsubishi Jidosha Kogyo Kabushiki Kaisha, Tokyo, Japan

[21] Appl. No.: 08/765,926

[22] PCT Filed: May 15, 1996

[86] PCT No.: PCT/JP96/01286

§ 371 Date: Jan. 16, 1997

§ 102(e) Date: Jan. 16, 1997

[87] PCT Pub. No.: WO96/36513

PCT Pub. Date: Nov. 21, 1996

[30] Foreign Application Priority Data

May 16, 1995 [JP] Japan .................................. 7-141225

[51] Int. Cl.⁶ .................................. B60T 8/24; B60T 8/32
[52] U.S. Cl. .................................. 303/146; 303/187
[58] Field of Search .................................. 303/146, 147, 303/187, 148

[56] References Cited

U.S. PATENT DOCUMENTS

| | | | |
|---|---|---|---|
| 4,971,174 | 11/1990 | Abe et al. . | |
| 4,998,593 | 3/1991 | Karnopp et al. | 303/146 |
| 5,015,041 | 5/1991 | Kuwana et al. | 303/146 |
| 5,458,405 | 3/1994 | Watanabe | 303/187 |
| 5,584,540 | 12/1996 | Takeuchi et al. | 303/187 |
| 5,645,326 | 7/1997 | Sand | 303/146 |

FOREIGN PATENT DOCUMENTS

| | | |
|---|---|---|
| 0545325A1 | 6/1993 | European Pat. Off. . |
| 4215710A1 | 11/1992 | Germany . |
| 4400704A1 | 7/1994 | Germany . |
| 4404098A1 | 9/1994 | Germany . |
| 1237252 | 9/1989 | Japan . |
| 3143757 | 6/1991 | Japan . |

*Primary Examiner*—Matthew C. Graham

[57] ABSTRACT

A turn control apparatus for a vehicle is applied to a four-wheeled automobile. When the vehicle turns while being braked, the outside front and inside rear wheels viewed in the vehicle turn direction are selected from the vehicle wheels as two target wheels to be controlled. The braking force on one target wheel to be controlled is increased in accordance with the turning condition of vehicle, while that of the other target wheel to be controlled is decreased.

11 Claims, 41 Drawing Sheets

US CLOCKWISE TURN + BRAKED

OS CLOCKWISE TURN + BRAKED

COUNTERSTEER (NOT BRAKED)

COUNTERSTEER (CRITICAL BRAKED)

US CLOCKWISE TURN + ABS CONTROL

OS CLOCKWISE TURN + ABS CONTROL

US CLOCKWISE TURN + ABS CONTROL

TURN CONTROL APPARATUS FOR A VEHICLE

TECHNICAL FIELD

The present invention relates to a turn control apparatus for a vehicle, which stabilizes turn behavior of vehicle by controlling the braking force on the wheel thereof when a vehicle is turned.

BACKGROUND ART

Turn control apparatuses for a vehicle have been disclosed, it, for example, in Unexamined Japanese Patent Publication No. 1-237252 and Unexamined Japanese Patent Publication No. 3-143757. In the control apparatus disclosed in the former Publication, when a vehicle turns while being braked, the braking force on the right and left rear wheels is increased or decreased according to the yaw angular velocity of the vehicle. Thereby, a yaw moment can be produced on the vehicle to prevent a spin thereof. In the control apparatus in the latter Publication, the braking force on the front and rear wheels is controlled according to the turning condition of the vehicle when the vehicle turns while being braked. Thereby, a yaw moment can be produced on the vehicle to assist a turning thereof.

For the control apparatus in the former Publication, the braking force on only the right and left rear wheels of the vehicle is controlled, so that the yaw moment generated on the vehicle by this control is relatively small. Therefore, there is a possibility that a spin of the vehicle cannot be prevented effectively depending on the turning condition of the vehicle.

For the control apparatus in the latter Publication, the braking force on all of four wheels of the vehicle are controlled. Therefore, even if the driver attempts to apply a stronger braking force to the vehicle during the control, the driver's intention is not reflected. For this reason, this control apparatus is not preferable in view of safety when a fault of the control apparatus during the control is considered.

An object of the present invention is to provide a turn control apparatus for a vehicle, which reliably stabilizes the turn behavior of the vehicle when the vehicle is turned, while fully maintaining the safety of the vehicle.

DISCLOSURE OF THE INVENTION

The above object is achieved by a turn control apparatus for a vehicle in accordance with the present invention. The turn control apparatus for a vehicle comprises determining means for determining the vehicle turning condition. The determining means includes turn detecting means for detecting a turn of the vehicle and outputting a turn signal indicative of a turn direction of the vehicle and braking detecting means for detecting the braking of the vehicle and outputting a braking signal indicative of a braking condition of the vehicle. The turn control apparatus further comprises selecting means for selecting the outside front and inside rear wheels viewed in the vehicle turn direction as two target wheels to be controlled based on the turn signal from the turn detecting means, and first braking control means for increasing the braking force on one target wheel to be controlled and decreasing the braking force on the other target wheel to be controlled in accordance with the vehicle turning condition determined by the determining means when the vehicle is braked.

According to the above-described turn control apparatus, when the vehicle turns while being braked, the outside front wheel and inside rear wheels viewed in the vehicle turn direction are selected as the target wheels to be controlled, and the braking forces on these target wheels to be controlled are increased and decreased in accordance with the vehicle turning condition. Therefore, a turning yaw moment or restoration moment necessary for the vehicle is given to the vehicle. When the braking forces on the target wheels to be controlled, or the outside front wheel and inside rear wheel viewed in the vehicle turn direction, are controlled, the turning moment or restoration moment to be given to the vehicle is generated most effectively, by which the turn behavior of the vehicle is stabilized. The number of target wheels to be controlled is few, being two, so that the braking forces on the wheels can easily be controlled.

In this case, the braking forces on the wheels other than the target wheels to be controlled, or the noncontrolled wheels, are determined by the depressing operation of a brake pedal performed by the driver. Since the braking forces on the noncontrolled wheels are controlled by the driver's intention, a sense of strangeness caused by braking is not given to the driver, and also safety is fully ensured.

The first braking control means sets the increase amount and decrease amount of braking force on the target wheels to be controlled at the same value in terms of absolute value. In this case, the braking force of the whole vehicle is not changed, and the braking feeling of vehicle is not adversely affected.

The first braking control means comprises vehicle condition detecting means for detecting a vehicle operating condition and manipulation condition, and setting means for setting the increase amount and decrease amount of braking force on the target wheels to be controlled based on the detected vehicle operating condition and manipulation condition. More specifically, the vehicle condition detecting means includes means for setting a target yaw rate of vehicle, and the setting means can set the increase amount and decrease amount of braking force on the target wheels to be controlled based on the yaw rate deviation between the target yaw rate and the actual yaw rate of vehicle. Further, the setting means can set the increase amount and decrease amount of braking force on the target wheels to be controlled based on the derivative of yaw rate deviation in addition to the yaw rate deviation. In this case, the increase amount and decrease amount of braking force on the target wheels to be controlled are set based on the yaw rate deviation (the derivative of yaw rate deviation) of vehicle exactly reflecting the actual operating condition of vehicle, so that vehicle turn control, that is, vehicle yaw moment control is carried out very finely and stably.

The aforementioned turn detecting means can include a yaw rate sensor for detecting the yaw rate of vehicle and discriminating means for discriminating the turn direction of vehicle based on the output of the yaw rate sensor. The output of the yaw rate sensor indicates the actual advancing direction of vehicle, that is, the turn direction of vehicle, so that the vehicle turn direction is discriminated exactly.

The first braking control means includes brake lines of a so-called cross-piping form. In this case, the braking line for the target wheels to be controlled and the brake line for the noncontrolled wheels are independent of each other, providing great safety.

The turn control apparatus for the vehicle can further comprise second braking control mean for increasing the braking force on one of the target wheels to be controlled in accordance with the vehicle turning condition when the vehicle turns while being not braked. In this case, even if the vehicle is not braked, the braking force on one of the target wheels to be controlled is increased, so that the turning moment or restoration moment can be given to the vehicle.

The first and second braking control means include vehicle condition detecting means for detecting a vehicle operating condition and manipulation condition, computing means for computing a required controlled variable for the vehicle turn based on the detected vehicle operating condition and manipulation condition, and setting means for setting the increase amount and decrease amount of braking force on the target wheels to be controlled based on the required controlled variable. In this case, a gain for computing the required control variable when the vehicle is braked is different from that when the vehicle is not braked, and the gain is set so as to be larger when the vehicle is not braked than when the vehicle is braked.

When the vehicle turns while being not braked, the increase amount of braking force on one target wheel to be controlled becomes larger as compared with the case where the vehicle turns while being braked. Therefore, even if the braking force on the other target wheel to be controlled is not decreased, the turning moment or restoration moment can fully be given to the vehicle.

The first braking control means includes a hydraulic pressure control valve for controlling a brake pressure of wheel brake for each wheel by cooperating with the corresponding wheel brake, a pump for supplying a pressurized fluid toward the wheel brake for each wheel, and holding means for changing over the hydraulic pressure control valve to hold the brake pressure of wheel brake for the noncontrolled wheel. In this case, even if the pump is actuated to supply the pressurized fluid toward the wheel brakes for the target wheels to be controlled, the wheel brake for the noncontrolled wheel is not subjected to the discharge pressure from the pump, so that the braking force on the noncontrolled wheel is not increased.

The braking detecting means includes augmented depression detecting means for detecting augmented depression of vehicle brake pedal and outputting an augmented depression signal, and the first braking control means includes a hydraulic pressure control valve which is changed over from the noncontrol position to control the brake pressure of the corresponding wheel brake by cooperating with the wheel brake for each wheel, and returning means for returning all of the hydraulic pressure control valves to the noncontrol position when the augmented depression signal is received. In this case, if augmented depression of brake pedal is performed, all hydraulic pressure control valves are returned to the noncontrol position, and the braking force on each wheel is controlled by the operator's intention.

BEST MODE OF CARRYING OUT THE INVENTION

Figure 1:
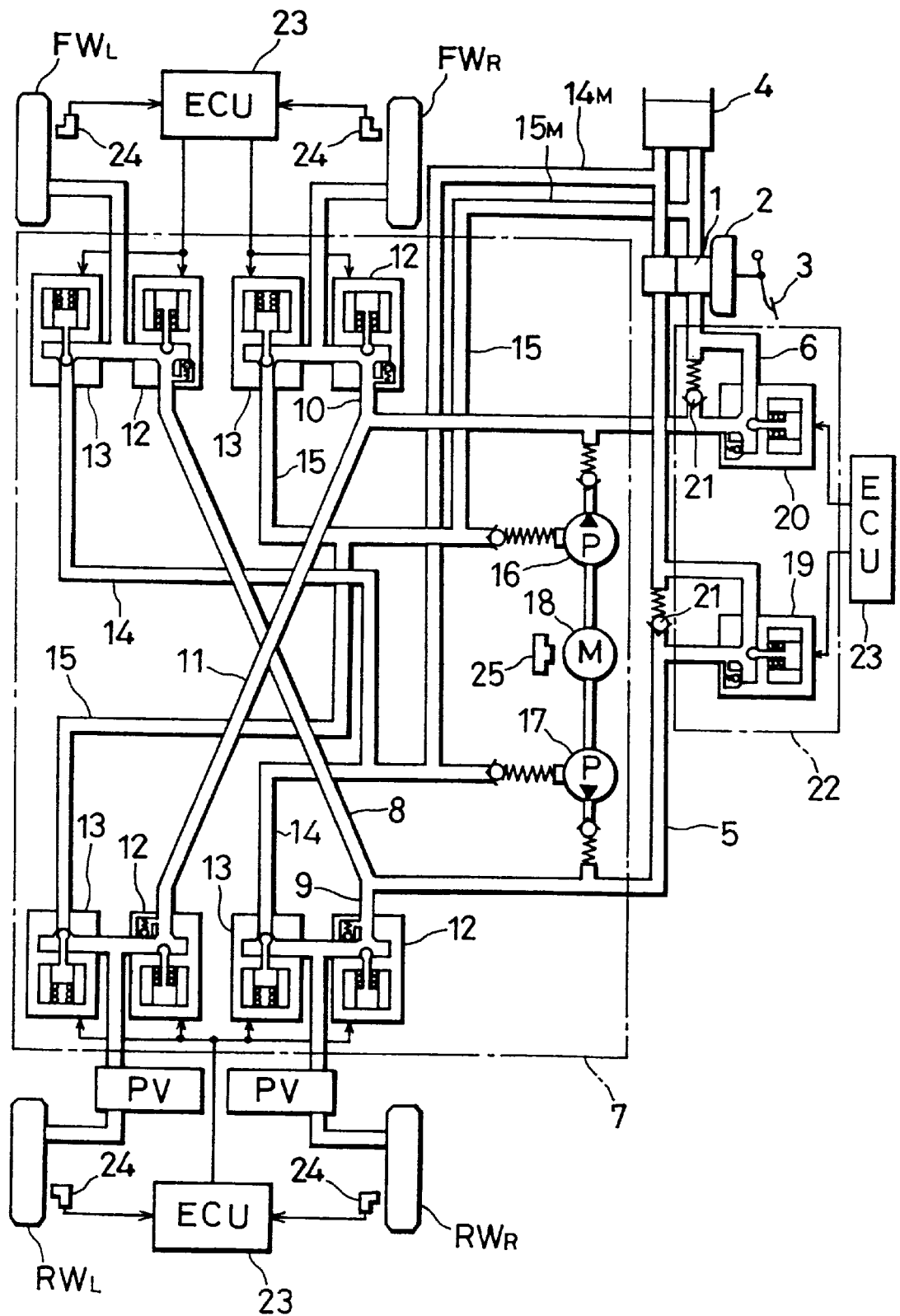
FIG. 1 is a schematic view of a brake system for carrying out yaw moment control of a vehicle.

Referring to FIG. 1, which schematically shows an automotive brake system, the brake system comprises a tandem master cylinder 1, which is connected to a brake pedal 2 through a vacuum brake booster 2. The master cylinder 1 has a pair of pressure chambers, each of which is connected to a reservoir 4. Main brake lines 5 and 6 extend from the pair of pressure chambers each into a hydraulic unit (HU) 7. In the hydraulic unit 7, the main brake lines branch into a pair of branch brake lines each.

Branch brake lines 8 and 9, which diverge from the main brake line 5, are connected to wheel brakes (not shown) for front-left and rear-right wheels $FW_L$ and $RW_R$, respectively. Branch brake lines 10 and 11, which diverge from the main brake line 6, are connected to wheel brakes (not shown) for front-right and rear-left wheels $FW_R$ and $RW_L$, respectively. Thus, the wheel brakes for the four wheels of the vehicle are connected to the tandem master cylinder 1 through the brake lines of a so-called cross-piping form.

A solenoid valve unit is inserted in each of the branch brake lines 8 to 11. Each solenoid valve unit has an inlet valve 12 and an outlet valve 13. A proportional valve (PV) is interposed between the rear wheel brake and the inlet valve 12 of the solenoid valve unit corresponding thereto.

For the solenoid valve units for the branch brake lines 8 and 9, a branch return line 14 extends from the outlet valve 13 of the respective solenoid valve units. These branch return lines 14 are connected to one main return line $14_M$, which is connected to the reservoir 4. For the solenoid valve units for the branch brake lines 10 and 11 as well, a branch return line 15 extends from the outlet valve 13 of the respective solenoid valve units. These branch return lines 15 are connected to one main return line $15_M$, which is connected to the reservoir 4. Therefore, the brake pressure (pressure in the wheel brake) of each wheel can be controlled by opening/closing the inlet and outlet valves 12 and 13 of the corresponding solenoid valve unit.

Pumps 16 and 17 are connected to the main brake lines 6 and 5, respectively, and check valves are interposed between a discharge port of the pump 16 and the main brake line 6 and between a discharge port of the pump 17 and the main brake line 5. These check valves permit only the flow of pressure oil from the pump to the main brake line. The pumps 16 and 17 are connected to a common motor 18, which drives the pumps 16 and 17 synchronously. The intake ports of the pumps 16 and 17 are connected to the aforementioned main return lines $15_M$ and $14_M$, respectively.

Cutoff valves 19 and 20, formed of solenoid valves, are inserted in the main brake lines 5 and 6, respectively. These cutoff valves are positioned on the upstream side of the pumps 16 and 17. Moreover, the main brake lines 5 and 6 include bypass lines that bypass the cutoff valves 19 and 20, respectively, and are provided with a relief valve 21 each. The cutoff valves 19 and 20 constitute a cutoff valve unit (CVU) 22.

The aforementioned inlet and outlet valves 12 and 13 of the solenoid valve units, cutoff valves 19 and 20, and motor 18 are connected electrically to an electronic control unit (ECU) 23. More specifically, the ECU 23 includes a microprocessor, memories such as RAM and ROM, input and output interfaces, etc. The output interface is connected electrically to the valves 12, 13, 19 and 20 and motor 18. The input interface of the ECU 23 is connected electrically to wheel velocity sensors 24, which are attached individually to the wheels, and a rotational speed sensor 25 for detecting the rotational speed of the motor 18. For ease of illustration in FIG. 1, the connections between the motor 18 and the ECU 23 and between the rotational speed sensor 25 and the ECU 23 are omitted.

Figure 2:
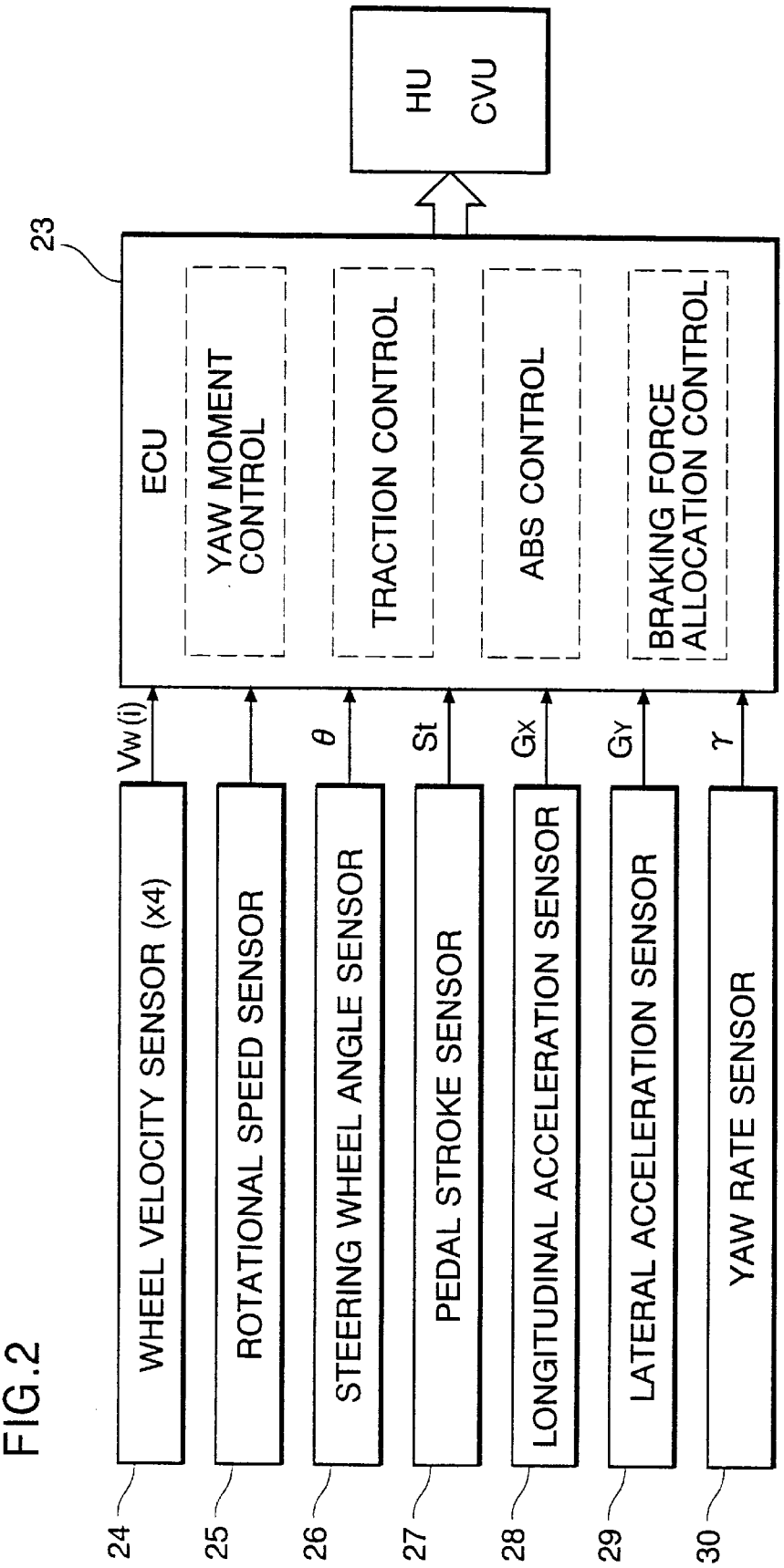
FIG. 2 is a block diagram showing the way an electronic control unit (ECU) in the brake system shown in FIG. 1 is connected to various sensors and a hydraulic unit (HU)

As shown in FIG. 2, the input interface of the ECU 23 is connected electrically to a steering wheel angle sensor 26, pedal stroke sensor 27, longitudinal acceleration sensor (longitudinal G sensor) 28, lateral acceleration sensor (lateral G sensor) 29, and yaw rate sensor 30, as well as the wheel velocity sensor 24 and the rotational speed sensor 25. The steering wheel angle sensor 26 detects the steering angle of a steering wheel of a vehicle, that is, the steering wheel angle. The pedal stroke sensor 27 detects the depth of depression of the brake pedal 3, that is, the pedal stroke. The longitudinal and lateral G sensors 28 and 29 detect longitudinal and lateral accelerations that act in the longitudinal and lateral directions of the vehicle. The yaw rate sensor 30 detects the vehicle angular velocity around a vertical axis, that is, the yaw angular velocity.

The ECU 23 receives the output signals of the aforementioned various sensors, and controls the operations of the HU 7 and the CVC 20 based on these output signals and the various vehicle motion control operations. As shown in the block for the ECU 23 in FIG. 2, the vehicle motion control operations include yaw moment control, traction control, anti-skid brake system control (ABS control), and braking force allocation control.

Figure 3:
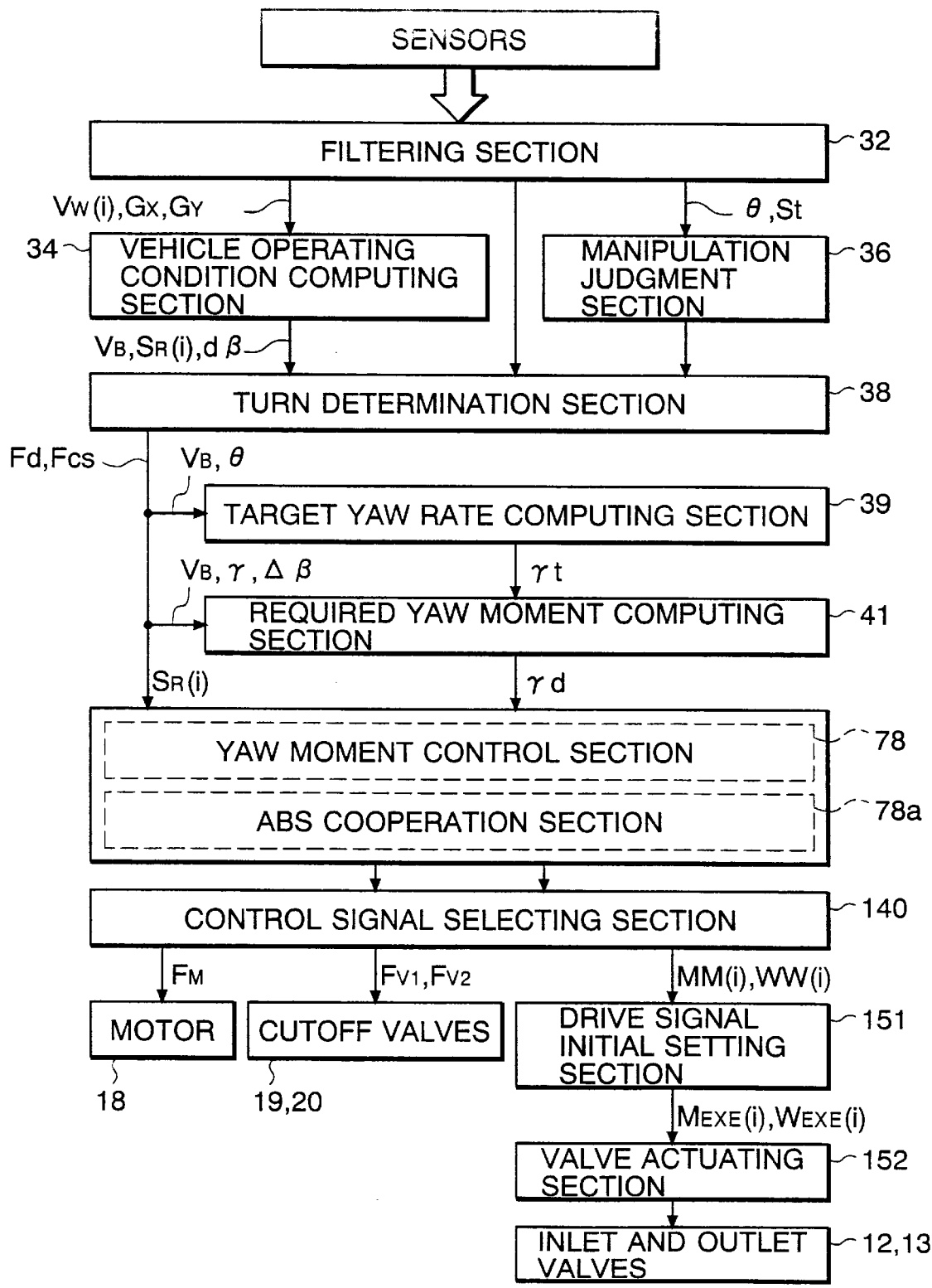
FIG. 3 is a functional block diagram for schematically illustrating the function of the ECU.
Figure 4:
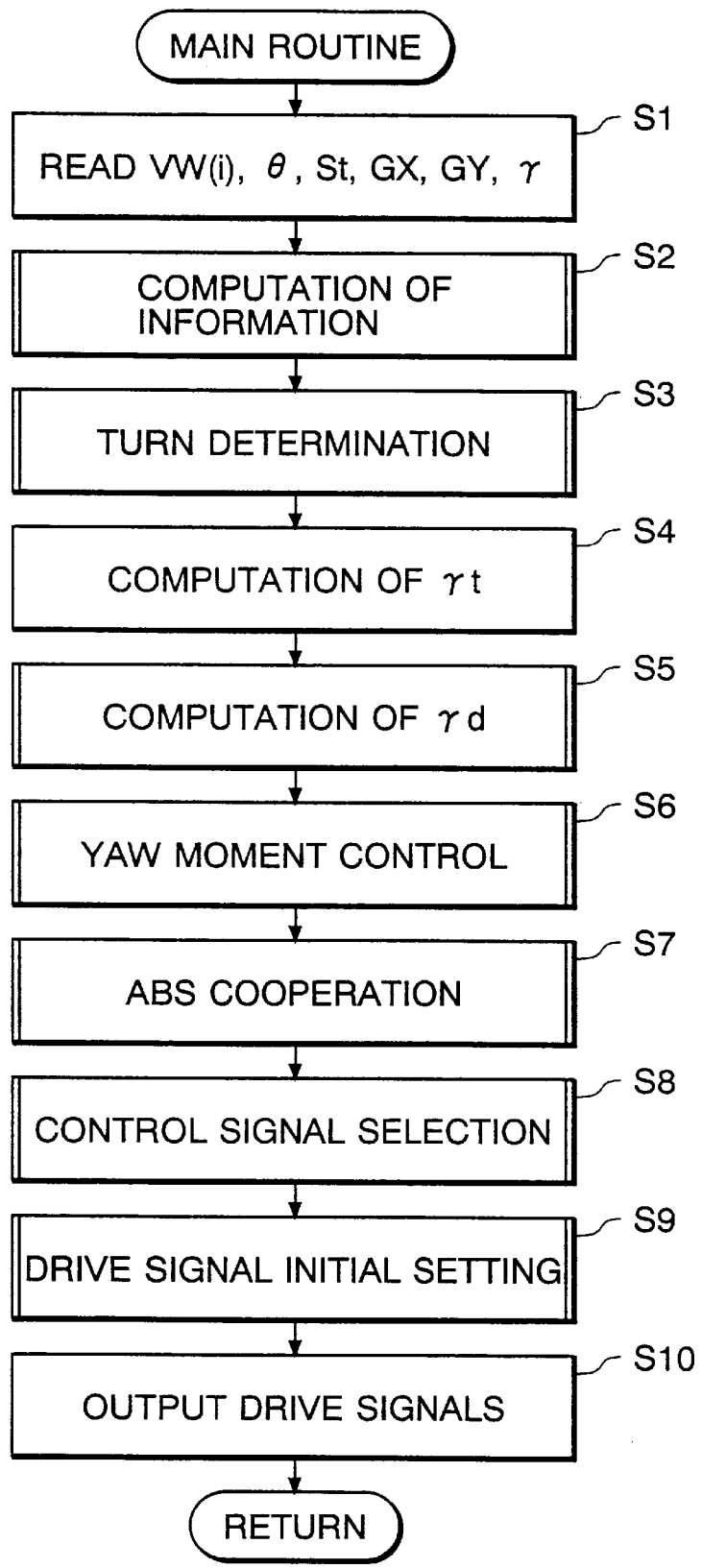
FIG. 4 is a flowchart showing a main routine executed by the ECU.

FIGS. 3 and 4 show a block diagram and main routine, respectively, associated with the yaw moment control of the above-described functions of the ECU 23. The control period T of the main loop is set to, for example, 8 msec.

When the output signals from the aforementioned various sensors are supplied to the ECU 23, the output signals, that is, the sensor signals are filtered in the ECU 23 (block 32 in FIG. 3). For filtering, a recursion type primary low-pass filter is used. Unless otherwise specified, a recursion type primary low-pass filter is also used in the filtering processes mentioned later.

Next, the ECU 23 reads the filtered sensor signals, that is, wheel velocities $V_W(i)$, steering wheel angle $\theta$, pedal stroke $S_t$, longitudinal acceleration $G_X$ (longitudinal $G_X$), lateral acceleration $G_Y$ (lateral $G_Y$), and yaw rate $\gamma$ (Step S1 in FIG. 4), and computes information indicative of the vehicle operating condition and information for judging driver's manipulations (Step S2). The character i in the wheel velocity $V_W(i)$ indicates the number for identifying the wheel of the vehicle. That is, $V_W(1)$, $V_W(2)$, $V_W(3)$, and $V_W(4)$ indicate the wheel velocities of front-left wheel, front-right wheel, rear-left wheel, and rear-right wheel, respectively. In the description to follow, the reference character (i) will be used in the same sense.

In FIG. 3, Step S2 is executed in the operation blocks 34 and 36. Specifically, in the operation block 34, the vehicle operating condition is computed based on the wheel velocities $V_W(i)$, longitudinal $G_X$, lateral $G_Y$, and yaw rate $\gamma$. In the operation block 36, the driver's manipulations on the steering wheel and brake pedal is judged based on the steering wheel angle $\theta$ and pedal stroke $S_t$.

The vehicle operating condition and driver's manipulations will now be described in detail.

Vehicle operating condition

A: Reference wheel velocity

First, a reference wheel velocity $V_S$ is selected among the wheel velocities $V_W(i)$ in the ECU 23. As the reference wheel velocity $V_S$, a wheel that is not susceptible to a slip in relation to the braking force control of the wheel is selected. More specifically, the velocity $V_W$ of the faster driven wheel is selected as the reference wheel velocity $V_S$ when the vehicle is not braked. Contrarily, when the vehicle is braked, the velocity $V_W$ of the fastest wheel of the wheel velocities $V_W(i)$ is set as the reference wheel velocity $V_S$. As described later, in the ECU 23, whether the vehicle is braked or not is determined by a brake flag $F_b$.

B: Vehicle body velocity

Next, the ECU 23 computes the gravity-center velocity of the vehicle from the reference wheel velocity $V_S$, and determines the vehicle body velocity $V_B$ based on this gravity-center velocity. In computing the gravity-center velocity, the inside and outside wheel velocities and the velocity ratio between front and rear wheels when the vehicle is turning are considered.

When the front and rear treads of the vehicle are denoted by $T_f$ and $T_r$, respectively, the inside-outside wheel velocity differences $\Delta V_{IF}$ and $\Delta V_{IR}$ between the front wheels and between the rear wheels are expressed as the product of yaw rate $\gamma$ and tread as seen from the following equation.

$$\Delta V_{IF} = \gamma \times T_f \tag{1}$$

$$\Delta V_{IR} = \gamma \times T_r \tag{2}$$

Therefore, the average of the right-left velocity difference of the whole vehicle, that is, the average inside-outside wheel velocity difference $\Delta V_{IA}$ is expressed as $$\Delta V_{IA} = \gamma \times (T_f + T_r)/2 \tag{3}$$

If the center of turn of the vehicle is on an extension of the rear axle and when the vehicle is turning clockwise, the front-rear wheel velocity ratios $R_{VR}$ and $R_{VL}$ on the right- and left-wheel sides are expressed as $$R_{VR} = \cos(\delta) \tag{4}$$

$$R_{VL} \approx \cos(\delta) \tag{5}$$

where $\delta$ is the front-wheel steering angle (obtainable by dividing the steering wheel angle by the steering gear ratio). Therefore, the front-rear wheel velocity ratio $R_V$ can be given by $\cos(\delta)$ without regard to the right or left of the vehicle.

However, the equations (4) and (5) hold true only when the vehicle is running at a low velocity (more accurately, when the lateral acceleration $G_Y$ is low). Accordingly, the computation of the velocity ratio $R_V$ based on the equations (4) and (5) is carried out only when the vehicle body velocity $V_{BM}$ is low as shown by the following equation.

When $$V_{BM} < 30 \text{ km/h}, R_V = \cos(\delta) \tag{6}$$

When the vehicle body velocity $V_{BM}$ is relatively high, the velocity ratio $R_V$ is set to a constant value by the following equation.

When $$\geq 30 \text{ km/h}, R_V = 1 \tag{7}$$

$V_{BM}$ is the vehicle body velocity $V_B$ computed from the execution result of the preceding cycle of the main routine. The computation of the vehicle body velocity $V_B$ will be described later.

In the case where the vehicle is a front-engine front-drive (FF) vehicle, when the vehicle turns while not being braked, the reference wheel velocity $V_S$ follows the wheel velocity of the outside rear wheel. In this case, the gravity-center velocity of the vehicle is computed by adding a correction to the reference wheel velocity $V_S$, the correction being based on ½ of average inside-outside wheel velocity difference $\Delta V_{IA}$ and a velocity difference between the rear axle velocity and the gravity-center velocity. Since such computation of gravity-center velocity is complicated, it is assumed that the gravity-center velocity is equal to an intermediate value between the velocities in the front axle position and gravity-center position. Thereupon, an unfiltered gravity-center velocity $V_{CGO}$ can be computed by the following equation.

$$V_{CGO}=(V_S-\Delta V_{IA}/2)\times(1+(1/R_V))/2 \quad (8)$$

On the other hand, when the vehicle turns while being braked, it is thought that the reference wheel velocity $V_S$ follows the outside front wheel velocity. In this case, the unfiltered gravity-center velocity $V_{CGO}$ is computed by adding a correction to the reference wheel velocity $V_S$, the correction being based on ½ of average inside-outside wheel velocity difference $\Delta V_{IA}$ and a velocity difference between the front axle velocity and the gravity-center velocity. That is, the gravity-center velocity $V_{CGO}$ can be obtained from the following equation.

$$V_{CGO}=(V_S-\Delta V_{IA}/2)\times(1+R_V)/2 \quad (9)$$

Subsequently, the gravity-center velocity $V_{CGO}$ is continuously filtered twice ($f_c$=6 Hz), so that a filtered gravity-center velocity $V_{CG}$ (=LPF(LPF($V_{CGO}$))) is obtained.

In computing the gravity-center velocity $V_{CG}$ of the vehicle, whether the vehicle is braked or not is determined based on the brake flag $F_b$.

Usually, since the gravity-center velocity $V_{CG}$ follows the vehicle body velocity $V_B$, the gravity-center velocity $V_{CG}$ is set as the vehicle body velocity $V_B$. That is, the vehicle body velocity $V_B$ is usually computed by the following equation.

$$V_B=V_{CG} \quad (10)$$

However, in a situation such that the reference wheel having the reference wheel velocity $V_S$ is locked and the brake pressure control by an anti-skid brake system (ABS) is started for the reference wheel, the reference wheel velocity $V_S$ is reduced by following the slip of the reference wheel. That is, the reference wheel velocity $V_S$ is substantially reduced as compared with the actual vehicle body velocity.

In such a situation, the ECU 23 determines whether or not a predetermined separation condition based on the longitudinal $G_X$ has been satisfied. If the separation condition is satisfied, the following of the vehicle body velocity $V_B$ after the gravity-center velocity $V_{CG}$ is stopped, and the vehicle body velocity $V_B$ separates from the gravity-center velocity $V_{CG}$. After this separation, in the ECU 23, the vehicle body velocity $V_B$ is estimated by assuming that the vehicle body velocity $V_B$ is reduced at a predetermined gradient.

More specifically, the separation condition is such that when a time differential of the gravity-center velocity $V_{CG}$ and a separation determination value are denoted by $\Delta V_{CG}$ and $G_{XS}$, respectively, the vehicle body velocity $V_B$ is separated from the gravity-center velocity $V_{CG}$ when a condition of $\Delta V_{CG} \leq G_{XS}$ continues for 50 msec or a condition of $\Delta V_{CG} \leq -1.4$ g (g is a gravitational acceleration) is satisfied. Here, the separation determination value $G_{XS}$ is set by the following equation.

$$G_{XS}=-(|G_X|+0.2)$$

provided that $$-1.4\text{ g}\leq G_{XS}\leq -0.35\text{ g} \quad (11)$$

If the above separation condition is satisfied, the vehicle body velocity $V_B$ is estimated by the following equation.

$$V_B=V_{BM}-\Delta G \quad (12)$$

$V_{BM}$ denotes a vehicle body velocity before the separation condition is satisfied, and $\Delta G$ denotes a gradient set by the following equation.

$$\Delta G=(|G_X|+0.15)$$

provided that $$-1.2\text{ g}\leq \Delta G\leq -0.3\text{ g} \quad (13)$$

In the ECU 23, when the vehicle body velocity $V_B$ is estimated while being separated from the gravity-center velocity $V_{CG}$, a separation end condition, in which the vehicle body velocity $V_B$ can follow the gravity-center velocity $V_{CG}$ again, is expressed by the following equation.

$$V_{CG}>V_{BM} \quad (14)$$

C: Slip factor of vehicle

Next, in the ECU 23, a correction based on the aforementioned average velocity difference $\Delta V_{IA}$ and the velocity ratio $R_V$ is made to the vehicle body velocity $V_B$, and a reference wheel velocity $V_R(i)$ at each wheel position is computed. That is, the reference wheel velocity $V_R(i)$ is computed by the following equation.

$$V_R(i)=V_B\times 2/(1+R_V)+(\text{or }-)V_{IA}/2 \quad (15)$$

Explaining the positive/negative sign of the second term of the equation (15), when the vehicle turns clockwise, (+) is used for the computation of the outside reference wheel velocity, and (−) is used for the computation of the inside reference wheel velocity. On the other hand, when the vehicle turns counterclockwise, the use of the positive and negative signs is reverse.

The slip factor $S_R(i)$ for each wheel is determined by filtering ($f_c$=10 Hz) by the equation (17) after the computation by the equation (16) is made.

$$S_{R0}(i)=(V_R(i)-V_W(i))/V_R(i) \quad (16)$$

$$S_R(i)=LPF(S_{R0}(i)) \quad (17)$$

$S_{R0}(i)$ denotes an unfiltered slip factor.

D: Gravity-center slip angular velocity

If the angular velocity of vehicle around the center of turn during the turning of the vehicle (velocity of vehicle revolution) is ω, the relation between the gravity-center slip angular velocity dβ and the yaw rate γ is expressed as $$\gamma=d\beta(=\beta g)+\omega \quad (18)$$

where βg is a gravity-center slip angle.

If the gravity-center slip angle βg is small, there is a relation expressed by the following equation between the vehicle body velocity $V_B$ and the vehicle velocity V.

$$V_B=V\times\cos(\beta g)=V \quad (19)$$

Also, there is a relation expressed by the following equation between the vehicle velocity V and the lateral $G_Y$.

$$G_Y = V \times \omega \quad (20)$$

Eliminating $\omega$ and $V$ from the above three equations (18), (19), and (20), an unfiltered gravity-center slip angular velocity $d\beta_0$ can be determined from the following equation.

$$d\beta_0 = \gamma - G_Y/V_B \quad (21)$$

Therefore, the ECU 23 computes the unfiltered gravity-center slip angular velocity $d\beta_0$ based on the above equation (21).

Subsequently, in the ECU 23, the gravity-center slip angular velocity $d\beta$ is determined by filtering ($f_c = 2$ Hz) the gravity-center slip angular velocity $d\beta_0$ as follows:

$$d\beta = \text{LPF}(d\beta_0) \quad (22)$$

In order to make the sign of the gravity-center slip angular velocity $d\beta$ positive on the understeer (US) side and negative on the oversteer (OS) side, without regard to the vehicle turn direction, the computed slip angular velocity $d\beta$ is multiplied by (–) to be inverted in sign when the vehicle turns clockwise.

If a condition of $V_B < 10$ km/h is met when the vehicle runs at a low velocity, in the ECU 23, the computation of the gravity-center slip angular velocity $d\beta$ is inhibited to prevent the overflowing of computations, and the value of the gravity-center slip angular velocity $d\beta$ is set at 0.

Condition of manipulations

E: Steering wheel angular velocity

Figure 5:
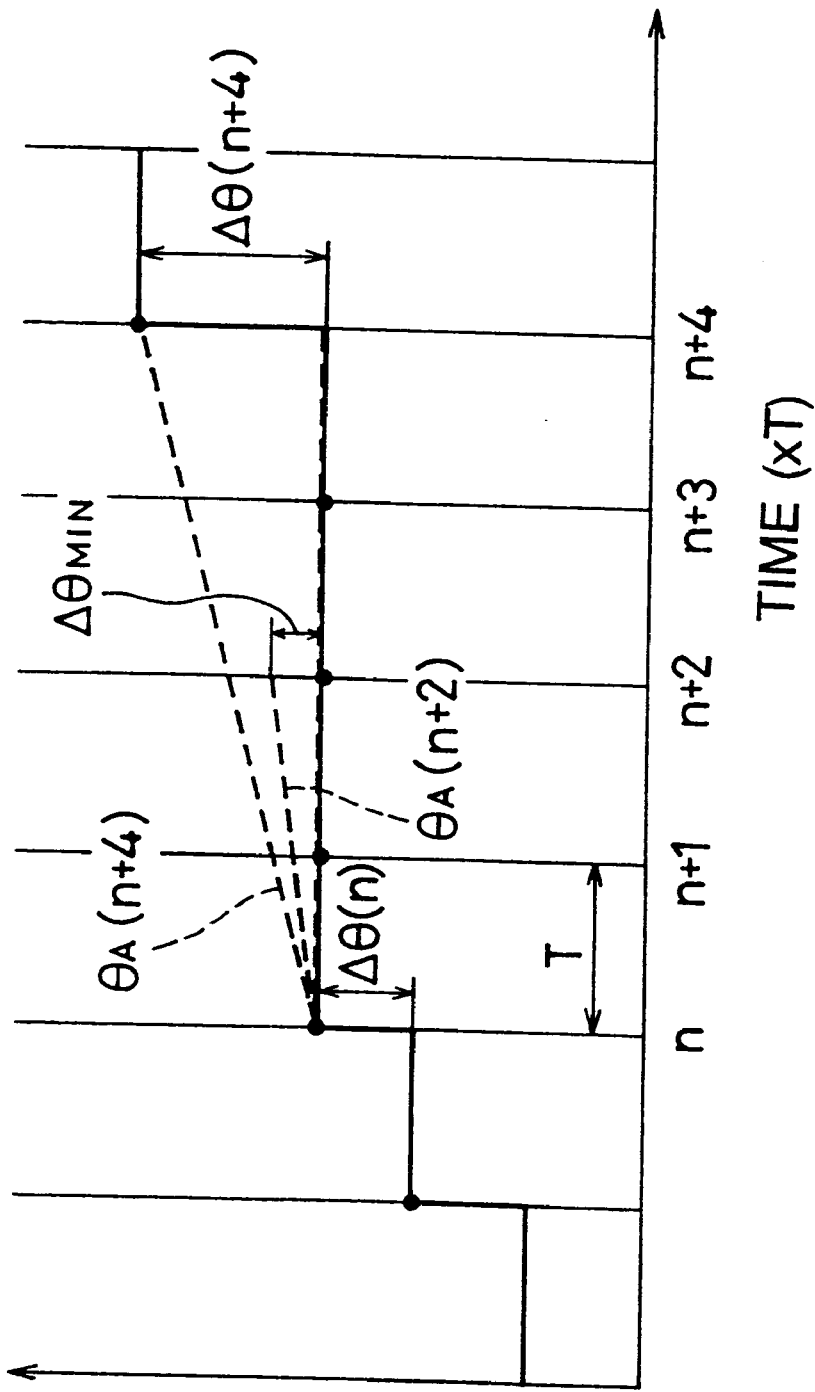
FIG. 5 is a graph showing a change in steering wheel angle θ with time when a steering wheel is manipulated.

It is assumed that a steering wheel angle $\theta$ is changed as shown in FIG. 5. A steering wheel angular velocity $\theta_A$ when the steering wheel angle $\theta$ is changed can be obtained by dividing the variation of the steering wheel angle $\theta$ by the time required for the change. If time n is a reference, and the steering wheel angle $\theta$ is changed by $\Delta\theta(n+4)$ at time n+4, as shown in FIG. 5, for example, in the ECU 23, a steering wheel angular velocity $\theta_{A0}(n+4)$ at time n+4 is calculated as follows:

$$\theta_{A0}(n+4) = \Delta\theta(n+4)/(4 \times T) \quad (23)$$

where T is the control period for the aforementioned main routine.

When the steering wheel angle $\theta$ is not changed, it is assumed that the angle $\theta$ is changed by a minimum variation $\Delta\theta_{MIN}$ in the same direction for its last change. In this case, the steering wheel angular velocity $\theta_{A0}$ is obtained by dividing the minimum variation $\Delta\theta_{MIN}$ by a period of time required for its change. For example, in the ECU 23, a steering wheel angular velocity $\theta_{A0}(n+2)$ at time n+2 is computed as follows:

$$\theta_{A0}(n+2) = \Delta\theta_{MIN}/(2 \times T) \quad (24)$$

Then, the steering wheel angular velocity $\theta_{A0}$ is filtered ($f_c = 2$ Hz), whereupon a filtered steering wheel angular velocity $\theta_A$ is obtained as follows:

$$\theta_A = \text{LPF}(\theta_{A0}) \quad (25)$$

F: Effective steering wheel angular velocity value

In the ECU 23, the absolute value of the steering wheel angular velocity $\theta_A$ is filtered, and an effective steering wheel angular velocity value $\theta_{AE}$ is calculated as follows:

$$\theta_{AE} = \text{LPF}(|\theta_A|) \quad (26)$$

The value of the cutoff frequency $f_c$ for filtering process differs depending on whether the steering wheel angle $\theta$ tends to increase or decrease, that is, the positive or negative value of the steering wheel angular velocity $\theta_A$. For example, when the steering wheel angular velocity $\theta_A$ takes a positive value, $f_c$ is set at 20 Hz. On the other hand, when the steering wheel angular velocity $\theta_A$ takes a negative value, $f_c$ is set at 0.32 Hz.

G: Pedal stroke velocity of brake pedal

In the ECU 23, a pedal stroke velocity $V_{ST}$ is obtained by filtering ($f_c = 1$ Hz) finite differences in the pedal stroke $S_t$, that is, the time differential thereof as follows:

$$V_{ST} = \text{LPF}(S_t(n) - S_t(n-1)) \quad (27)$$

where $S_t(n-1)$ is a pedal stroke obtained during the execution of the preceding main routine, and $S_t(n)$ is a pedal stroke obtained during the execution of the present main routine.

H: Brake flag for brake pedal

In the ECU 23, the aforementioned brake flag $F_b$ is set in accordance with the pedal stroke $S_t$ and the pedal stroke velocity $V_{ST}$ as follows:

If the condition of $S_t > S_{te}$ or $V_{ST} > 50$ mm/s is met, $F_b = 1$. If the above condition is not met, $F_b = 0$.

$S_{te}$ is a depth of depression of the brake pedal 3 when the pressure in the master cylinder 2 rises actually.

The brake flag $F_b$ is used in selecting the reference wheel velocity $V_S$ or computing the gravity-center velocity $V_{CG}$.

I: Augmented depression flag for brake pedal

In the ECU 23, an augmented depression flag $F_{PP}$ is set in accordance with the pedal stroke velocity $V_{ST}$ as follows:

If $V_{ST} > 50$ mm/s, $F_{PP} = 1$.
If $V_{ST} < 20$ mm/s, $F_{PP} = 0$.

Figure 6:
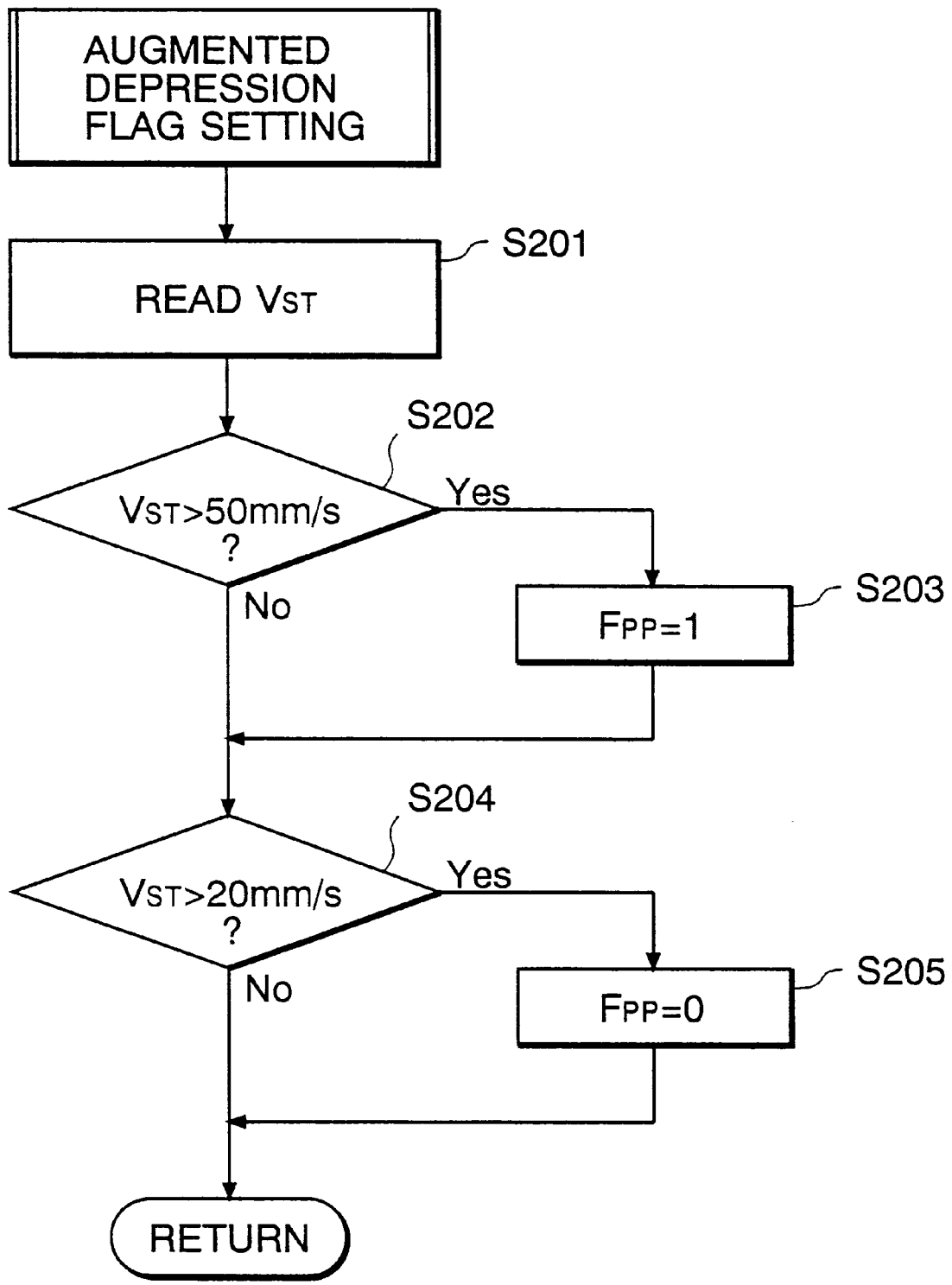
FIG. 6 is a flowchart showing a setting routine for part in Step S2 of FIG. 4.

The setting routine for the aforementioned augmented depression flag $F_{PP}$ is shown in FIG. 6. In this setting routine, the pedal stroke velocity $V_{ST}$ is read (Step S201), and the augmented depression flag $F_{PP}$ is set (Steps S203 and S205) in accordance with the results of determination in Steps S202 and S204.

Turn determination

Figure 7:
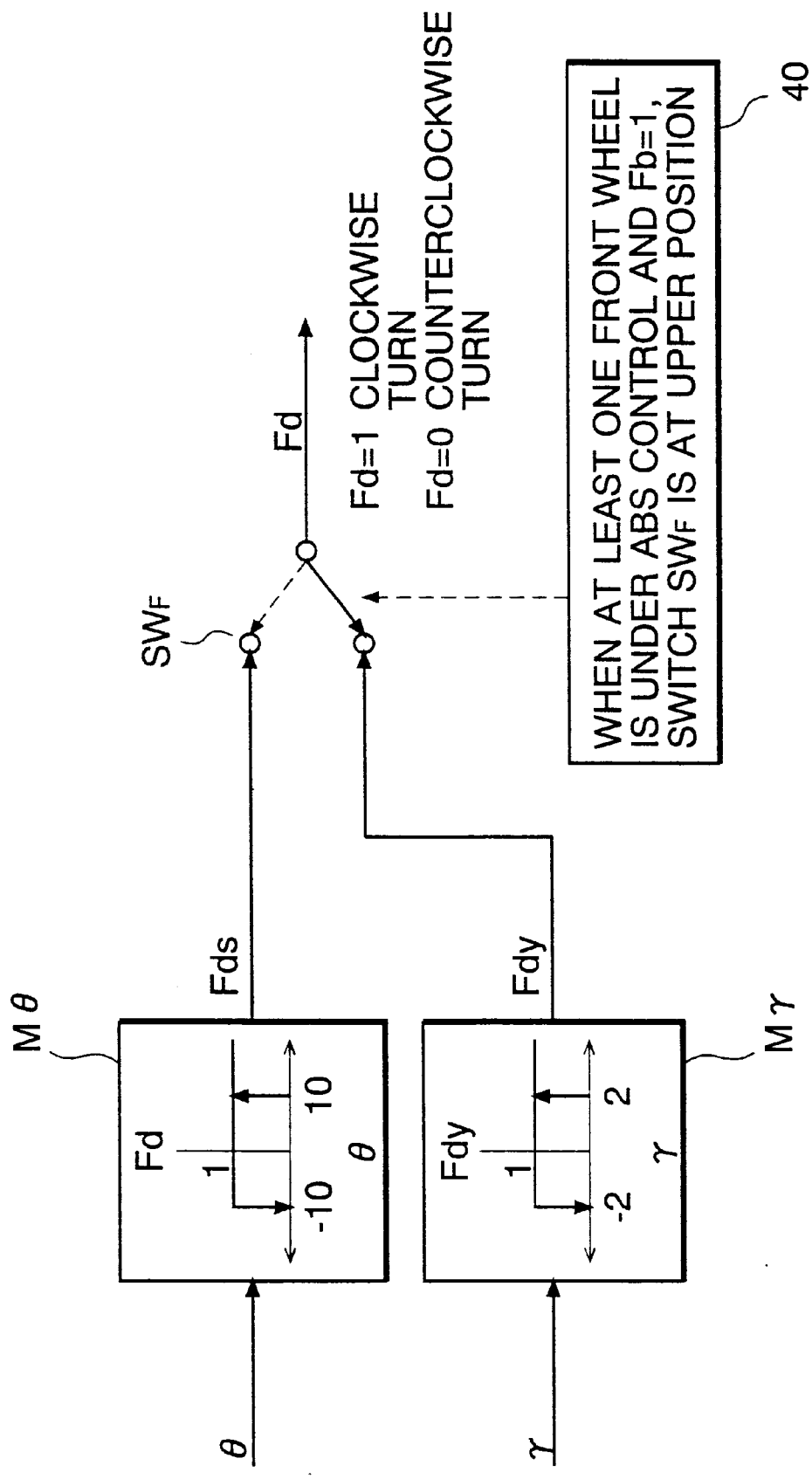
FIG. 7 is a view showing the details of a turn determination section shown in FIG. 3.

Next, in the ECU 23, Step 3 (see FIG. 4), that is, the turn determination of the vehicle is executed. In FIG. 3, the determination of turn direction is executed in the operation block 38, and the details thereof is shown in FIG. 7. Also, the details of Step S3 is shown in the flowchart in FIG. 8.

As seen from FIG. 7, in the turn determination of the vehicle, the vehicle turn direction is determined in accordance with the steering wheel angle $\theta$ and the yaw rate $\gamma$, and whether or not the steering wheel manipulation by the driver is countersteer is determined.

First, in the ECU 23, a direction flag $F_{ds}$ based on the steering wheel angle $\theta$ is determined on the basis of the steering wheel angle $\theta$ according to a map $M\theta$ shown in FIG. 7. Specifically, when the steering wheel angle $\theta$ exceeds 10 deg in the positive direction, the direction flag $F_{ds}$ is set at 1. In this case, the direction flag $F_{ds}$ (–1) indicates a clockwise turn of the vehicle. On the other hand, when the steering wheel angle $\theta$ exceeds –10 deg in the negative direction, the direction flag $F_{ds}$ is set at 0, which is indicative of a counterclockwise turn of the vehicle. When the steering wheel angle $\theta$ is in a range of $-10 \text{ deg} \leq \theta \leq 10$ deg, the direction flag $F_{ds}$ is kept at the value set in the preceding determination routine (FIG. 8).

Figure 8:
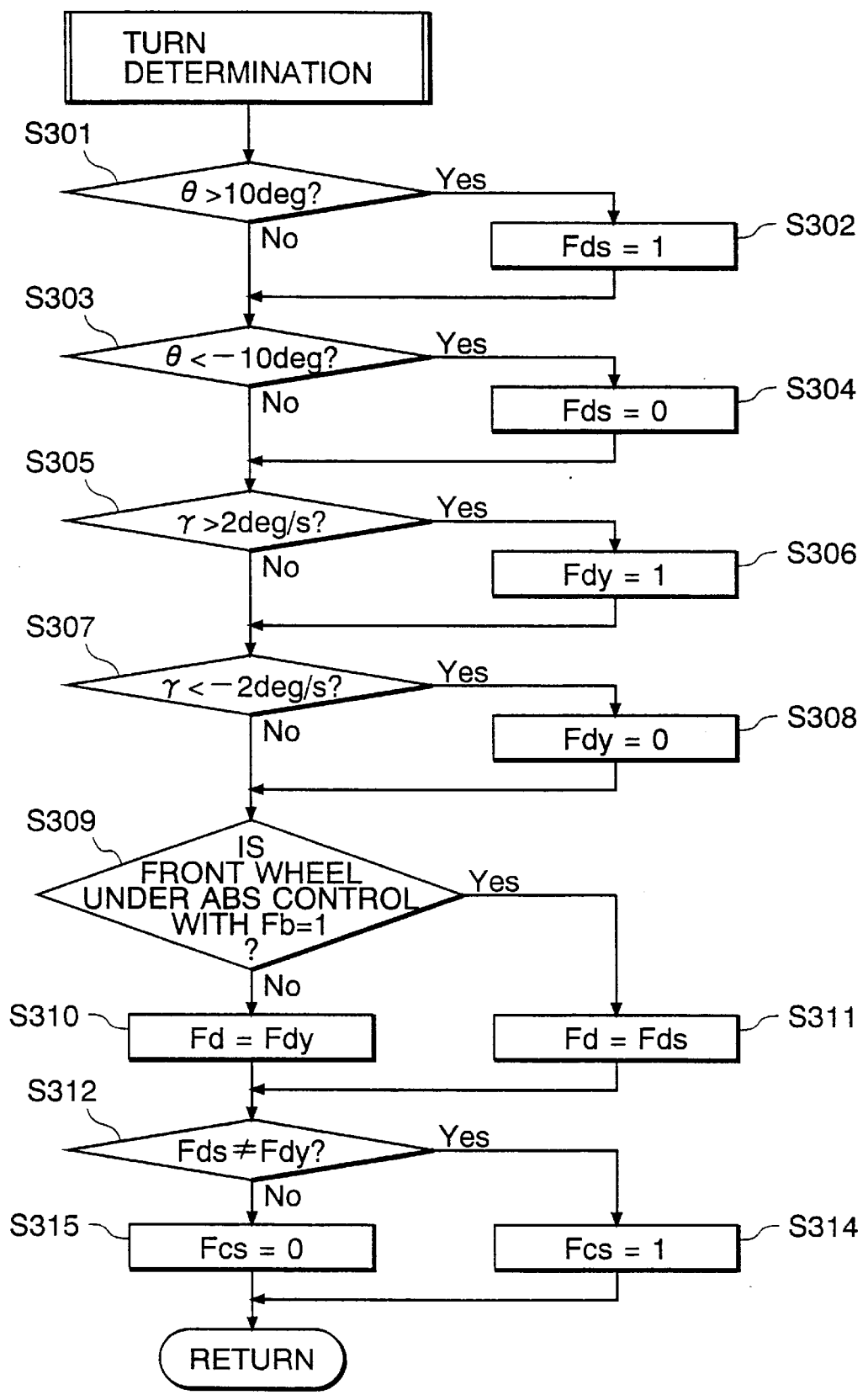
FIG. 8 is a flowchart showing the details of a determination routine executed in the turn determination section shown in FIG. 3.

The above-described setting procedure for the direction flag $F_{ds}$ is shown in Steps S301 to S304 in the flowchart shown in FIG. 8.

On the other hand, in the ECU 23, a direction flag $F_{dy}$ based on the yaw rate γ is determined on the basis of the yaw rate γ according to a map Mγ shown in FIG. 7. Specifically, when the yaw rate γ exceeds 2 deg in the positive direction, the direction flag $F_{dy}$ is set at 1. In this case, the direction flag $F_{dy}$ (=1) indicates a clockwise turn of the vehicle. On the other hand, when the yaw rate γ exceeds −2 deg in the negative direction, the direction flag $F_{dy}$ is set at 0, which is indicative of a counterclockwise turn of the vehicle. When the yaw rate γ is in a range of −2 deg ≦ θ ≦ 2 deg, the direction flag $F_{dy}$ is kept at the value set in the preceding determination routine (FIG. 8).

The setting procedure for the direction flag $F_{dy}$ is shown in Steps S305 to S308 in the flowchart shown in FIG. 8.

As shown in FIG. 7, the direction flags $F_{ds}$ and $F_{dy}$ are supplied to a switch $SW_F$, and this switch $SW_F$ is shifted in response to a switching signal delivered from a determination section 40. Therefore, in the ECU 23, the direction flag outputted from the switch $SW_F$ is selected as a turn flag $F_d$.

When the brake pressure of at least one front wheel is under the ABS control and the brake flag $F_b$ is set at 1, the determination section 40 delivers a switching signal for shifting the switch $SW_F$ to an upper position as indicated by the arrow mark of broken line in FIG. 7. In this case, the direction flag $F_{ds}$ based on the steering wheel angle θ is set as the turn flag $F_d$ as follows.

$$F_d = F_{ds}$$

However, when the aforesaid condition is not met, the switching signal is not delivered from the determination section 40. In this case, the switch $SW_F$ is at a switching position indicated by the arrow mark of solid line. The direction flag $F_{dy}$ based on the yaw rate γ is set as the turn flag $F_d$ as follows.

$$F_d = F_{dy}$$

The setting procedure for the turn flag $F_d$ is shown in Steps S309 to S311 in the flowchart shown in FIG. 8.

Subsequently, in the ECU 23, it is determined whether or not the steering wheel manipulation by the driver is countersteer. That is, in Step S312 in the flowchart shown in FIG. 8, it is determined whether or not the values of the direction flags $F_{ds}$ and $F_{dy}$ are not equal to each other. If the result of determination in this step is Yes, that is, if the direction of yawing acting on the vehicle does not agree with the operation direction of the steering wheel, 1 is set in a countersteer flag $F_{cs}$ (Step S314). If the result of determination in Step S312 is No, on the other hand, 0 is set in a countersteer flag $F_{cs}$ (Step S315).

Computation of target yaw rate

Next, in Step S4, that is, in the operation block 39 in FIG. 3, the ECU 23 computes the target yaw rate $γ_t$ of the vehicle. The details of the operation block 39 is shown in FIG. 9.

Figure 9:
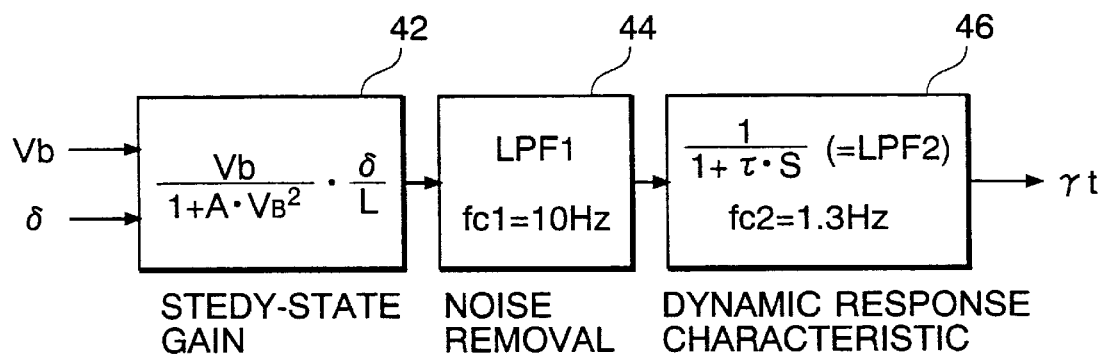
FIG. 9 is a diagram showing the details of a target yaw rate computing section shown in FIG. 3.

As seen from FIG. 9, the vehicle body velocity $V_B$ and the front-wheel steering angle δ are supplied to the operation section 42, where a steady-state gain is determined. Subsequently, the steady-state gain is filtered in sequence in the following filter sections 44 and 46. As a result, the target yaw rate $γ_t$ is determined.

When the aforesaid steering gear ratio is denoted by ρ, the front-wheel steering angle δ is determined by the following equation.

$$δ = θ/ρ \qquad (28)$$

The steady-state gain is a value indicative of the response of yaw rate acting on the vehicle to the operation of steering wheel. Specifically, the steady-state gain can be derived from a linear two-wheel model of the vehicle. In the first-stage filter section 44, a low-pass filter (LPF1) for noise removal is used, while in the second-stage filter section 46, a low-pass filter (LPF2) for the first-order-delay response.

Therefore, in the ECU 23, the target yaw rate $γ_t$ is computed as follows:

$$γ_t = LPF2((LPF1(V_B/(1+A×V_B^2)×(δ/L)) \qquad (29)$$

where A and L are a stability factor and a wheel base, respectively.

Computation of required yaw moment

Next, in Step S5 (FIG. 4), that is, in the operation block 41 in FIG. 3, ECU 23 computes a required yaw moment $γ_d$. The details of the operation block 41 and Step S5 are shown in FIG. 10 and FIG. 11, respectively.

Figure 10:
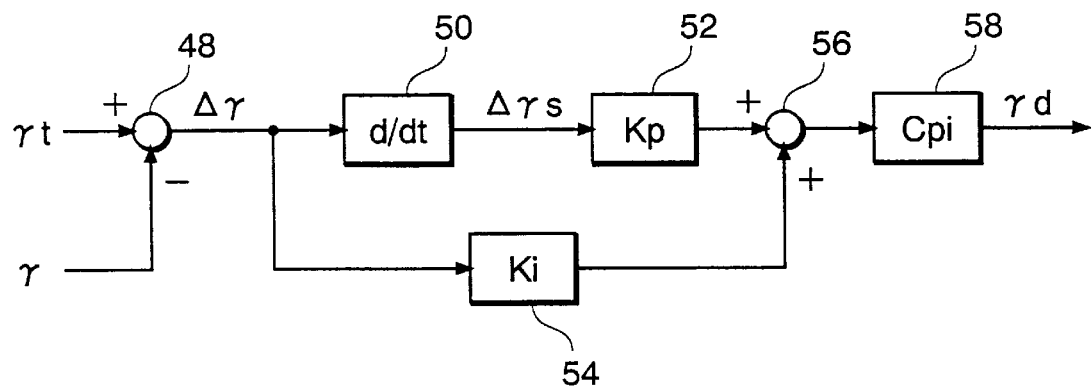
FIG. 10 is a diagram showing the details of a required yaw moment computing section shown in FIG. 3.
Figure 11:
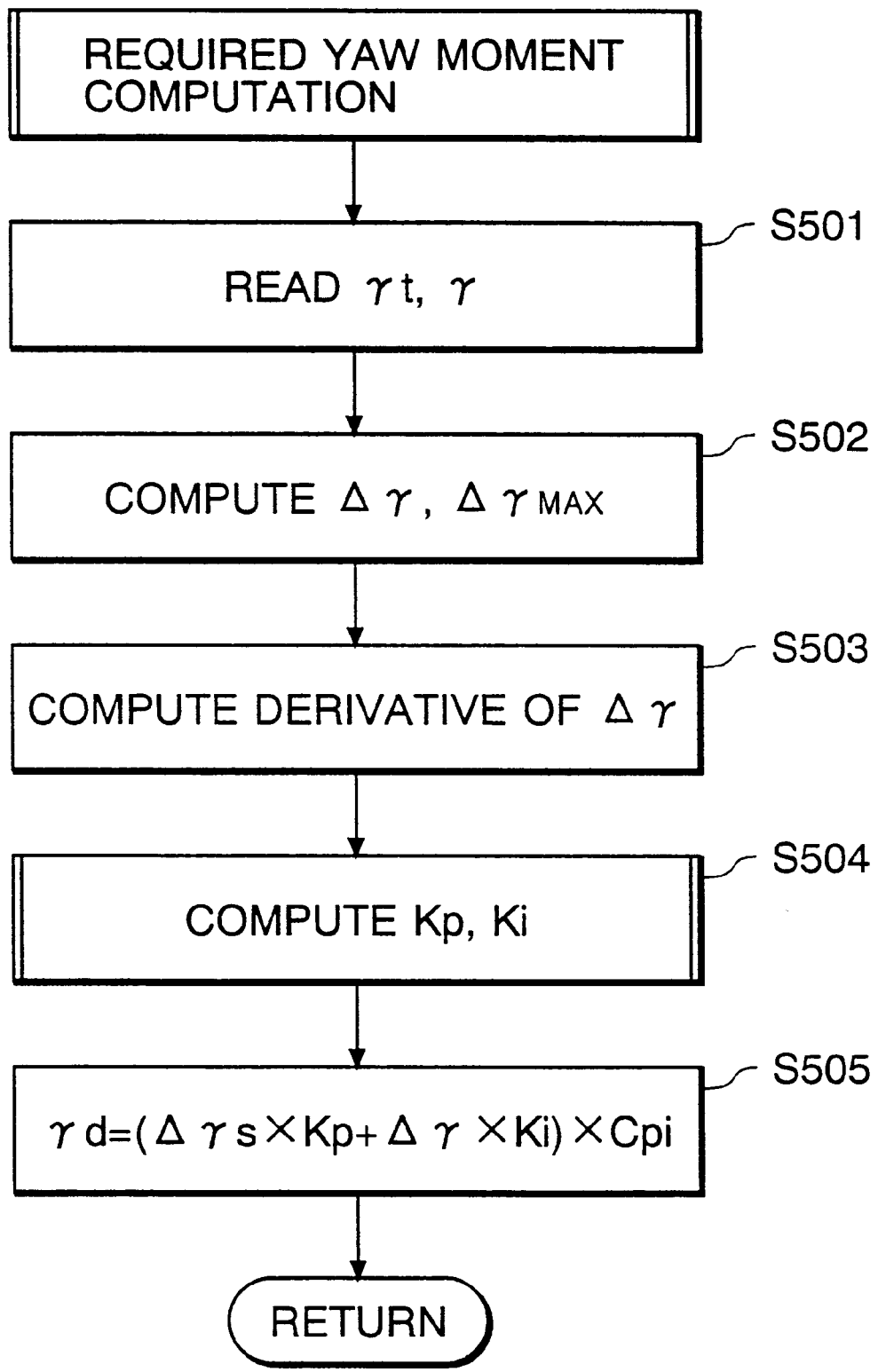
FIG. 11 is a flowchart showing a required yaw moment computation routine.

As seen from FIG. 10, the operation block 41 has a subtractor section 48. In this subtractor section 48, the difference between the target yaw rate $γ_t$ and the yaw rate γ, that is, a yaw rate deviation Δγ is computed. The computation procedure for the yaw rate deviation Δγ is shown in Steps S501 and S502 in the flowchart shown in FIG. 11.

Step S502 will be described in detail. The sign of the yaw rate deviation Δγ is inverted so that it is positive on the understeer (US) side and negative on the oversteer (OS) side when the vehicle turns counterclockwise. The vehicle turn direction is determined by the value of the aforesaid turn flag $F_d$.

Further in Step S502, a maximum yaw rate deviation $Δγ_{MAX}$ is computed according to the following equation by filtering the absolute value of the yaw rate deviation Δγ.

$$Δγ_{MAX} LPF(|Δγ|) \qquad (30)$$

The cutoff frequency $f_c$ used in this filtering varies depending on whether the yaw rate deviation Δγ is increased or decreased. For example, when the yaw rate deviation Δγ is increased, $f_c$ is set at 10 Hz, while when the yaw rate deviation Δγ is decreased, $f_c$ is set at 0.08 Hz.

When the yaw moment control, mentioned later, is finished (or when the value of a yaw moment control on-off flag $F_{ym}$ is 0), the absolute value of the yaw rate deviation Δγ is given to the maximum yaw rate deviation $Δγ_{MAX}$ as follows:

$$Δγ_{MAX} = |Δγ| \qquad (31)$$

Next, the yaw rate deviation Δγ is supplied to a differentiator section 50 (FIG. 10). In the differentiator section 50, the finite difference of the yaw rate deviation Δγ, that is, a yaw rate deviation derivative $Δγ_s$ is computed. Subsequently, the derivative $Δγ_s$ is filtered ($f_c$=5 Hz). That is, in the ECU 23, the yaw rate deviation derivative $Δγ_s$ is computed as follows:

$$Δγ_s = LPF(Δγ − Δγ_m) \qquad (32)$$

In the equation (32), $Δγ_m$ is a yaw rate deviation computed in the preceding computation routine. As explained regarding the yaw rate deviation $\Delta\gamma$, the sign of the yaw rate deviation derivative $\Delta\gamma_s$ is inverted when the vehicle turns counterclockwise.

The computation of the yaw rate deviation derivative $\Delta\gamma_s$ is carried out in Step S503 in the flowchart shown in FIG. 11.

Thereafter, the yaw rate deviation derivative $\Delta\gamma_s$ is supplied to a multiplier section 52, where the derivative $\Delta\gamma_s$ is multiplied by a proportional gain $K_P$, as shown in FIG. 10. Also, the yaw rate deviation $\Delta\gamma$ is supplied to a multiplier section 54, where the yaw rate deviation $\Delta\gamma$ is multiplied by an integral gain $K_i$. The outputs from the multiplier sections 52 and 54 are added in an adder section 56.

Further, the output from the adder section 56 is supplied to a multiplier section 58. In this multiplier section 58, the output of the adder section 56 is multiplied by a correction value $C_{pi}$, whereupon the required yaw moment $\gamma_d$ is computed. Therefore, in the ECU 23, the required yaw moment $\gamma_d$ is computed as follows:

$$\gamma_d = (\Delta\gamma_s \times K_p + \Delta\gamma \times K_i) \times C_{pi} \qquad (33)$$

The correction value $C_{pi}$ is set to a different value depending on whether the vehicle is braked or not. For example, the correction value $C_{pi}$ is set as follows:

When the vehicle is braked ($F_b=1$), $C_{pi}=1.0$
When the vehicle is not braked ($F_b=0$), $C_{pi}=1.5$ The computation of the required yaw moment $\gamma_d$ is carried out in Steps S504 and S505 in the flowchart shown in FIG. 11. In Step S504, the proportional and integral gains $K_p$ and $K_i$ are computed. The details of the computation of the proportional gain $K_p$ is shown in FIG. 12.

Figure 12:
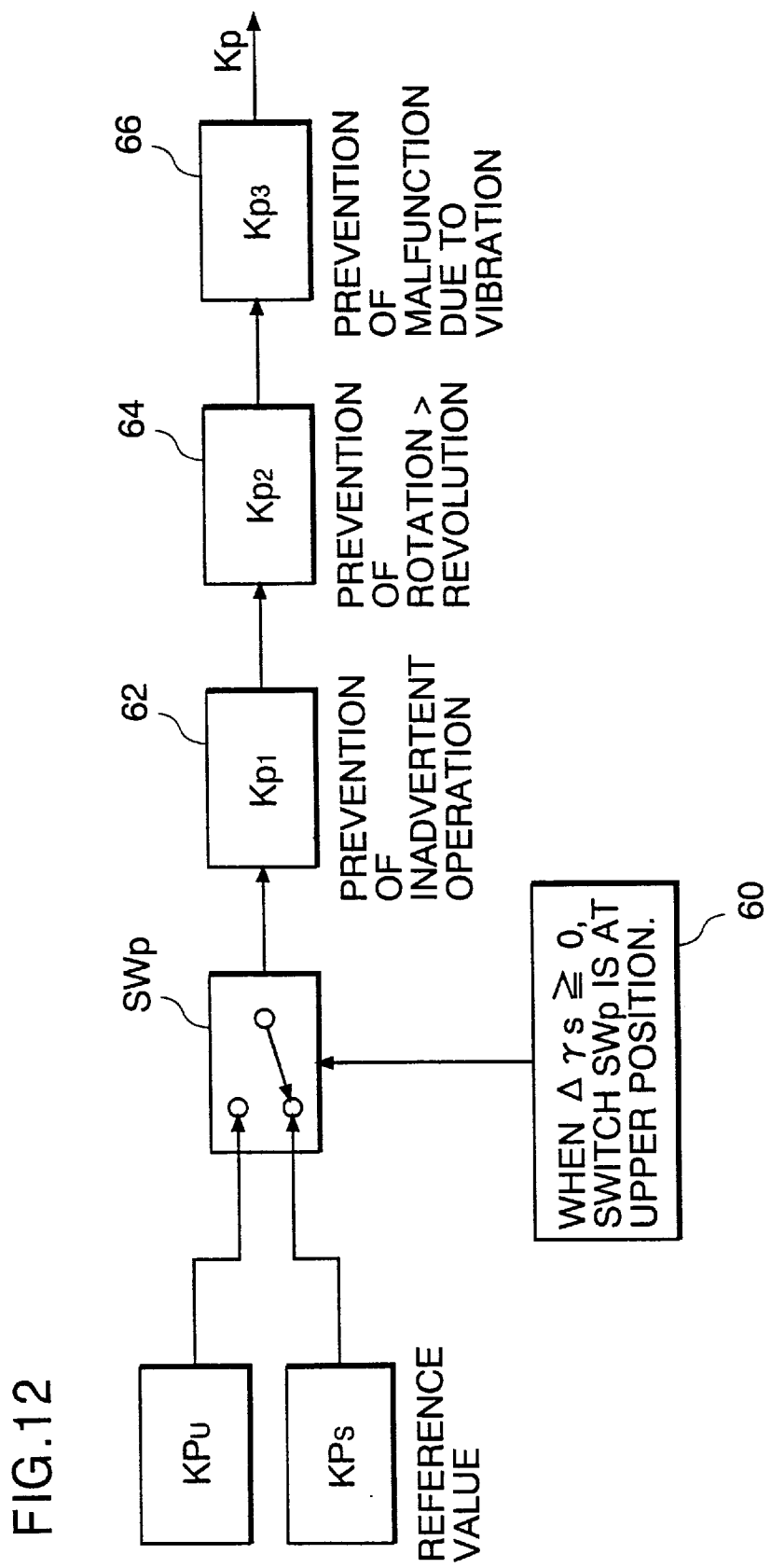
FIG. 12 is a block diagram for determining a proportional gain for the computation of a required yaw moment.

As seen from FIG. 12, in computing the proportional gain $K_p$, the ECU 23 has different reference values $K_p$, (e.g., 4 kgm/s/(deg/s²)) and $K_{po}$, (e.g., 5 kgm/s/(deg/s²)) depending on whether the vehicle turns on the understeer side or on the oversteer side. A switch $Sw_p$ is used for the selection between the values $K_{pu}$ and $K_{po}$.

The switch $Sw_p$ is shifted in response to a determination signal delivered from a determination section 60. The determination section 60 delivers a determination signal such that the switch $Sw_p$ is shifted to the side of the reference value $K_{pu}$, when in the understeer mode in which the yaw rate deviation derivative $\Delta\gamma_s$ is 0 or more.

The reference value outputted from the switch $Sw_p$ is multiplied successively by correction factors $K_{p1}$, $K_{p2}$ and $K_{p3}$ in multiplier sections 62, 64 and 66, respectively, whereby the proportional gain $K_p$ is obtained.

Thus, the proportional gain $K_p$ is computed as follows in accordance with the turn characteristic of the vehicle.

$K_p = K_{pu} \times K_{p1} \times K_{p2} \times K_{p3}$ (understeer mode)

$K_p = K_{po} \times K_{p1} \times K_{p2} \times K_{p3}$ (oversteer mode)

If the vehicle body is subjected to the yaw moment control before the vehicle reaches its critical travel region, it will inevitably make the driver feel uneasy. To avoid this, the proportional gain $K_p$ is corrected by the correction factor $K_{p1}$ only when the yaw rate deviation $\Delta\gamma$ or the lateral $G_Y$ of the vehicle body is large. As a result, the proportional gain $K_p$ functions effectively. Specifically, correction factor $K_{p1}$ is computed according to the computation routine shown in FIG. 13.

Figure 13:
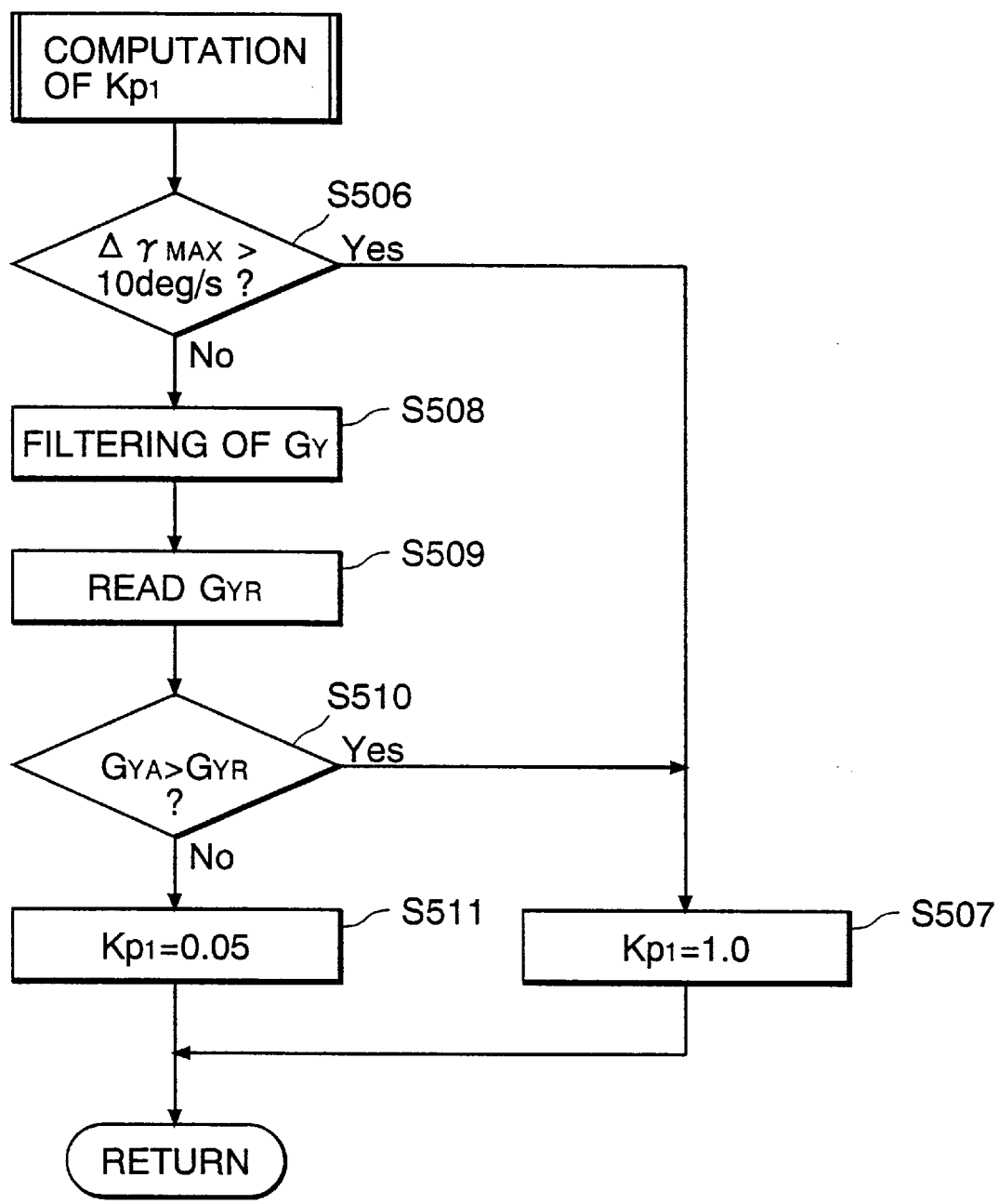
FIG. 13 is a flowchart showing a correction factor computing routine for the computation of a proportional gain.

In the computation routine shown in FIG. 13, it is first determined whether or not the maximum yaw rate deviation $\Delta\gamma_{MAX}$ exceeds 10 deg/s (Step S506). If the result of this determination is Yes, 1.0 is set in the correction factor $K_{p1}$ (Step S507).

If the result of the determination in Step S506 is No, the absolute value of the lateral $G_Y$ acting on the vehicle body is filtered as follows, and the average lateral $G_{YA}$ is computed (Step S508).

$$G_{YA} \text{LPF}(|G_Y|)$$

For the cutoff frequency $f_c$ in this filtering, $f_c$ is set at 20 Hz when the lateral $G_Y$ tends to be increased, and at 0.23 Hz when the lateral $G_Y$ tends to be decreased.

Figure 14:
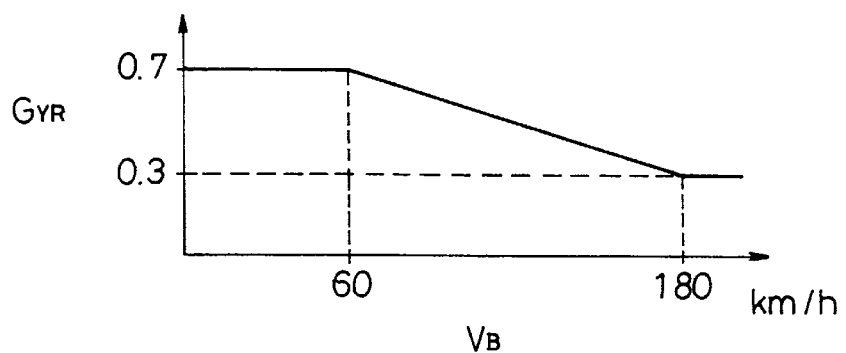
FIG. 14 is a graph showing the relation between vehicle body velocity and reference lateral acceleration.

Thereafter, a reference lateral acceleration $G_{YR}$ is computed in accordance with the vehicle body velocity $V_B$ (Step S509). Specifically, a map as shown in FIG. 14 has been stored in advance in the memories of the ECU 23, and the reference lateral $G_{YR}$ is read from this map based on the vehicle body velocity $V_B$. Since the travel of the vehicle becomes unstable easily as the vehicle body velocity $V_B$ increases, as seen from a map in FIG. 14, the reference lateral $G_{YR}$ is decreased gradually with the increase in the vehicle body velocity $V_B$ in the high-speed region.

After the average lateral $G_{YA}$ and the reference lateral G are computed as described above, it is determined whether or not the average lateral $G_{YA}$ is larger than the reference lateral $G_{YR}$ (Step S510). If the result of this determination is Yes, 1.0 is set in the correction factor $K_{p1}$ (Step S507). If the result of the determination in Step S510 is No, 0.05 is set in the correction factor $K_{p1}$ (Step S511).

The correction factor $K_{p2}$ is used to correct the proportional gain $K_p$ for the following reason. If the actual yaw rate $\gamma$ is made simply to follow up the target yaw rate $\gamma_t$ in the case where the friction coefficient of road surface is low, that is, the vehicle is running on a low-$\mu$ road, the lateral force acting on the vehicle body of (a) in FIG. 15 immediately reaches its critical value, and the gravity-center slip angle $\beta$ of the vehicle body increases suddenly, so that the vehicle body of (a) may possibly spin.

Figure 15:
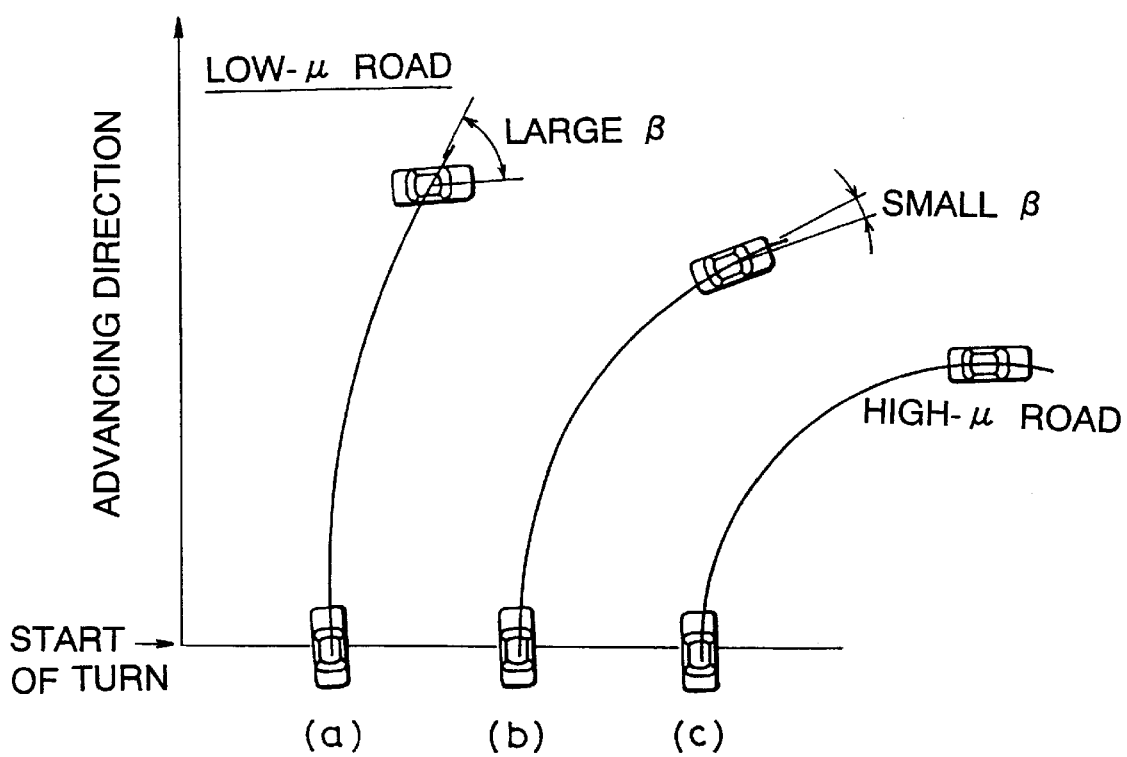
FIG. 15 is a view for illustrating the turn behavior of a vehicle in relation to a gravity-center slip angle β when the vehicle is turned.

Therefore, if the proportional gain $K_p$ is corrected by the correction factor $K_{p2}$ set appropriately, it is believed that the gravity-center slip angle $\beta$ of the vehicle body is kept small, so that the vehicle body can be prevented from spinning, as shown in the vehicle in FIG. 15(b). FIG. 15 (c) shows a vehicle running on high-$\mu$ road.

Figure 16:
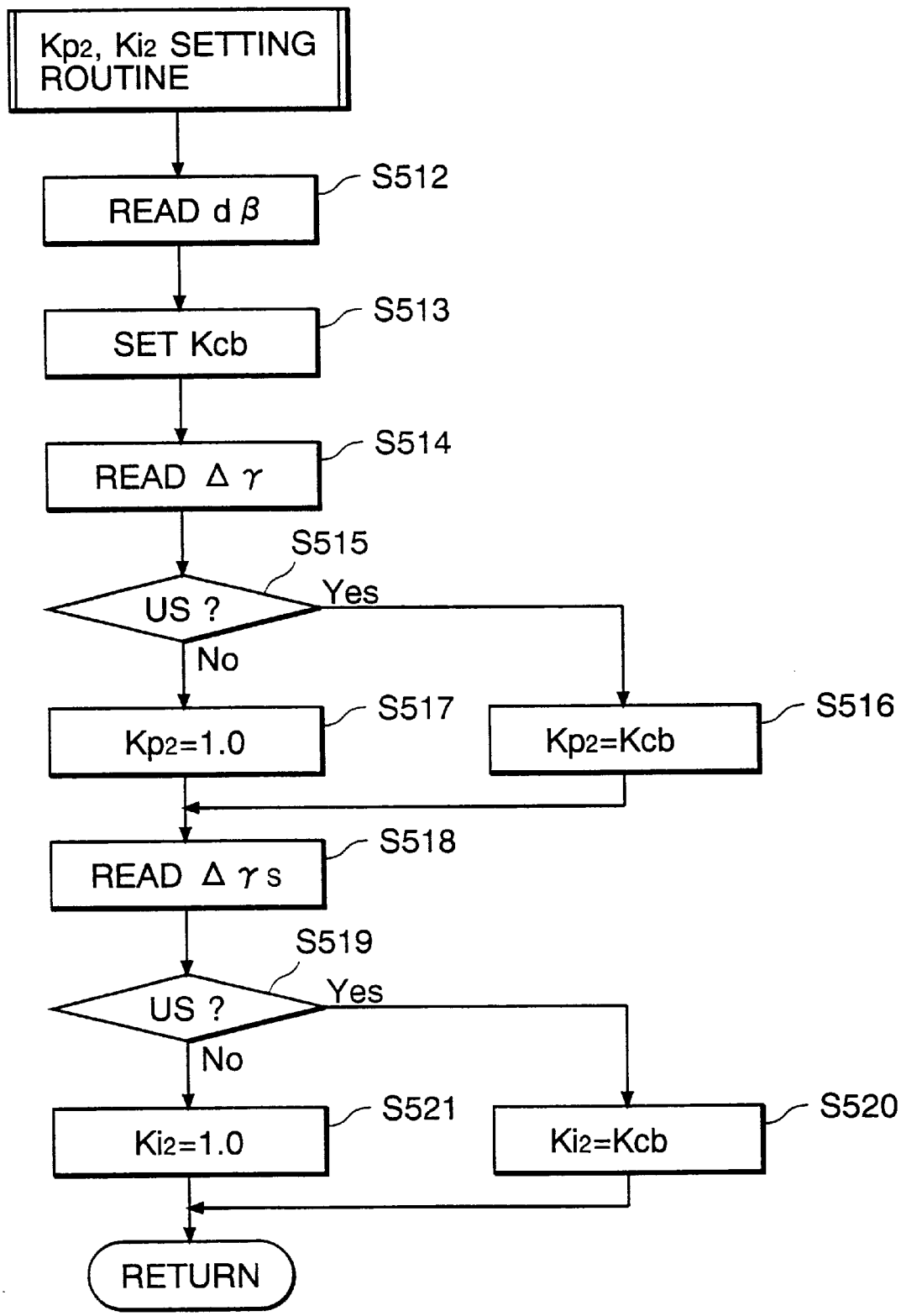
FIG. 16 is a flowchart showing a correction factor computation routine in relation to a proportional gain and integral gain.
Figure 17:
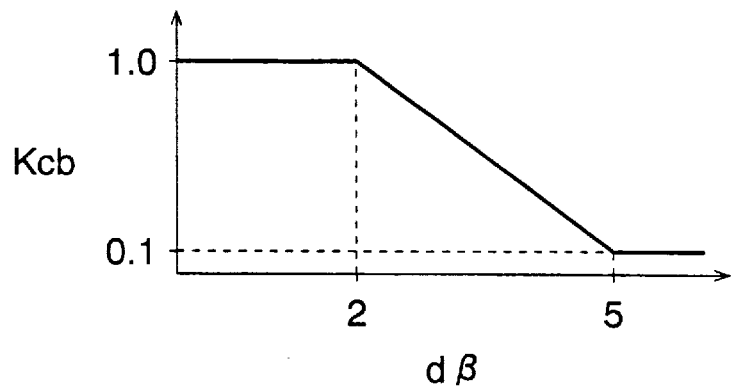
FIG. 17 is a graph showing the relation between gravity-center slip angular velocity and reference correction factor.

Specifically, the correction factor $K_{p2}$ is determined by the setting routine shown in FIG. 16. In this setting routine, the gravity-center slip angular velocity $d\beta$ is first read (Step S512), and then a reference correction factor $K_{cd}$ is read from a map shown in FIG. 17 based on the gravity-center slip angular velocity $d\beta$ (Step S513). As seen from the map in FIG. 17, for example, the reference correction factor $K_{cd}$ has a characteristic of decreasing gradually from the maximum value (1.0) when the gravity-center slip angular velocity $d\beta$ becomes higher than 2 deg/s and being kept at the minimum value (0.1) when the gravity-center slip angular velocity $d\beta$ becomes 5 deg/s and over.

In the next Step S514, the yaw rate deviation $\Delta\gamma$ is read, and whether or not the turn of the vehicle is in an understeer (US) mode is determined according to the sign of the yaw rate deviation $\Delta\gamma$ (Step S515). If the result of this determination is Yes, the reference correction factor $K_{cd}$ is set in the correction factor $K_{p2}$ (Step S516). If the result of the determination is No, 1.0 is set in the correction factor $K_{p2}$ (Step S517). That is, when the turn of the vehicle is in an understeer mode, the correction factor $K_{p2}$ is set based on the gravity-center slip angular velocity $d\beta$. When the turn of the vehicle is in an oversteer mode, the correction factor $K_{p2}$ is set at a constant 1.0. The subsequent steps from Step S518 in the flowchart shown in FIG. 16 will be described later.

The correction factor $K_{p3}$ is used to correct the proportional gain $K_p$ for the following reason. When the vehicle is running on a rough road, a vibration component is added to the output of the yaw rate sensor 30, that is, the yaw rate $\gamma$. The vibration component of the yaw rate $\gamma$ is amplified when the yaw rate deviation derivative $\Delta\gamma_s$ is computed, so that the derivative $\Delta\gamma_s$, that is, the required yaw moment $\gamma_d$ is not computed accurately. As a result, erroneous operation may occur in the control using the required yaw moment $\gamma_d$, or the stability of the control may be impaired. Accordingly, the correction factor $K_{p3}$ is used to decrease the proportional gain $K_p$ in order to eliminate an effect of the vibration component on the derivative $\Delta\gamma_s$.

Figure 18:
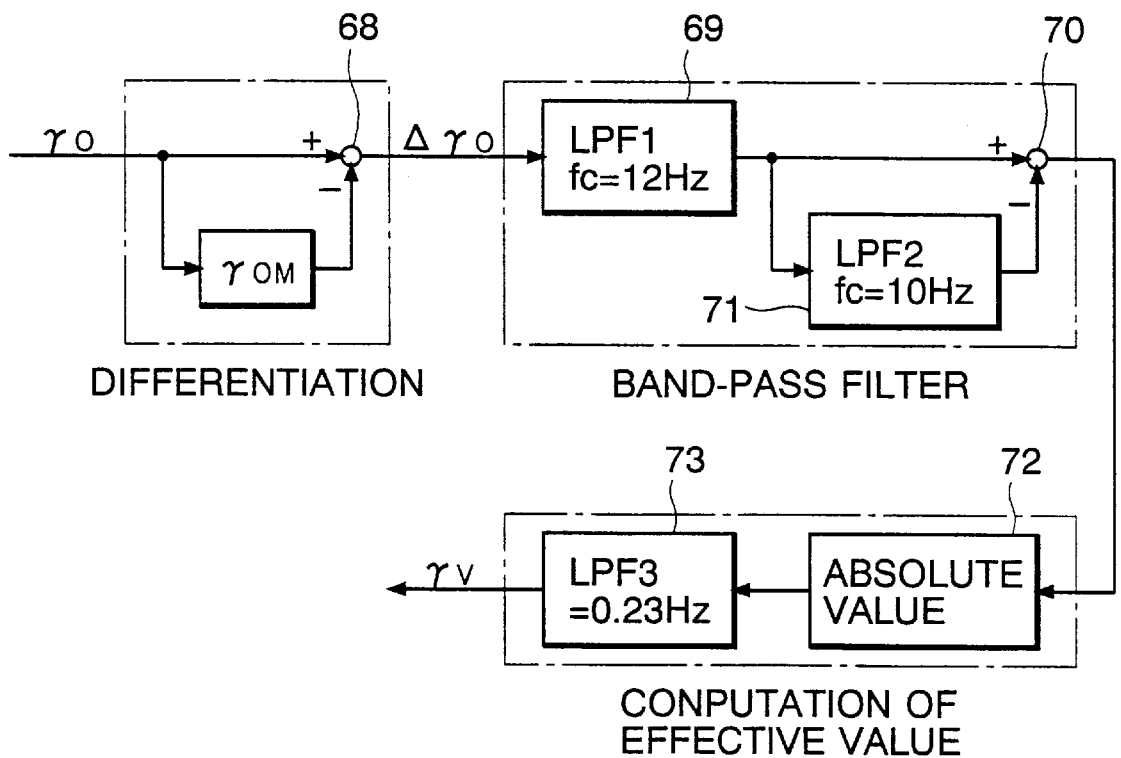
FIG. 18 is a block diagram for computing the vibration component of yaw rate.

To determine the correction factor $K_{p3}$, a vibration component $\gamma_v$ of yaw rate is first computed. As shown in the block diagram shown in FIG. 18, a yaw rate $\gamma_0$, which is the output from the yaw rate sensor 30, and a yaw rate $\gamma_{OM}$ obtained in the preceding setting routine (FIG. 19) are supplied to a subtractor section 68 (Step S522 in FIG. 19). In this subtractor section 68, a deviation between the yaw rate $\gamma_0$ and the yaw rate $Y_{OM}$, that is, a derivative $\Delta\gamma_0$ is computed.

Subsequently, the derivative $\Delta\gamma_0$ is filtered ($f_c=12$ Hz) in a first filter section 69, and supplied to a subtractor section 70. The output of the first filter section 69 is filtered ($f_c=10$ Hz) in a second filter section 71, and supplied to the subtractor section 70. In the subtractor section 70, a deviation between two filtered derivatives $\Delta\gamma_0$ is computed, and the deviation is outputted to an operation section 72. In this operation section 72, the absolute value of the derivative deviation is determined, and this absolute value of the deviation is filtered ($f_c=0.23$ Hz) in a third filter section 73. As a result, the vibration component $\gamma_v$ of yaw rate is outputted from the third filter section 73 (Step S523 in FIG. 19). Therefore, the vibration component $\gamma_v$ of yaw rate is computed by the following two equations.

$$\Delta\gamma_0 = \gamma_0 - \gamma_{OM} \quad (34)$$

$$\gamma_v = LPF3(|LPF1(\Delta\gamma_0) - LPF2(\Delta\gamma_0)|) \quad (35)$$

Figure 19:
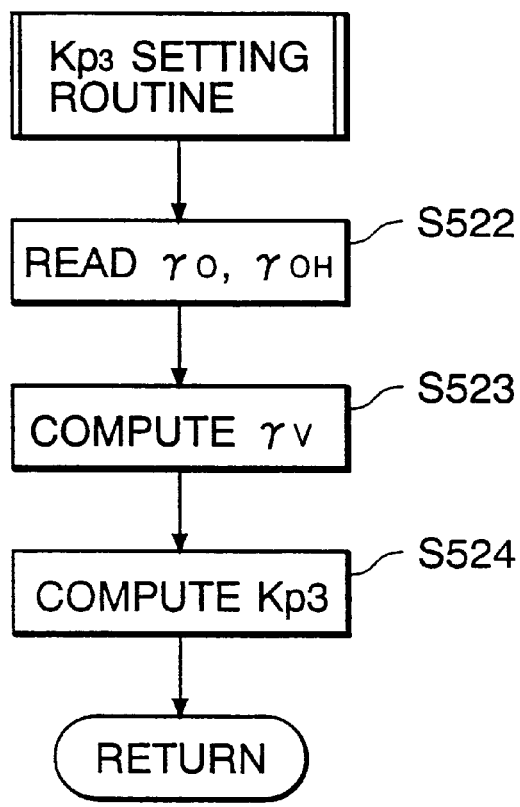
FIG. 19 is a flowchart showing a correction factor computation routine in relation to a proportional gain.
Figure 20:
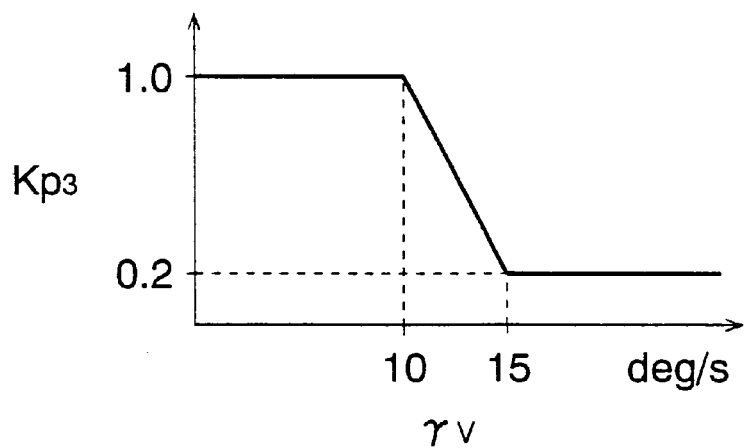
FIG. 20 is a graph showing the relation between vibration component of yaw rate and correction factor.

Next, as indicated in Step S524 in FIG. 19, the correction factor $K_{p3}$ is computed based on the vibration component $\gamma_v$ of yaw rate. Specifically, a map as shown in FIG. 20 has been stored in advance in the memories of the ECU 23, and the correction factor $K_{p3}$ is read based on the vibration component $\gamma_v$ of yaw rate. As seen from the map in FIG. 20, for example, the correction factor $K_{p3}$ has a characteristic of decreasing suddenly from 1.0 with the increase in the vibration component $\gamma_v$ when the vibration component $\gamma_v$ of yaw rate becomes larger than 10 deg/s, and being kept at a constant value of 0.2 when the vibration component $\gamma_v$ becomes 15 deg/s and over.

Figure 21:
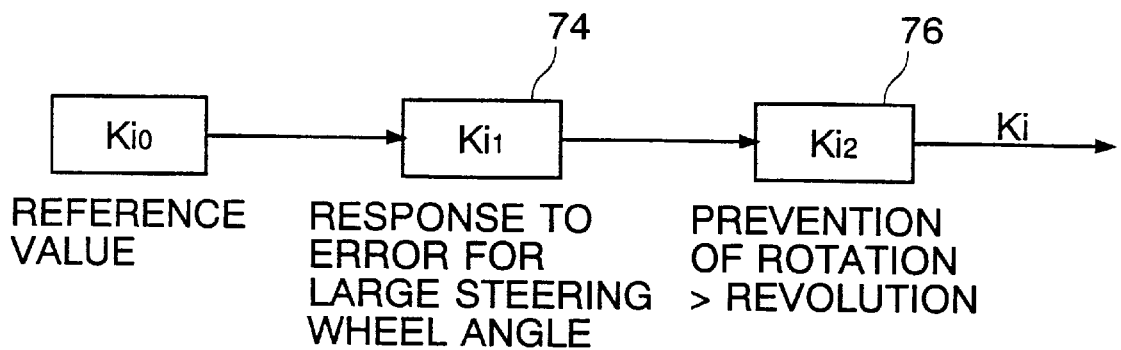
FIG. 21 is a block diagram for determining an integral gain for the computation of a required yaw moment.

Next, the computation of the aforesaid integral gain $K_i$ is shown in a block diagram of FIG. 21. In this block diagram too, as in the case of computation of the proportional gain $K_p$, a reference integral gain $K_{i0}$ (e.g., 10 kgm/s/(deg/s$^2$)) is prepared in advance for use. The reference integral gain $K_{i0}$ is multiplied by a correction factor $K_{i1}$ in a multiplier section 74, and the output of the multiplier section 74 is multiplied by a correction factor $K_{i2}$ in the multiplier section 76. The output from this multiplier section 76 is the integral gain $K_i$. Thus, the integral gain $K_i$ is computed as follows:

$$K_i = K_{i0} \times K_{i1} \times K_{i2} \quad (36)$$

The correction factor $K_{i1}$ is used to reduce the integral gain $K_i$ for the following reason. If the front-wheel steering angle increases, an error in the target yaw rate $\gamma_t$, that is, an error in the yaw rate deviation $\Delta\gamma$ further enlarges, possibly entailing erroneous operation of control using the yaw rate deviation. In this situation, therefore, the integral gain $K_i$ is reduced by means of the correction factor $K_{i0}$.

Figure 22:
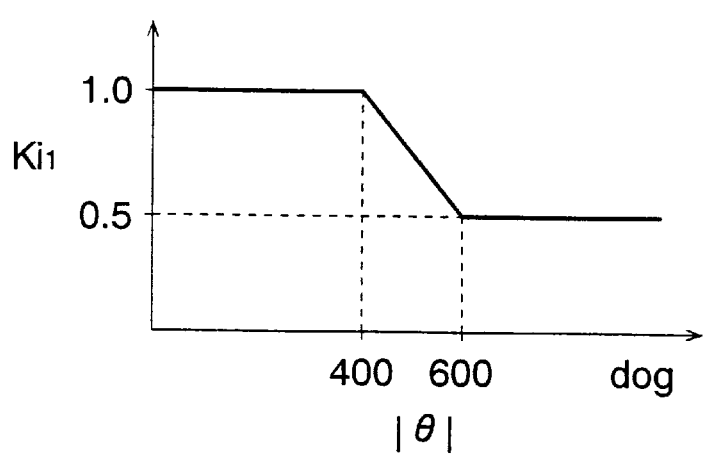
FIG. 22 is a graph showing the relation between absolute value of steering wheel angle θ and correction factor of integral gain.

Specifically, the correction factor $K_{i1}$ is set based on the steering wheel angle $\theta$ from a map shown in FIG. 22. As seen from FIG. 22, the correction factor $K_{i1}$ has a characteristic of decreasing suddenly from the maximum value with the increase in the steering wheel angle $\theta$ when the absolute value of the steering wheel angle $\theta$ is as large as 400 deg and being kept at the minimum value of 0.5 when the steering wheel angle $\theta$ becomes 600 deg and over.

The correction factor $K_{i2}$ is used to reduce the integral gain $K_i$ for the same reason for the case of the correction factor $K_{p2}$ for the proportional gain $K_p$. Therefore, the computation procedure for the correction factor $K_{i2}$ is shown together with the setting routine for the correction factor $K_{p2}$ in FIG. 16.

In Step S518 in FIG. 16, the yaw rate deviation derivative $\Delta\gamma_s$ is read, and whether or not the turn of the vehicle is in an understeer mode is determined according to the sign of the derivative $\Delta\gamma_s$ (Step S519). If the result of this determination is Yes, the aforesaid reference correction factor $K_{cd}$ (see FIG. 17) is set in the correction factor $K_{i2}$ (Step S520). If the result of the determination is No, 1.0, which is the maximum value, is set in the correction factor $K_{i2}$.

Yaw moment control of vehicle

When the required yaw moment $\gamma_d$ is computed in the aforementioned manner, the yaw moment control is carried out in Step S6 in the main routine shown in FIG. 4, that is, in an operation block 78 in FIG. 3. The detail of the operation block 78 is shown in FIG. 23.

Figure 23:
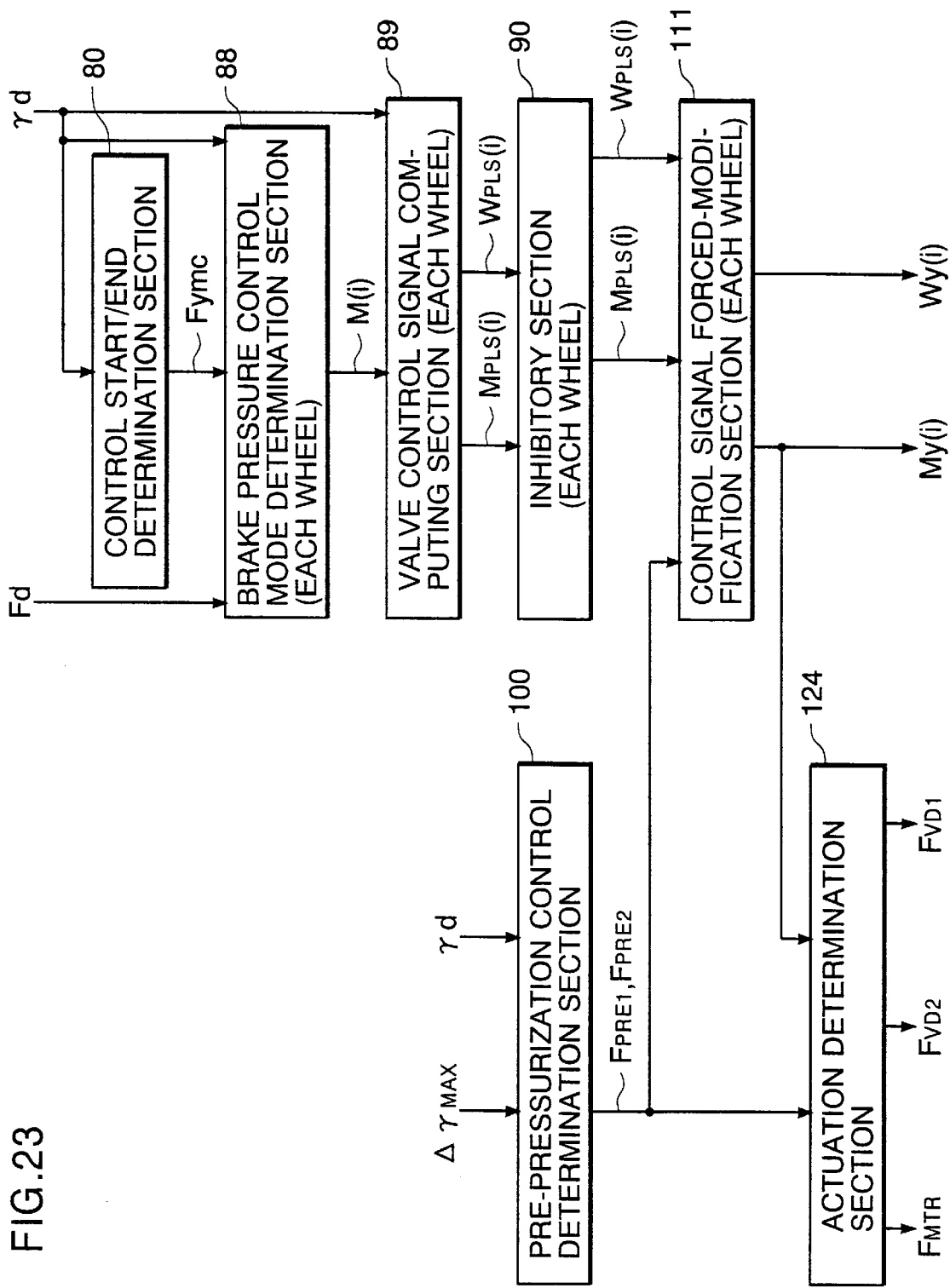
FIG. 23 is a diagram showing the details of a yaw moment control section shown in FIG. 3.

First, the operation block 78 in FIG. 23 has a determination section 80 for determining the start or end of the yaw moment control. In this determination section 80, an on-off flag $F_{ymc}$ is settled in accordance with the required yaw moment $\gamma_d$.

Figure 24:
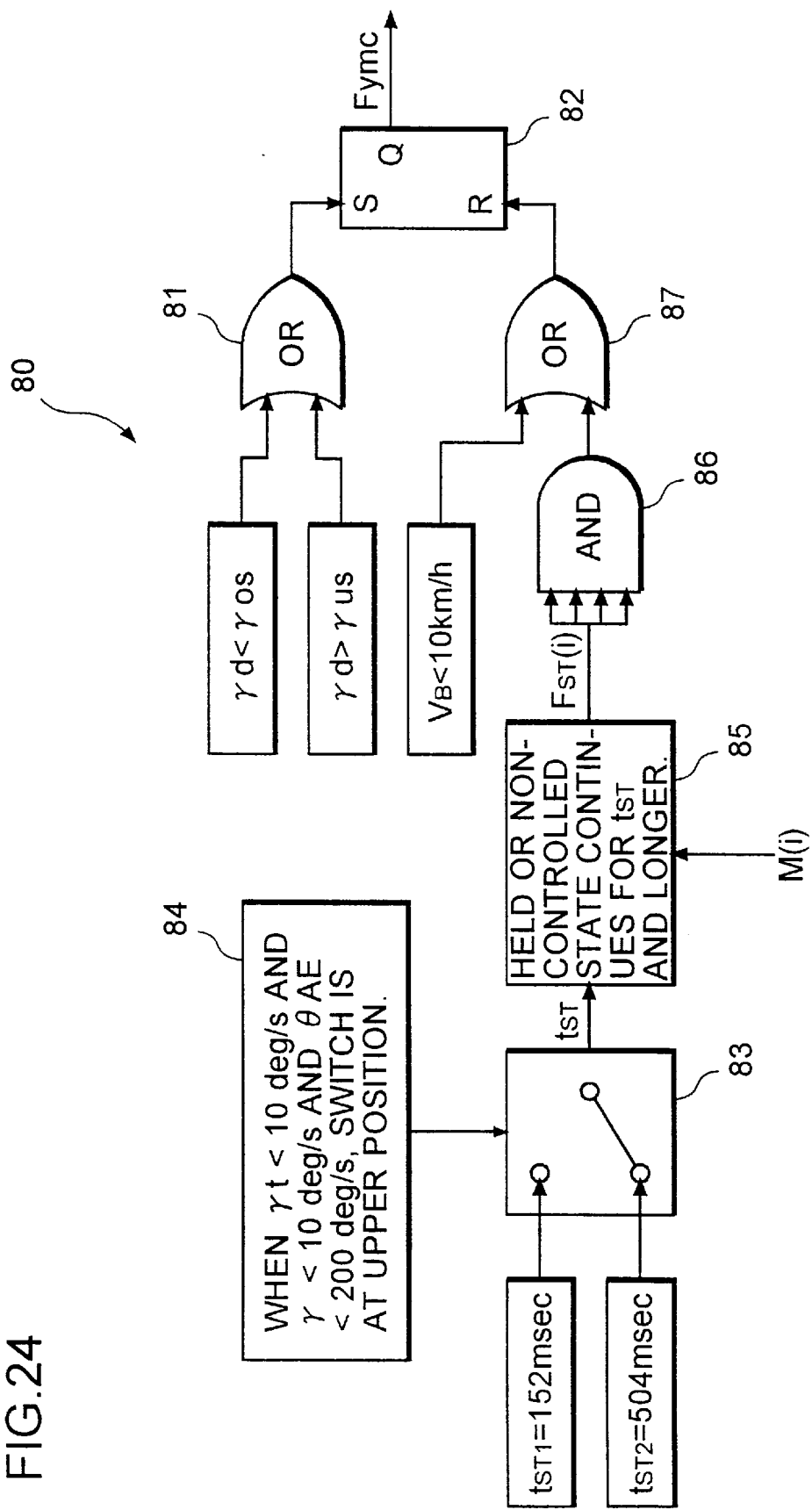
FIG. 24 is a diagram showing the details of an on-off determination section shown in FIG. 23.

Specifically, the on-off flag $F_{ymc}$ is settled in a determination circuit shown in FIG. 24. This determination circuit includes an OR circuit 81 having two input terminals, and on- and off-signals corresponding to the required yaw moment $\gamma_d$ are applied to the input terminals of the OR circuit 81. More specifically, the on-signal is applied to one input terminal of the OR circuit 81 if the required yaw moment $\gamma_d$ is lower than a threshold value $\gamma_{os}$ (e.g., $-100$ kgm/s) on the oversteer side. If the required yaw moment $\gamma_d$ is higher than another threshold value $\gamma_{us}$ (e.g., 200 kgm/s) on the understeer side, on the other hand, the on-signal is applied to the other input terminal of the OR circuit 81. Thus, if either of the threshold values are exceeded by the required yaw moment $\gamma_d$, the on-signal is delivered from the output terminal of the OR circuit 81, and is applied to the set terminal S of a flip-flop 82. Inconsequence, the on-off flag $F_{ymc}$, i.e. on-off flag $F_{ymc}$ (=1) indicative of the start of control in this case, is outputted from the output terminal Q of the flip-flop 82.

The absolute value (100 kgm/s) of the threshold value $\gamma_{os}$ on the oversteer side is smaller than the absolute value (200 kgm/s) of the threshold value $\gamma_{us}$ on the understeer side. Thus, the output timing for the on-off flag $F_{ymc}$ (=1) is earlier on the oversteer side than the understeer side. That is, the start timing for the yaw moment control is earlier on the oversteer side than on the understeer side as described later.

The reset terminal R of the flip-flop 82 can be supplied with a reset signal, which settles the reset timing for the on-off flag $F_{ymc}$, that is, the timing for the delivery of the flag $F_{ymc}=0$ from the flip-flop 82.

As shown in FIG. 24, a circuit for generating the reset signal includes a switch 83, which has two input terminals. A first determination time $t_{ST1}$ (e.g., 152 msec) is supplied to one input terminal of the switch 83, and a second determination time $t_{ST2}$ (e.g., 504 msec) to the other input terminal.

The switch 83 can be shifted in response to a switching signal delivered from a determination section 84. When the behavior of the vehicle body is stable, that is, if all the following conditions are fulfilled, the determination section 84 delivers a switching signal to the switch 83 so that the switch 83 is shifted to output the first determination time $t_{ST1}$ as an end determination time $t_{ST}$. However, if any of these conditions is not fulfilled, the second determination time $t_{ST2}$ is outputted as the end determination time $t_{ST}$.

Condition 1: target yaw rate $\gamma_t$<10 deg/s
Condition 2: yaw rate $\gamma$<10 deg/s
Condition 3: effective steering wheel angular velocity value $\theta_{AE}$<200 deg/s Next, the end determination time $t_{ST}$ is supplied to a determination section 85. In this determination section 85, it is indicated that a brake pressure control signal is in a held state or a noncontrolled state (control mode M(i), mentioned later, is in a hold mode or noncontrol mode) for the control of brake pressure of each wheel, and it is determined whether the state continues for the end determination time $t_{ST}$ and longer. If the result of this determination is Yes, the determination section 85 outputs an end indication flag $F_{ST}(i)$=1. If the result is No, the determination section 85 outputs an end indication flag $F_{ST}(i)$=0. Character i suffixed to each end indication flag $F_{ST}$ represents the aforesaid wheel number. The control signal for controlling the brake pressure for each wheel will be mentioned later.

The end indication flags $F_{ST}(i)$ are supplied individually to the input terminals of an AND circuit 86. The output terminal of the AND circuit 86 is connected to one input terminal of an OR circuit 87. The other input terminal of the OR circuit 87 is supplied with an on-signal when the vehicle body velocity $V_B$ is lower than 10 km/h. The output terminal of the OR circuit 87 is connected to the reset terminal R of the flip-flop 82.

The AND circuit 86 supplies the on-signal to the OR circuit 87 when all input signals are on, that Is, all values of the end indication flag $F_{ST}(i)$ are 1. The OR circuit 87 supplies an on-signal to the reset terminal R of the flip-flop 82 when one of the input signal thereto is the on-signal. Thus, the reset signal is supplied to the flip-flop 82 if the vehicle body velocity $V_B$ is lower than 10 km/h or if the brake pressure control signal fulfills the aforesaid conditions for any of the four wheels.

When the reset signal is given to the flip-flop 82, the flip-flop 82 outputs the on-off flag $F_{ymc}$(=0), which is indicative of the termination of the-control.

As shown in FIG. 23, the determination section 80 supplies the on-off flag $F_{ymc}$ to a brake pressure control mode determination section 88. In this determination section 88, the brake pressure control mode for each wheel is selected in accordance with the required yaw moment $\gamma_d$ and the turn flag $F_d$ in the case where the value of the supplied on-off flag $F_{ymc}$ is 1.

Figure 25:
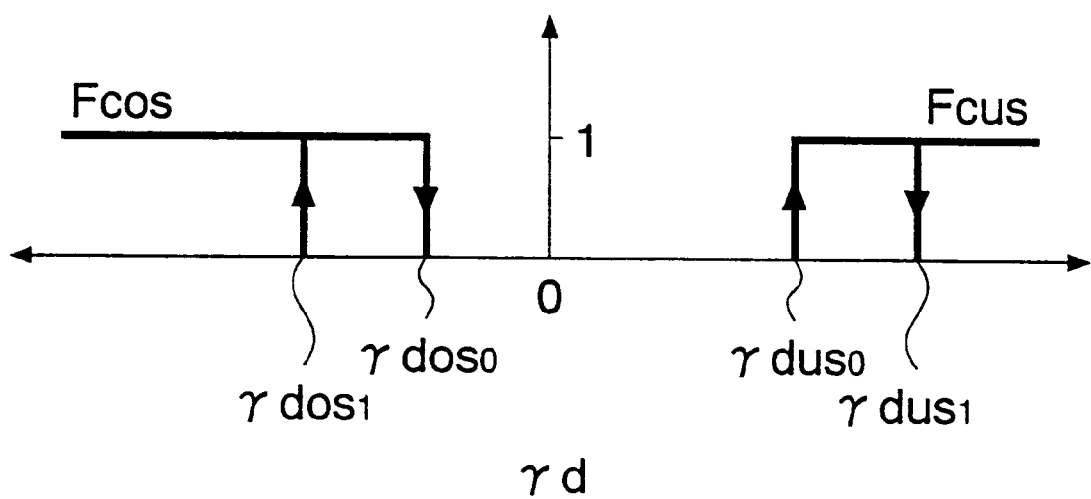
FIG. 25 is a graph showing a setting reference for control execution flag.

Specifically, brake pressure control execution flags $F_{cus}$ and $F_{cos}$ are first set from the map shown in FIG. 25 based on the required yaw moment $\gamma_d$ compared with its threshold values. The control execution flag $F_{cus}$ is a flag in the understeer mode of vehicle turn, and the control execution flag $F_{cos}$ is a flag in the oversteer mode of vehicle turn.
Understeer mode:

$F_{cus}$=1 when $\gamma_d$>$\gamma_{dUS1}$ (=100 kgm/s)

$F_{cus}$=0 when $\gamma_d$<$\gamma_{dUS0}$ (=80 kgm/s)

Oversteer mode:

$F_{cos}$=1 when $\gamma_d$<$\gamma_{dOS1}$ (=−80 kgm/s)

$F_{cos}$=0 when $\gamma_d$>$\gamma_{dOS0}$ (=−60 kgm/s)

Figure 26:
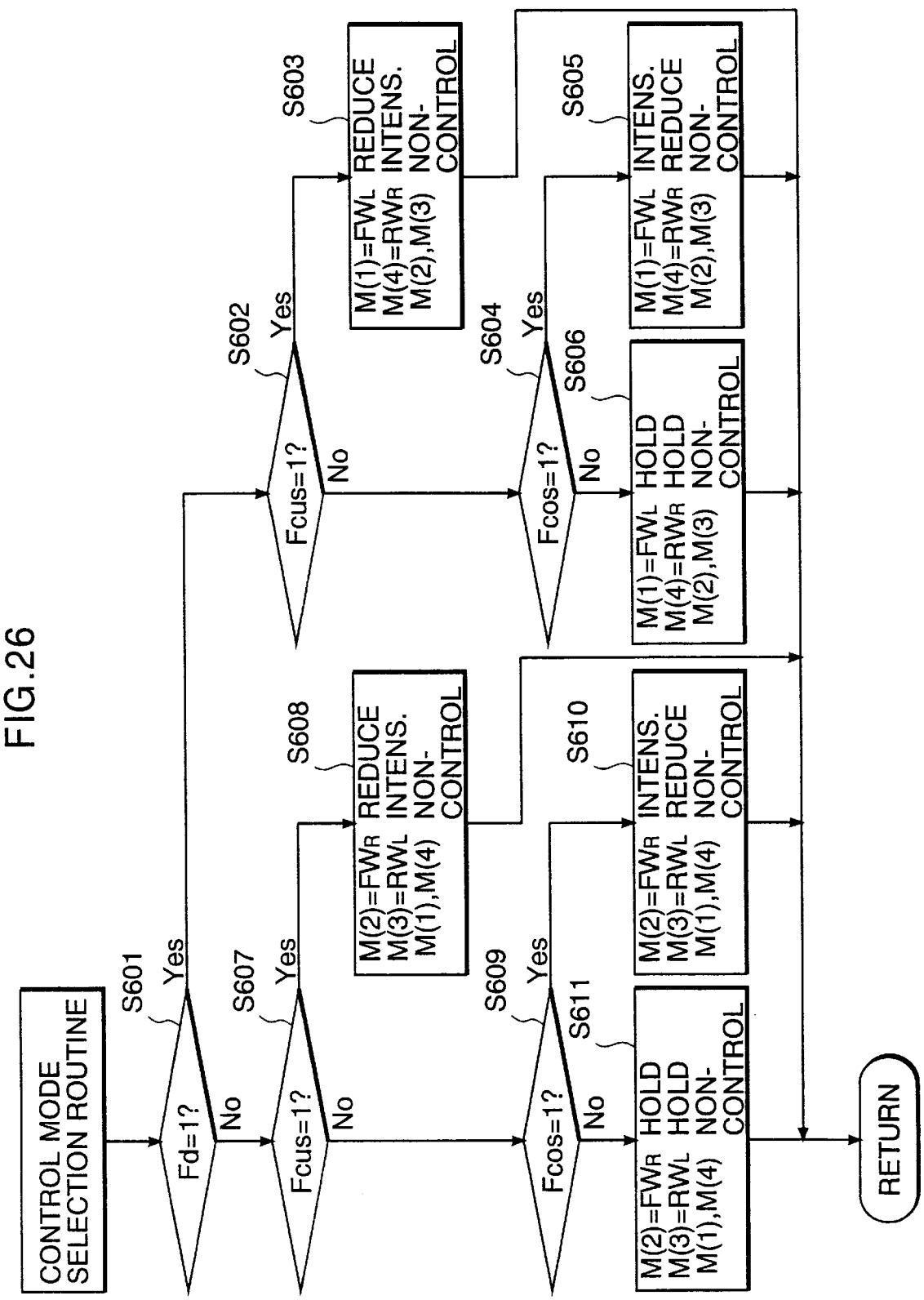
FIG. 26 is a flowchart showing a control mode selection routine.

Next, the brake pressure control modes M(i) for the individual wheels are selected in accordance with the combination of the turn flag $F_d$ and the control execution flags $F_{cus}$ and $F_{cos}$. FIG. 26 shows a selection routine for these control modes.

In the control mode selection routine of FIG. 26, it is first determined whether or not the value of the turn flag $F_d$ is 1 (Step S601). If the result of this determination is Yes, that is, if it is concluded that the vehicle is turning clockwise, it is determined whether or not the value of the control execution flag $F_{cus}$ is 1 (Step S602). If the result of determination in Step S602 is Yes, then the vehicle turning clockwise has a marked tendency to understeer, and the required yaw moment $\gamma_d$ is at a great value greater than the threshold value $\gamma_{dUS1}$, so that the vehicle requires a turning moment. In the next Step S603, therefore, the control mode M(1) for the front-left wheel $FW_L$ is adjusted to the reduce-pressure mode, the control mode M(4) for the rear-right wheel $RW_R$ to the intensify-pressure mode, and the control modes M(2) and M(3) for the front-right and rear-left wheels $FW_R$ and $RW_L$ to the noncontrol mode.

If the result of determination in Step S602 is No, it is determined whether or not the value of the control execution flag $F_{cos}$ is 1 (Step S604). If the result of this determination is Yes, then the vehicle turning clockwise has a marked tendency to oversteer, and the required yaw moment $\gamma_d$ is at a great value greater than the threshold value $\gamma_{dOS1}$ on the negative side, so that the vehicle requires a restoration moment. In the next Step S605, therefore, the control mode M(1) for the front-left wheel $FW_L$ is adjusted to the intensify-pressure mode, the control mode M(4) for the rear-right wheel $RW_R$ to the reduce-pressure mode, and the control modes M(2) and M(3) for the front-right and rear-left wheels $FW_R$ and $RW_L$ to the noncontrol mode.

If both the results of determinations in Steps S602 and S604 are No, the turning vehicle has no marked tendency either to understeer or to oversteer. In this case, the control modes M(1) and M(4) for the front-left and rear-right wheels $FW_L$ and $RW_R$ are both adjusted to the hold mode, and the control modes M(2) and M(3) for the front-right and rear-left wheels $FW_R$ and $RW_L$ to the noncontrol mode (Step S606).

If the result of determination in Step S601 is No, that is, if it is concluded that the vehicle is turning counterclockwise, on the other hand, it is determined whether or not the value of the control execution flag $F_{cus}$ is 1 (Step S607).

If the result of determination in Step S607 is Yes, the vehicle requires a turning moment, as in the case of the aforementioned clockwise turn. In the next Step S608, therefore, in contrast with the case of the clockwise turn, the control mode M(2) for the front-right wheel $FW_R$ is adjusted to the reduce-pressure mode, the control mode M(3) for the rear-left wheel $RW_L$ to the intensify-pressure mode, and the control modes M(1) and M(4) for the front-left and rear-right wheels $FW_L$ and $RW_R$ to the noncontrol mode.

If the result of determination in Step S607 is No, it is determined whether or not the value of the control execution flag $F_{cos}$ is 1 (Step S609). If the result of this determination is Yes, the vehicle requires a restoration moment. In the next Step S610, therefore, the control mode M(2) for the front-right wheel $FW_R$ is adjusted to the intensify-pressure mode, the control mode M(3) for the rear-left wheel $RW_L$ to the reduce-pressure mode, and the control modes M(1) and M(4) for the front-left and rear-right wheels $FW_L$ and $RW_R$ to the noncontrol mode.

If both the results of determinations in Steps S607 and S609 are No, the control modes M(2) and M(3) for the front-right and rear-left wheels $FW_R$ and $RW_L$ are both adjusted to the hold mode, and the control modes M(1) and M(4) for the front-left and rear-right wheels $FW_L$ and $RW_R$ to the noncontrol mode, as in the case of the aforementioned clockwise turn (Step S611).

Table 1 below collectively shows the control modes M(i) described above.

TABLE 1

|  | clockwise turn (Fd = 1) | | | counterclockwise turn (Fd = 0) | | |
| --- | --- | --- | --- | --- | --- | --- |
| $F_{cus}$ | 1 | 0 | 0 | 1 | 0 | 0 |
| $F_{cos}$ | 0 | 1 | 0 | 0 | 1 | 0 |
| $FW_L$: M(1) | reduce | intensify | hold | non-control | non-control | non-control |
| $FW_R$: M(2) | non-control | non-control | non-control | reduce | intensify | hold |
| $RW_L$: M(3) | non-control | non-control | non-control | intensify | reduce | hold |
| $RW_R$: M(4) | intensify | reduce | hold | non-control | non-control | non-control |

The control modes M(i) for the individual wheels and the required yaw moment $\gamma_d$ selected in the determination section 88 are supplied to a valve control signal computing section 89, where control signals for the solenoid valve units (inlet and outlet valves 12 and 13) for controlling the respective brake pressures for the individual wheels are computed in accordance with the control modes M(i) and the required yaw moment $\gamma_d$.

Specifically, in the computing section 89, the control rate in increasing or decreasing the brake pressure for each wheel is computed to obtain the required yaw moment $\gamma_d$. In order to change the wheel brake pressure by a fixed pressure value $\Delta P$ (e.g., ±5 kg/cm$^2$) at a time in accordance with the control rate, a driving pulse, that is, a valve control signal of the inlet or outlet valve 12 or 13 required for making a change by the pressure value $\Delta P$ is computed. The valve control signal is represented by the pulse periods $T_{PLS}$ and pulse widths $W_{PLS}(i)$. In order to secure good response of brake pressure control, the pressure value $\Delta P$ in the initial cycle is set at ±10 kg/cm$^2$.

Figure 27:
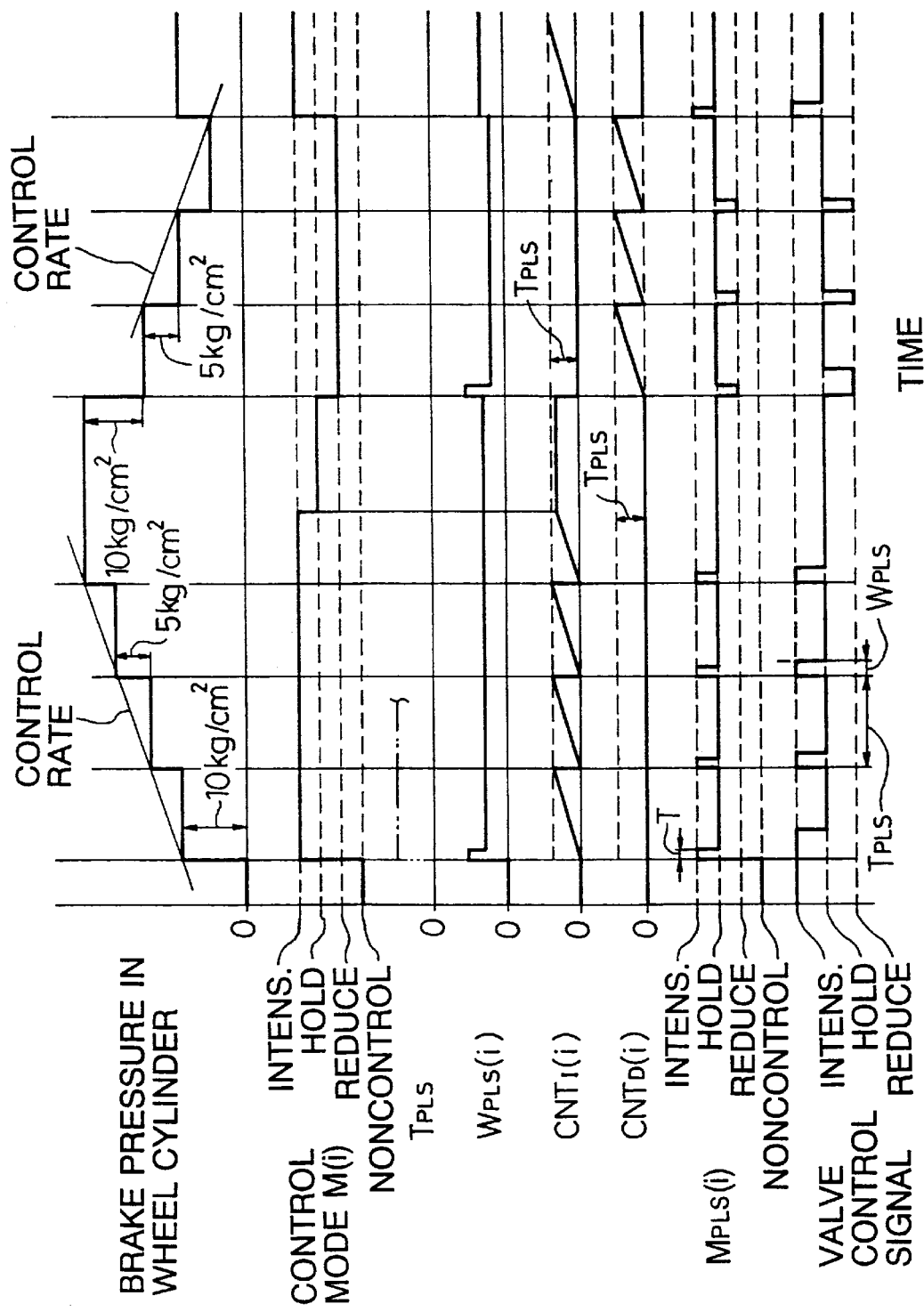
FIG. 27 is a time chart showing the relations between a control mode, actuation mode, and pulse width.

Referring to FIG. 27, there is shown the way the brake pressure for the wheel, that is, in the wheel cylinder is increased or decreased with every pressure value $\Delta P$.

The inlet and outlet valves 12 and 13 are supplied with the valve control signals as based on the hold mode, and actuated in accordance with the valve control signals. Since the actuation of the inlet and outlet valves 12 and 13 is ordered with every control period T (8 msec) for the main routine, an actuation mode $M_{PLS}(i)$ is set so that actual valve actuation is carried out with every pulse period $T_{PLS}$.

The following is a detailed description of the pulse period $T_{PLS}$, pulse width $W_{PLS}(i)$, and actuation mode $M_{PLS}(i)$.

First, if the lateral force on the vehicle body is ignored, a variation $\Delta M_z$ of the yaw moment acting on the vehicle body when the brake pressure for a front wheel (in the wheel cylinder) is changed by $\Delta P_{WC}$ can be expressed as follows:

$$\Delta M_z = \Delta P_{WC} \times B_F \times TF/2 \tag{37}$$

where $B_F$ and $T_F$ are the front brake coefficient (kg/cm$^2 \to$ kg) and front tread, respectively, of the vehicle.

Accordingly, the control rate $R_{PWC}$ (kg/cm$^2$/s) of the brake pressure obtained when the required yaw moment $\gamma_d$ is given can be expressed as follows:

$$R_{PWC} = 2 \times \gamma_d / B_F / T_F \tag{38}$$

If the pressure value $\Delta P$ (5 or 10 kg/cm$^2$) is fixed, the relationship between the control rate $R_{PWC}$ and the pulse period $T_{PLS}$ leads to the following equation:

$$|R_{PWC}| = \Delta P/(T_{PLS} \times T(=8 \text{ msec})) \tag{39}$$

Based on these two equations (38) and (39), the pulse period $T_{PLS}$ is expressed as follows:

$$T_{PLS} = \Delta P \times B_F \times T_F/(2 \times T \times |\gamma_d|) \tag{40}$$

where $2 \leq T_{PLS} < 12$ is given.

The pulse period $T_{PLS}$ is also applied to the inlet and outlet valves 12 and 13 of the solenoid valve unit on the rear-wheel side.

The pulse width $W_{PLS}(i)$ is previously set in an experiment. According to this experiment, the master cylinder pressure and wheel brake pressure (brake pressure) are adjusted to their respective reference values. In this state, the time for the change of the wheel brake pressure by the pressure value $\Delta P$ (5 or 10 kg/cm$^2$) after the actuation of the inlet or outlet valve is measured. The pulse width $W_{PLS}(i)$ is set on the basis of the measured time. Since the pressure of discharge from the pump 16 (or 17) is utilized for the increase of the wheel brake pressure, the pulse width $W_{PLS}(i)$ is set in consideration of a delay in response of the pump 16 (or 17).

Figure 28:
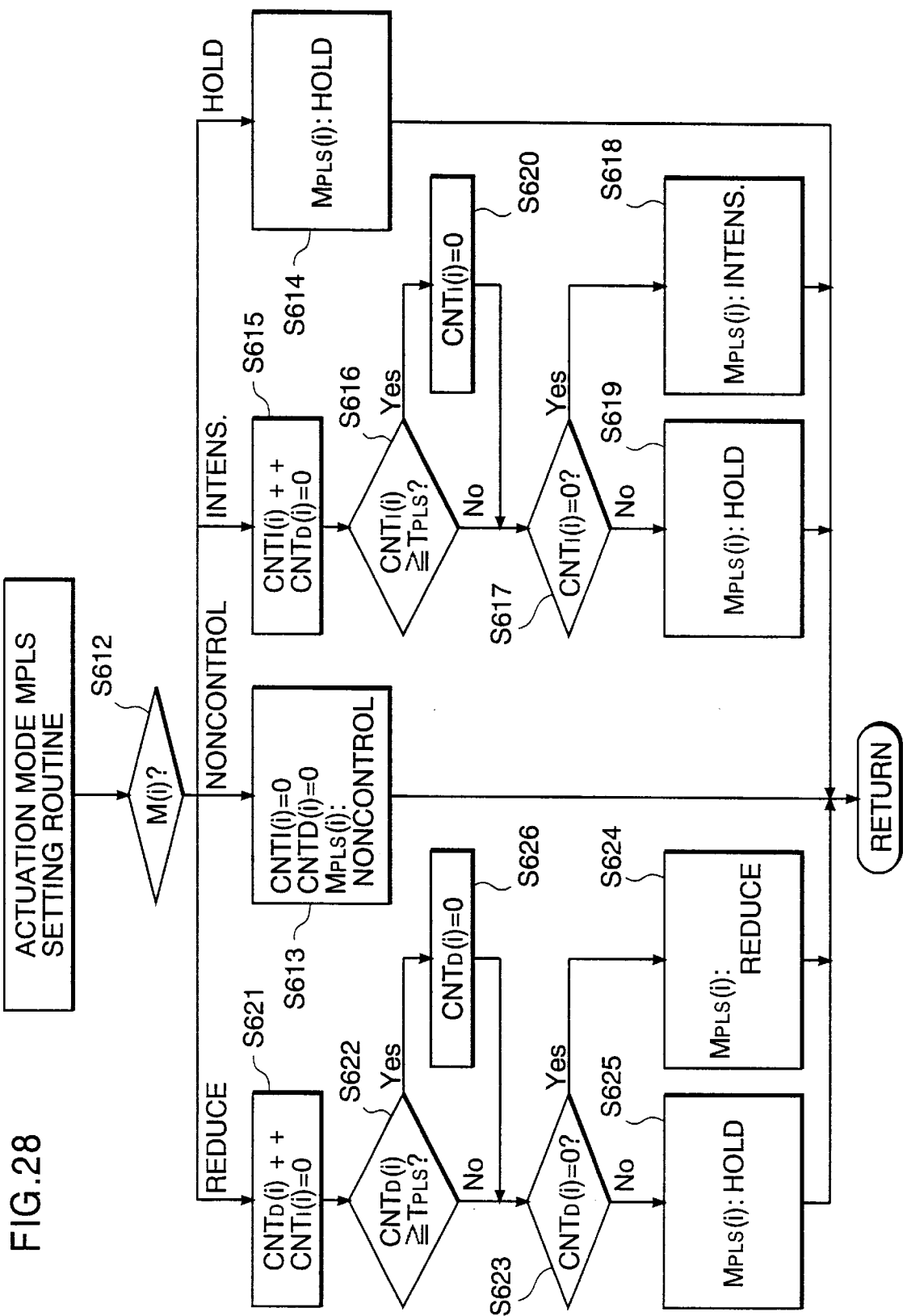
FIG. 28 is a flowchart showing an actuation mode setting routine.

The actuation mode $M_{PLS}(i)$ is set in accordance with the setting routine shown in FIG. 28. In this setting routine, the control mode M(i) is determined first (Step S612). If the control mode M(i) is the noncontrol mode, the values of an adding counter $CNT_I(i)$ for intensify-pressure control and an adding counter $CNT_D(i)$ for reduce-pressure control are both reset at 0, whereupon the actuation mode $M_{PLS}(i)$ is set to the noncontrol mode (Step S613).

If the control mode M(i) is the pressure-hold mode, the hold mode is set for the actuation mode $M_{PLS}(i)$ (Step S614).

If the control mode M(i) is the intensify-pressure mode, the actuation of only the adding counter $CNT_I(i)$ is started (Step S615). Then, it is determined whether or not the value of the adding counter $CNT_I(i)$ has reached the pulse period $T_{PLS}$ (Step S616). Immediately after the actuation of the adding counter $CNT_I(i)$ is started, the result of determination in Step S616 is No, and it is determined in Step S617 whether or not the value of the adding counter $CNT_I(i)$ is 0. In this case, the result of this determination is Yes. Accordingly, the intensify-pressure mode is set for the actuation mode $M_{PLS}(i)$ (Step S618).

Thereafter, as the setting routine is executed repeatedly, the value of the adding counter $CNT_I(i)$ is increased one by one. As long as the result of determination in Step S616 remains No, the result of determination in Step S617 is No, and the pressure-hold mode is set for the actuation mode $M_{PLS}(i)$ (Step S619).

If the result of determination in Step S616 becomes Yes with the passage of time, however, the value of the adding counter $CNT_l(i)$ is reset at 0 (Step S620). In this case, the result of determination in Step S617 becomes Yes, whereupon the intensify-pressure mode is set for the actuation mode $M_{PLS}(i)$ (Step S618). As a result, as long as the control mode M(i) is kept at the intensify-pressure mode, the actuation mode $M_{PLS}(i)$ is set to the intensify-pressure mode with every pulse period $T_{PLS}$.

If the control mode M(i) is the reduce-pressure mode, on the other hand, Steps S621 to S626 in the flowchart shown in FIG. 28 are executed, whereupon the actuation mode $M_{PLS}(i)$ is set to the reduce-pressure mode with every pulse period $T_{PLS}$.

Subsequently, in the next stage, an inhibitory section 90 (see FIG. 23) corrects the pulse width $W_{PLS}(i)$ to inhibit the control of brake pressure when the operation of steering wheel is in a countersteer mode, when the wheel slip is excessive, or when the required yaw moment tends to decrease. The inhibitory section 90 is shown in detail in the block diagram of FIG. 29.

The inhibitory section 90 includes three switches 91, 92 and 93. The pulse width $W_{PLS}(i)$ supplied from the computing section 89 in the preceding stage is outputted as a pulse width $W_{PLS1}(i)$ after passing through the switches 91, 92 and 93. The switches 91, 92 and 93 are shifted based on the values of flags set in setting sections 94, 95 and 96. That is, when the switches 91, 92 and 93 are at switching positions shown in the figure, the pulse width $W_{PLS1}$ (i) is $W_{PLS}$ (i). On the other hand, when any one of the switches 91, 92 and 93 is shifted from the position shown in the figure, the value of $W_{PLS1}(i)$ is reset at 0. Instead of resetting the pulse width $W_{PLS1}(i)$ at 0, a value smaller than $W_{PLS}(i)$ can be given to the pulse width $W_{PLS1}(i)$. As seen from FIG. 29, the actuation mode $M_{PLS}(i)$ passes through the inhibitory section 90 without change.

In the setting section 94, an inhibiting flag $F_{K1}(i)$ for countersteer is set. Specifically, the setting section 94 includes an AND circuit 97, the output of which is supplied to the switch 91 as the inhibiting flag $F_{K1}(i)$. If all of the three input conditions of the AND circuit 97 are met, that is, if all the inputs are on, the value of the inhibiting flag $F_{K1}(i)$ is set at 1. If any of the input conditions is No, the value of the inhibiting flag $F_{K1}(i)$ is set at 0. The first input condition is on when the target wheel is a rear wheel, that is, when the wheel number i is 3 or 4, and the second input condition is on when the value of a countersteer flag $F_{CS}$ is 1. The third input condition is on when the control mode M(i) is the intensify-pressure mode.

Figure 29:
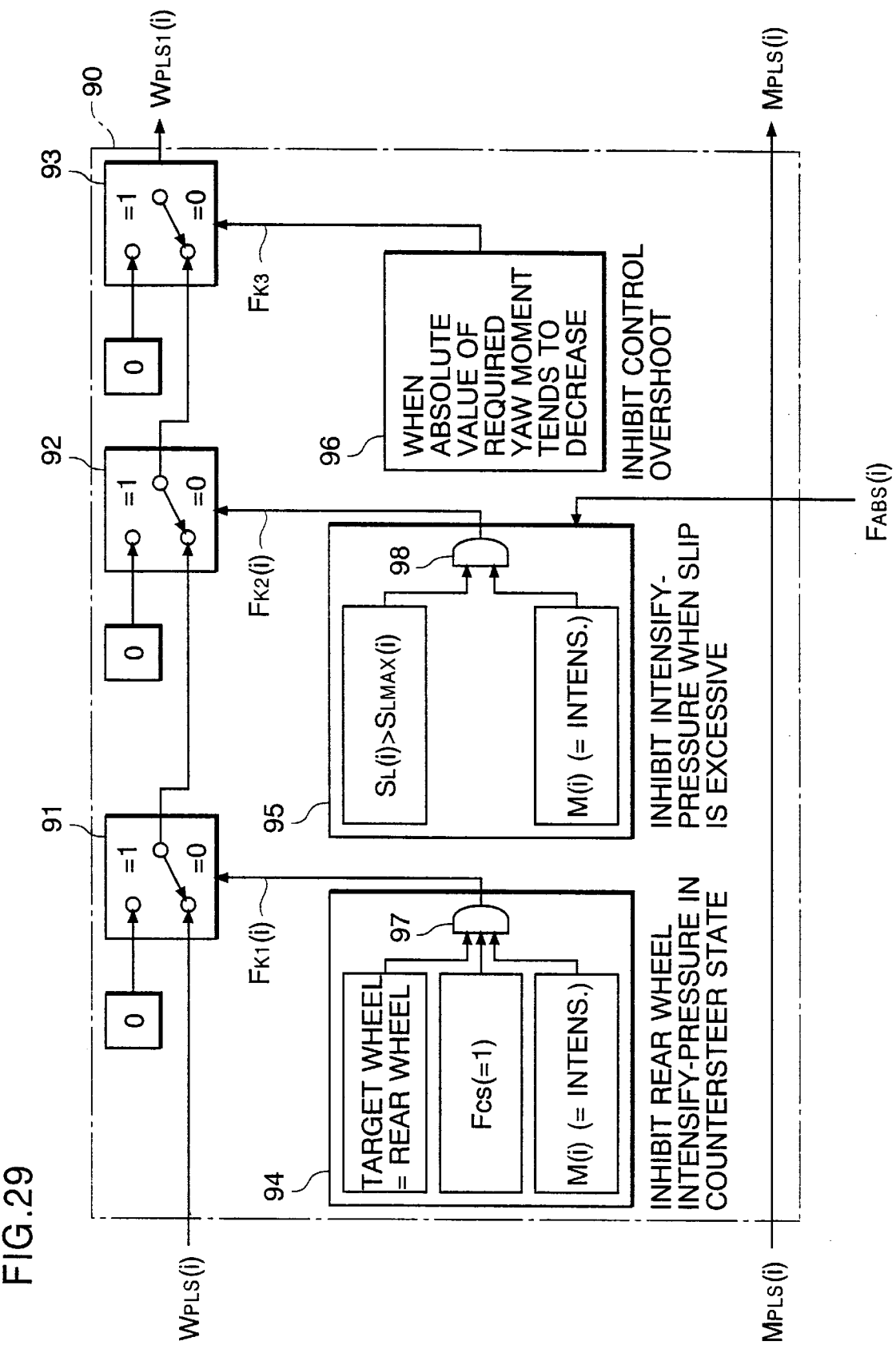
FIG. 29 is a block diagram showing the details of an inhibitory section shown in FIG. 23.

When, the value of the inhibiting flag $F_{K1}(i)$ is 1, the switch 91 is shifted from the position shown in FIG. 29, whereupon the value of the pulse width $W_{PLS1}(i)$ becomes 0.

Figure 30:
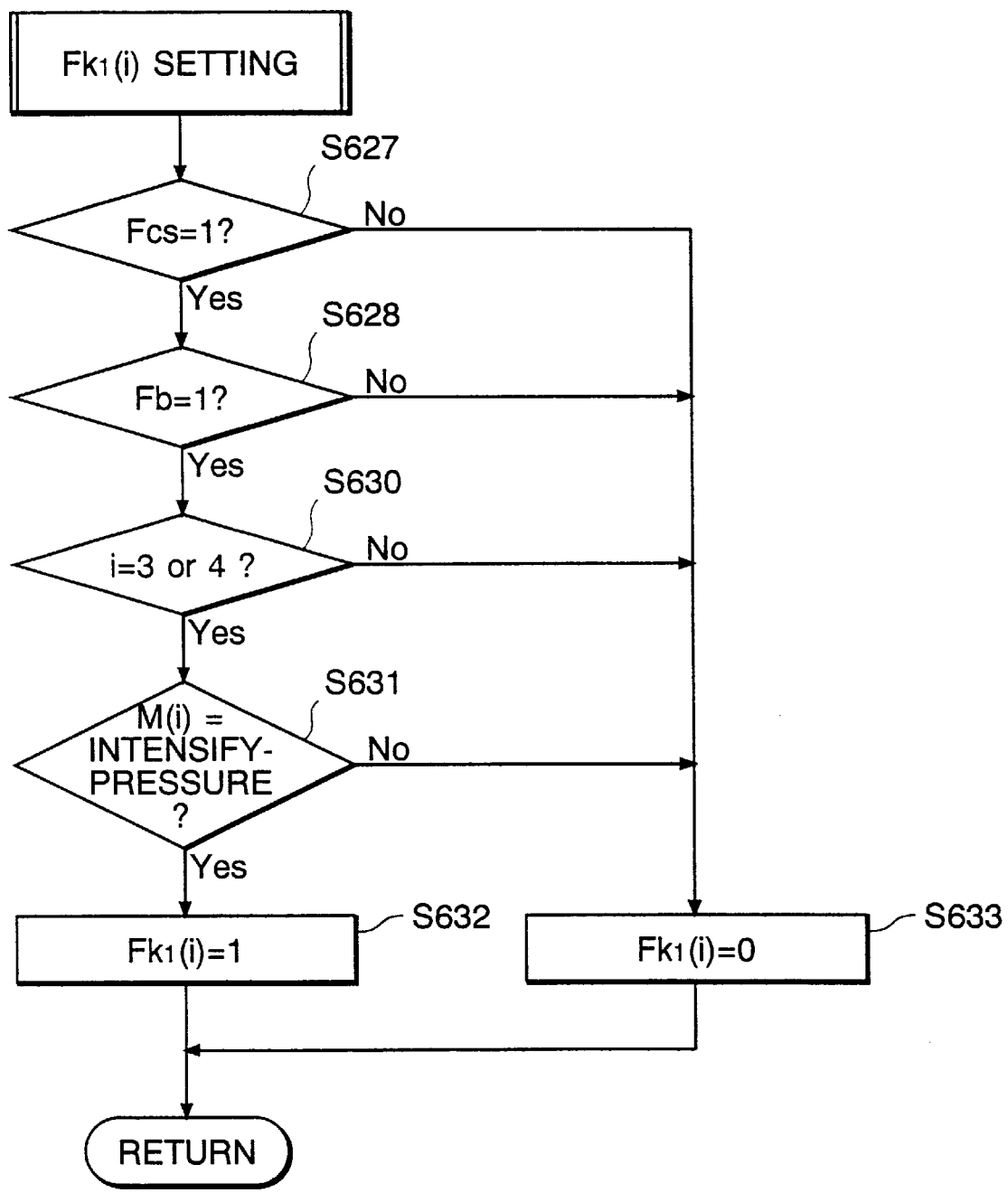
FIG. 30 is a flowchart showing a setting routine for one inhibiting flag in relation to the inhibitory section.

FIG. 30 shows a setting routine for the inhibiting flag $F_{K1}(i)$. In this setting routine, the value of the inhibiting flag $F_{K1}(i)$ is set at 1 only when all the results of determination in Steps S627 to S631 are Yes.

In the setting section 95, an inhibiting flag $F_{K2}(i)$ is set at 1 when the wheel slip is excessive. The setting section 95 includes an AND circuit 98, the output of which is supplied to the switch 92 as the inhibiting flag $F_{K2}(i)$. If all of the two input conditions of the AND circuit 98 are met, that is, if all the inputs are on, the value of the inhibiting flag $F_{K2}$ (i) is set at 1. If either of the input conditions is off, the value of the inhibiting flag $F_{K2}(i)$ is reset at 0. One input condition is on when the wheel slip factor $S_L(i)$ is higher than an allowable slip factor $S_{LMAX}(i)$, and the other input condition is on when the control mode M(i) is the intensify-pressure mode.

When the switch 92 receives the flag $F_{K2}(i)$, it is shifted from the position shown in FIG. 29, whereupon the pulse width $W_{PLS1}(i)$ is set at 0.

Figure 31:
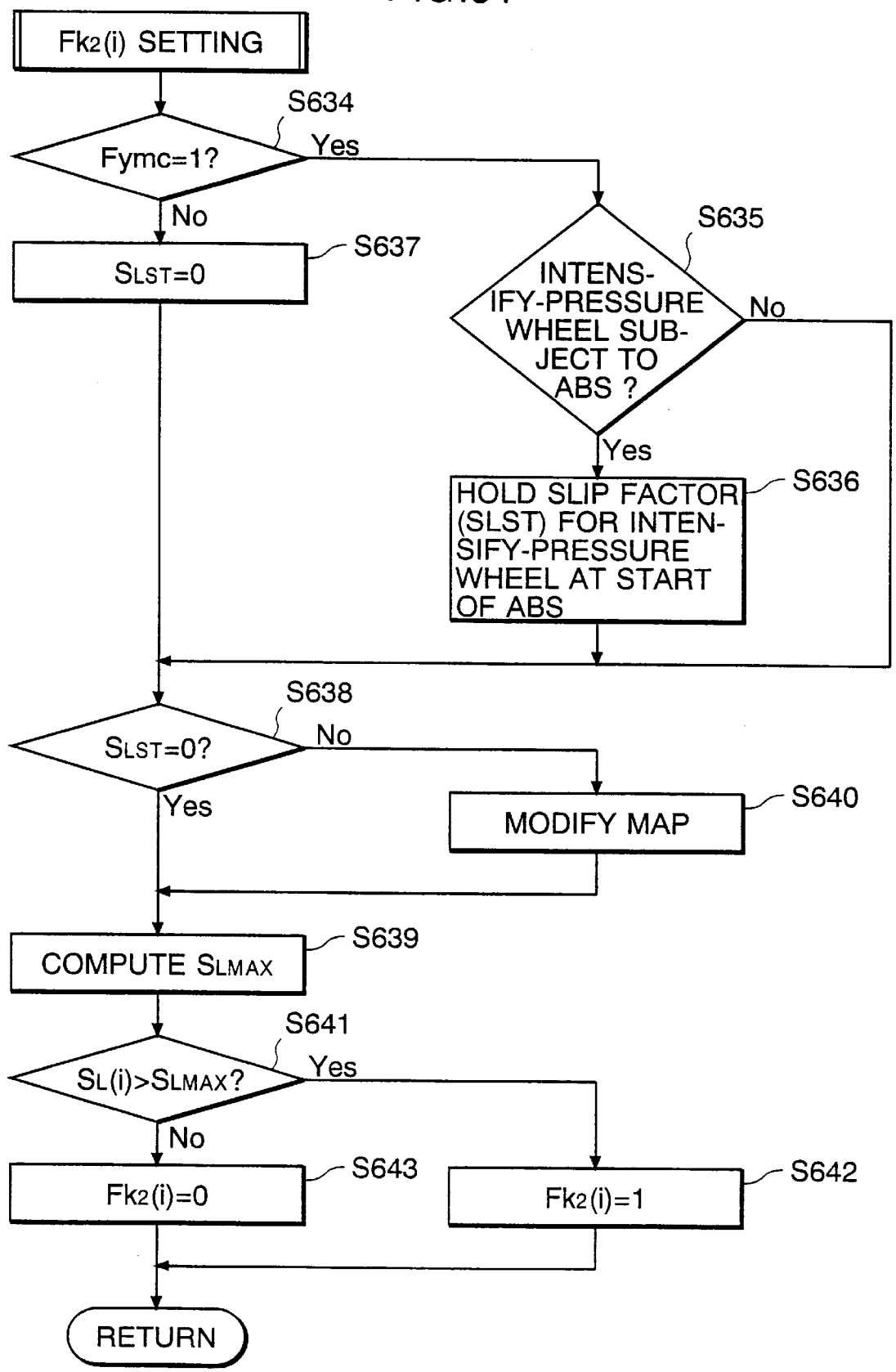
FIG. 31 is a flowchart showing a setting routine for another inhibiting flag in relation to the inhibitory section.

Referring to FIG. 31, there is shown in detail a setting routine for the inhibiting flag $F_{K2}(i)$. In this setting routine, it is first determined whether or not the value of the aforementioned on-off flag $F_{ymc}$ is 1, that is, whether or not the vehicle is under the yaw moment control (Step S634). If the result of determination in Step S634 is Yes, it is determined whether or not the wheel (intensify-pressure wheel) for which the control mode M(i) is the intensify-pressure mode is subjected to the brake pressure control using ABS (Step S635). A flag $F_{ABS}(i)$, mentioned later, is used for the determination in Step S635. Therefore, the setting section 95 is also supplied with the flag $F_{ABS}(i)$ as shown in FIG. 29.

If the result of determination in Step S635 is Yes, the slip factor of the wheel in the intensify-pressure mode at the start of the brake pressure control using ABS is held as a determination slip factor $S_{LST}(i)$ (Step S636). If the result of determination in Step S635 is No, Step S636 is not executed. The brake pressure control using ABS will be described later.

If the result of determination in Step S634 is No, that is, if the vehicle is not under the yaw moment control, the determination slip factor $S_{LST}$ is reset at 0 (Step S637).

After any of Steps S635, S636, and S637, the next Step S638 is executed. In Step S638, it is determined whether or not the determination slip factor $S_{LST}(i)$ is 0. If the result of this determination is Yes, that is, if the intensify-pressure wheel is not under the brake pressure control using ABS, the allowable slip factor $S_{LMAX}(i)$ is computed (Step S639). Specifically, the allowable slip factor $S_{LMAX}(i)$ is read from a map shown in FIG. 32 in accordance with the required yaw moment $\gamma_d$. As seen from FIG. 32, the allowable slip factor $S_{LMAX}(i)$ has a characteristic such that it increases at a predetermined rate as the required yaw moment $\gamma_d$ increases, and its maximum value is set at 20%.

Next, it is determined whether or not the slip factor $S_L(i)$ of the wheel in the intensify-pressure mode is higher than the allowable slip factor $S_{LMAX}(i)$ (Step S641). If the result of this determination is Yes, the inhibiting flag $F_{K2}(i)$ is set at 1 (Step S642). If the result of determination in Step S641 is No, the inhibiting flag $F_{K2}(i)$ is set at 0 (Step S643).

Figure 32:
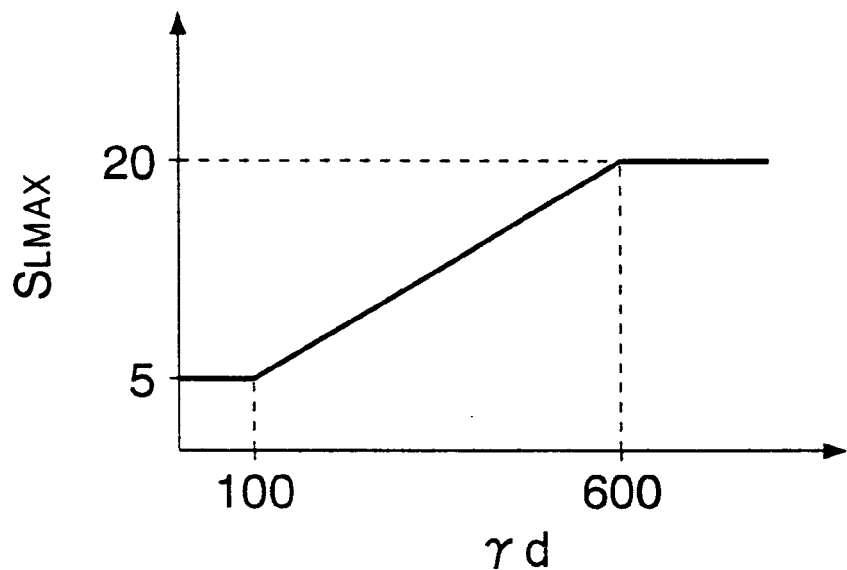
FIG. 32 is a graph showing the relation between required yaw moment and allowable slip factor.
Figure 33:
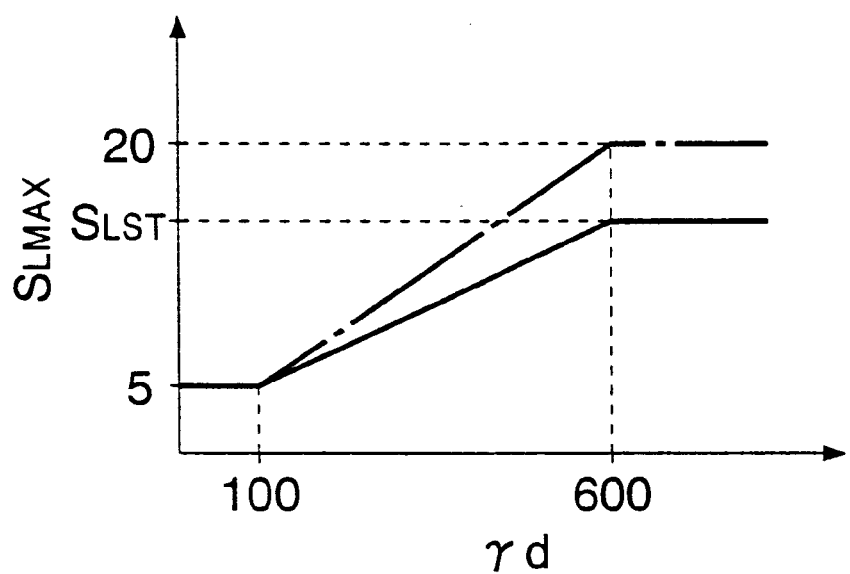
FIG. 33 is a graph showing the relation between required yaw moment and allowable slip factor after the start of brake pressure control carried out by an ABS.

If the result of determination in Step S638 is Yes, that is, if the wheel in the intensify-pressure mode is under the brake pressure control using ABS, the map from which the allowable slip factor $S_{LMAX}(i)$ is read is modified (Step S640). Specifically, the map of FIG. 32 is replaced by a map shown in FIG. 33 in Step S640. On the map of FIG. 33, the maximum value of the allowable slip factor $S_{LMAX}(i)$ is adjusted to the determination slip factor $S_{LST}(i)$ (or 95% of $S_{LST}(i)$). Also, its increase rate of the allowable slip factor $S_{LMAX}(i)$ is changed in accordance with the determination slip factor $S_{LST}(i)$.

When the wheel in the intensify-pressure mode is under the brake pressure control using ABS as described above, the determination slip factor $S_{LST}(i)$ is adjusted to the allowable slip factor $S_{LMAX}(i)$. Thereupon, the result of determination in Step S641 is Yes, so that the inhibiting flag $F_{K2}(i)$ is set at 1 (Step S642).

In the setting section 96 (see FIG. 29), an inhibiting flag $F_{K3}$ is set at 1 to prevent overshooting of yaw moment control when the absolute value of the required yaw moment $\gamma_d$ decreases at a rate higher than a predetermined rate, that is, when the condition is met. On the other hand, if the above condition is not met, the inhibiting flag $F_{K3}$ is reset at 0. The inhibiting flag $F_{K3}$ is supplied from the setting section 96 to the switch 93, and the switch 93 is shifted in accordance with the value of the inhibiting flag $F_{K3}$. When the inhibiting flag $F_{K3}$ is set at 1, the switch 93 is shifted from the position shown in FIG. 29, whereupon the value of the pulse width $W_{PLS1}(i)$ is reset at 0.

Figure 34:
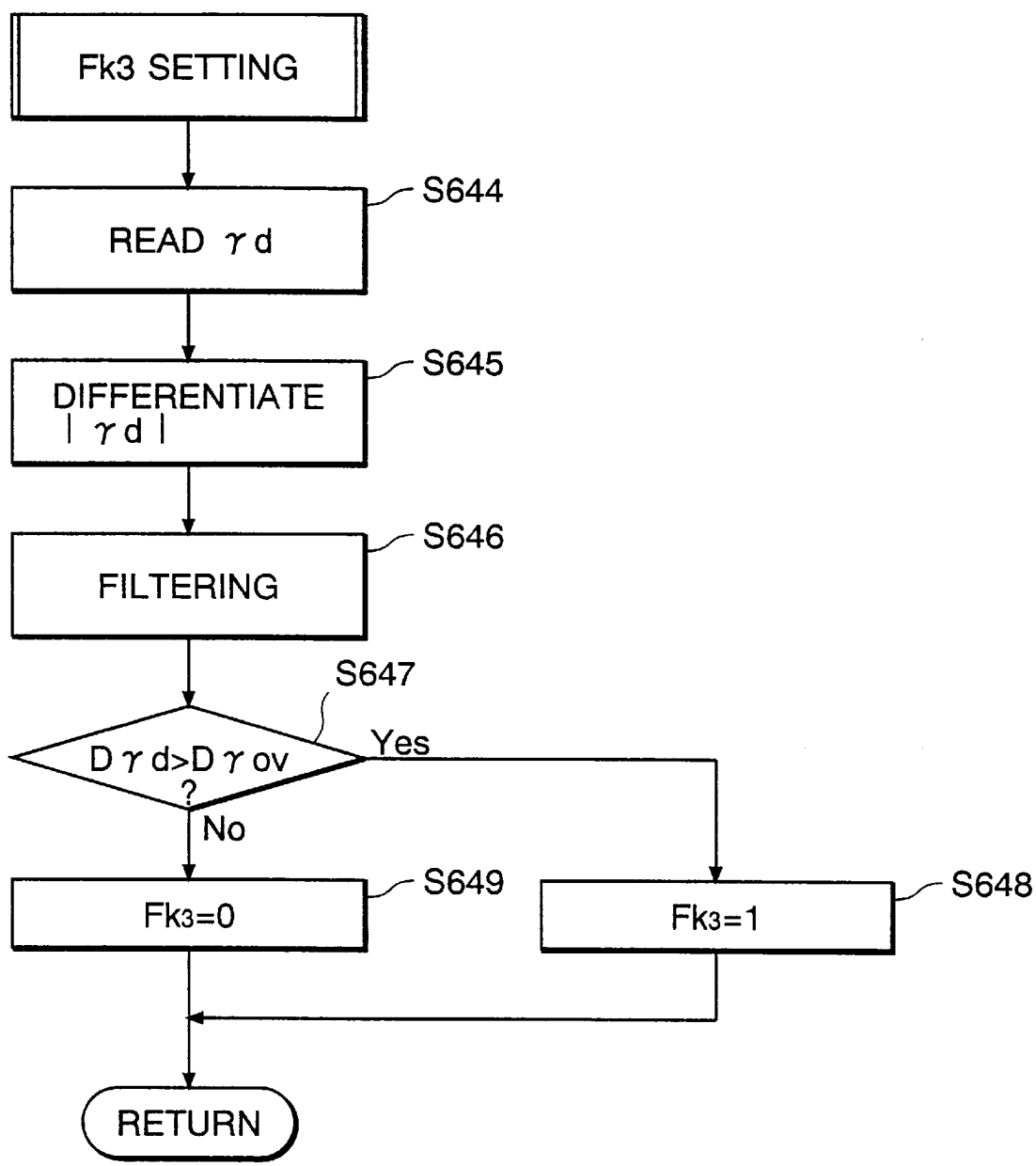
FIG. 34 is a flowchart showing a setting routine for still another inhibiting flag in relation to the inhibitory section.

Referring to FIG. 34, there is shown in detail a setting routine for the inhibiting flag $F_{K3}$. In this setting routine, the required yaw moment $\gamma_d$ is read first (Step S644), and a derivative $\Delta\gamma_d$ of the absolute value of the required yaw moment $\gamma_d$ is computed (Step S645). Further, the derivative $\Delta\gamma_d$ is filtered ($f_c$=2 Hz) (Step S646).

The processing in Steps S645 and S646 can be expressed as follows:

$$\Delta\gamma_d = \text{LPF}(|\gamma_d| - |\gamma_{dm}|) \tag{41}$$

where $\gamma_{dm}$ is the required yaw moment computed in the preceding routine.

Then, it is determined whether or not $\Delta\gamma_d$ is larger than an overshoot determination value Ay, (e.g., −125 kgm/s$^2$) (Step S647). If the result of determination in Step S647 is Yes, 1 is set in the inhibiting flag $F_{K3}$ (Step S648). If the result of determination in Step S647 is No, 0 is set in the inhibiting flag $F_{K3}$ (Step S649).

Referring again to FIG. 23, the yaw moment control block includes a pre-pressurization control determination section 100. In this determination section 100, the respective values of pre-pressurization flags $F_{PRE1}$ and $F_{PRE2}$ for controlling the operation of the aforesaid pumps 16 and 17, the respective solenoid valves (inlet and outlet valves 12 and 13), and the cutoff valves 19 and 20 are set in advance of the start of the yaw moment control. Specifically, if the absolute value of the required yaw moment or the maximum yaw rate deviation $\Delta\gamma_{MAX}$ is greater than a predetermined value so that the yaw moment control is permitted to start, the pre-pressurization flag $F_{PRE1}$ or $F_{PRE2}$ is set at 1, and this state is kept for a fixed period of duration (e.g., 96 msec). When the yaw moment control is started during this period, the pre-pressurization flag $F_{PRE1}$ or $F_{PRE2}$ is set at 0 at the start time. The pre-pressurization flag $F_{PRE1}$ is provided for a clockwise turn of the vehicle, and $F_{PRE2}$ is provided for a counterclockwise turn.

Figure 35:
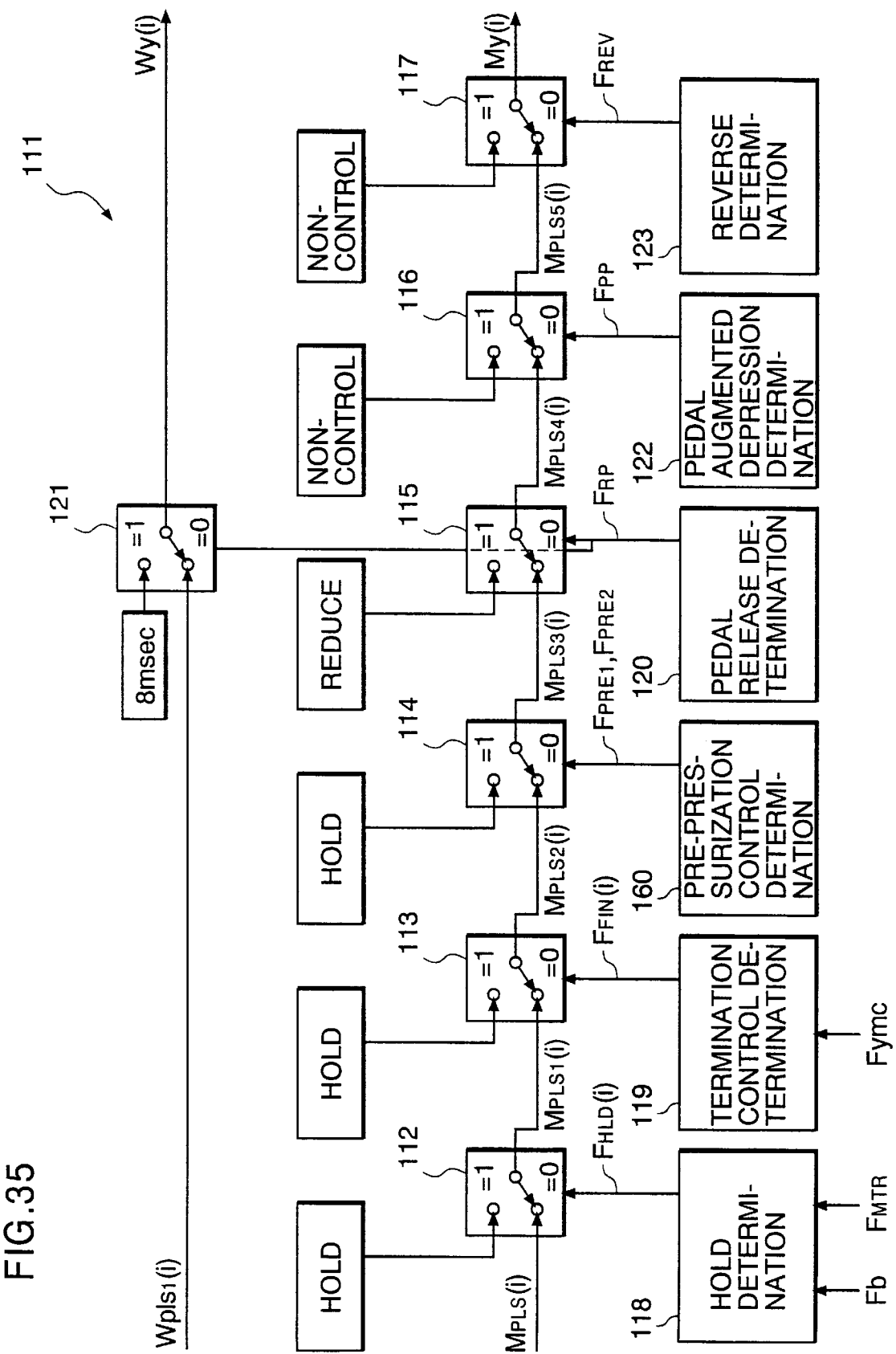
FIG. 35 is a block diagram showing the details of a forced-modification section shown in FIG. 23.

As shown in FIG. 23, the yaw moment control block includes a forced-modification section 111 for valve control signal. The details of the forced-modification section 111 are shown in FIG. 35. In the forced-modification section 111, the pulse width $W_{PLS}(i)$ and the actuation mode $M_{PLS}(i)$ are compulsorily modified depending on various conditions. These pulse width $W_{PLS}(i)$ and the actuation mode $M_{PLS}(i)$ are outputted from the forced-modification section 111 as a pulse width $W_y(i)$ and an actuation mode $M_y(i)$.

Specifically, as seen from FIG. 35, the actuation mode $M_{PLS}(i)$ is outputted as the actuation mode $M_y(i)$ after passing through switches 112 to 117. These switches 112 to 117 are supplied with flags and shifted in accordance with the respective values of the flags.

The switch 112 is shifted in accordance with the value of a hold flag $F_{HLD}(i)$ delivered from a hold determination section 118. In the determination section 118, the hold flag $F_{HLD}(i)$ for the wheel for which the noncontrol mode is established is set at 1 when the pump 16 or 17 is actuated (or if an actuation flag $F_{MTR}$, mentioned later, is set at 1) with the vehicle not braked ($F_b$=0). In this case, the switch 112 is shifted from the position shown in FIG. 35, and only the actuation mode $M_{PLS}(i)$ having the noncontrol mode is compulsorily changed to the hold mode. If the values of all the hold flags $F_{HLD}(i)$ are reset at 0, the actuation mode $M_{PLS}(i)$ is outputted directly from the switch 112. Therefore, even if the pump 16 or 17 is actuated with the vehicle not braked, the noncontrol mode of the actuation mode $M_{PLS}(i)$ is compulsorily changed to the hold mode, so that the pressure of discharge from the pump 16 or 17 cannot be supplied to the wheel brakes for the wheels.

The switch 113 is shifted in accordance with the value of a termination flag $F_{FIN}(i)$ delivered from a termination control determination section 119. When the yaw moment control is terminated and the on-off flag $F_{ymc}$ is reset at 0, the determination section 119 sets the termination flag $F_{FIN}(i)$ at 1 periodically for a fixed time period (e.g., 340 msec). Specifically, the termination flag $F_{FIN}(i)$ is set at 1 for a predetermined time (e.g., 16 msec) with every predetermined cycle (e.g., 40 msec). The termination flag $F_{FIN}(i)$ is also used for the control of opening/closing of the cutoff valves 19 and 20 as described later.

If the termination flag $F_{FIN}(i)$ is set at 1, the switch 113 is shifted from the position shown in FIG. 35. Therefore, among the actuation modes $M_{PLS}(i)$, the actuation mode of the target wheel subjected to yaw moment control is compulsorily changed to the hold mode. When the values of all the termination flags $F_{FIN}(i)$ are reset at 0, the actuation mode $M_{PLS}(i)$ is outputted directly from the switch 113. After the termination of yaw moment control, when the actuation mode of the target wheel to be controlled is changed to the hold mode periodically, the brake pressure of the target wheel to be controlled does not change suddenly, so that the behavior of the vehicle is stabilized.

The switch 114 is shifted in accordance with the values of the pre-pressurization flags $F_{PRE1}$ and $F_{PRE2}$ delivered from the pre-pressurization control determination section 100. When the pre-pressurization flag $F_{PRE1}$ or $F_{PRE2}$ is set at 1, the switch 114 is shifted from the position shown in FIG. 35. In this case, among the actuation modes $M_{PLS}(i)$, the actuation mode of the target wheel to be controlled is compulsorily changed to the hold mode. When both of the pre-pressurization flags $F_{PRE1}$ and $F_{PRE2}$ are reset at 0, the actuation mode $M_{PLS}(i)$ is outputted directly from the switch 114.

FIG. 23 shows that the control mode M(i) and the actuation mode $M_{PLS}(1)$ are set by receiving the supply of the on-off flag $F_{ymc}$ in the determination section 88. However, the control mode M(i) and the actuation mode $M_{PLS}(i)$ are set without regard to the value of the on-off flag $F_{ymc}$, as seen from FIGS. 26 and 28. Even if the pre-pressurization control (mentioned later) is started, therefore, the brake pressure for the target wheel to be controlled cannot be adversely affected before the start of the yaw moment control.

The switch 115 is shifted in accordance with the value of a release flag $F_{RP}$ set in a determination section 120 in which the release of brake pedal is determined. When the brake pedal 3 is released during the time when the yaw moment control is carried out with the vehicle braked, the determination section 120 sets the release flag $F_{RP}$ at 1 for a predetermined time (e.g., 64 msec). In this case, the switch 115 is shifted from the position shown in FIG. 35, and among the actuation modes $M_{PLS}(i)$, the actuation mode of the target wheel to be controlled is compulsorily changed to a reduce-pressure mode. When the release flag $F_{RP}$ is reset at 0, the switch 115 outputs the actuation mode $M_{PLS}(i)$ as it is.

As can be seen from FIG. 35, the release flag $F_{RP}$ is also supplied to the switch 121. When the release flag $F_{RP}$ is set at 1, the switch 121 is shifted from the position shown in FIG. 35, and the value of the pulse width $W_{PLS}(i)$, that is, the pulse width $W_y(i)$ is compulsorily modified into the control period T (=8 msec). When the release flag $F_{RP}$ is reset at 0, the pulse width $W_{PLS}(i)$ is outputted directly from the switch 121 as the pulse width $W_y(i)$.

The switch 116 is shifted in accordance with the value of the augmented depression flag $F_{PP}$ delivered from a determination section 122 for determining the augmented depression of brake pedal. The augmented depression flag $F_{PP}$ is set in accordance with the aforementioned routine shown in FIG. 6. When the augmented depression flag $F_{PP}$ is set at 1, the switch 116 is shifted from the position shown in FIG. 35, and all the actuation modes $M_{PLS}(i)$ are compulsorily modified into the noncontrol mode. When the augmented depression flag $F_{PP}$ is reset at 0, the actuation mode $M_{PLS}(i)$ is outputted directly from the switch 116. When the actuation modes of all the wheels are compulsorily modified into the noncontrol mode, the driver's brake pedal operation is reflected in the brake pressures of all the wheels.

The switch 117 is shifted in accordance with the value of a reverse flag $F_{rev}$ delivered from a reverse determination section 123. The reverse determination section 123 sets the reverse flag $F_{rev}$ at 1 when the reverse gear is selected in the transmission of the vehicle, and resets the reverse flag $F_{rev}$ at 0 when the forward gear is selected. When the reverse flag $F_{rev}$ is set at 1, the switch 117 is shifted from the position shown in FIG. 35, and all the actuation modes $M_{PLS}(i)$ are compulsorily modified into the noncontrol mode. When the reverse flag $F_{rev}$ is reset at 0, the actuation mode $M_{PLS}(i)$ is outputted directly from the switch 117 as the actuation mode $M_y(i)$.

As can be seen from FIG. 23, the output from the valve control signal forced-modification section 111, that is, the actuation mode $M_y(i)$, and the output from the pre-pressurization control determination section 100, that is, the pre-pressurization flags $F_{PRE1}$ and $F_{PRE2}$ are also supplied to an actuation determination section 124. FIGS. 36 to 39 show the details of the determination section 124.

Figure 36:
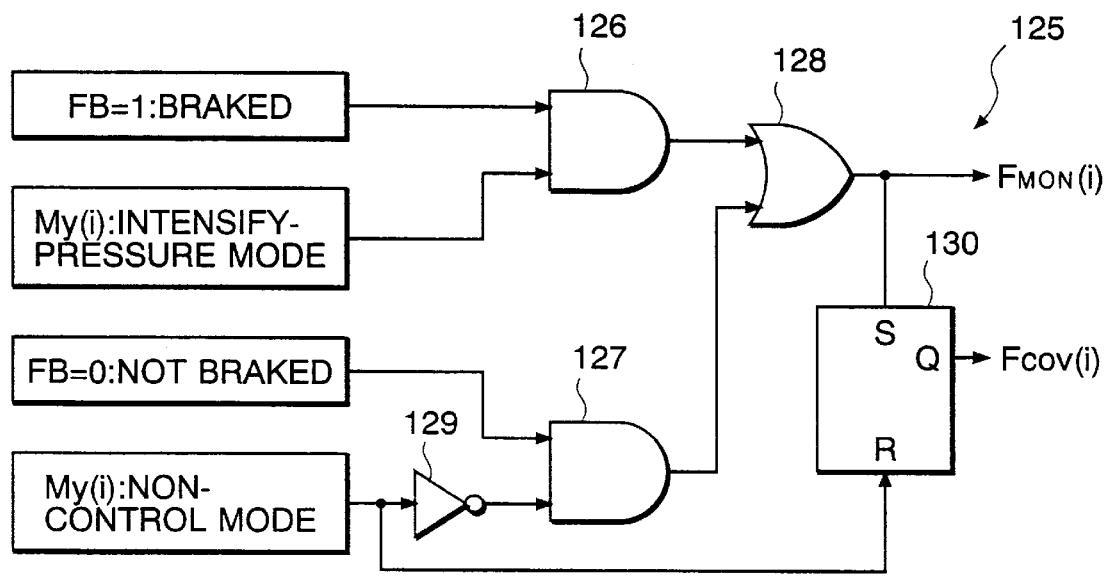
FIG. 36 is a block diagram showing part of the actuation determination section shown in FIG. 23.

First, the actuation determination section 124 includes a determination circuit 125 shown in FIG. 36. In this determination circuit 125, respective request flags for requesting the actuation of the cutoff valves 19 and 20 and the motor 18 are set for the wheel cylinder of each wheel. The determination circuit 125 has two AND circuits 126 and 127. When the brake flag $F_b$ is set at 1 and the actuation mode $M_y(i)$ is the intensify-pressure mode, all the inputs of one AND circuit are on. In this case, the wheel number i in the intensify-pressure mode is outputted from the AND circuit 126 to an OR circuit 128.

When the brake flag $F_b$ is reset at 0 and the actuation mode $M_y(i)$ is not the noncontrol mode, all the inputs of the other AND circuit 127 are on. In this case, the wheel number i which is not in the noncontrol mode is outputted from the AND circuit 127 to the OR circuit 128. That is, as seen from FIG. 36, the one input condition of the AND circuit 127 is inverted by a NOT circuit 129.

When the OR circuit 128 receives outputs from the AND circuits 126 and 127, it outputs a request flag $F_{MON}(i)$ for requesting the actuation of the motor 18. In this case, the request flag $F_{MON}(i)$ corresponding to the wheel number i supplied to the OR circuit 128 is set at 1.

The output from the OR circuit 128 is also supplied to a set terminal of a flip-flop 130. To a reset terminal of the flip-flop 130, among the actuation modes $M_y(i)$, a reset signal corresponding to the wheel number i in the noncontrol mode is supplied.

When the request flag $F_{MON}(i)$ is supplied to the set terminal of the flip-flop 130, the flip-flop 130 outputs a request flag $F_{COV}(i)$ for requesting the actuation of the cutoff valves 19 and 20. In this case, among the request flags $F_{COV}(i)$, the request flag $F_{COV}(i)$ of the wheel number i corresponding to the request flag $F_{MON}(i)$ whose value is set at 1 is set at 1. When the flip-flop 130 receives the reset signal, all the request flags $F_{COV}(i)$ are reset at 0.

Figure 37:
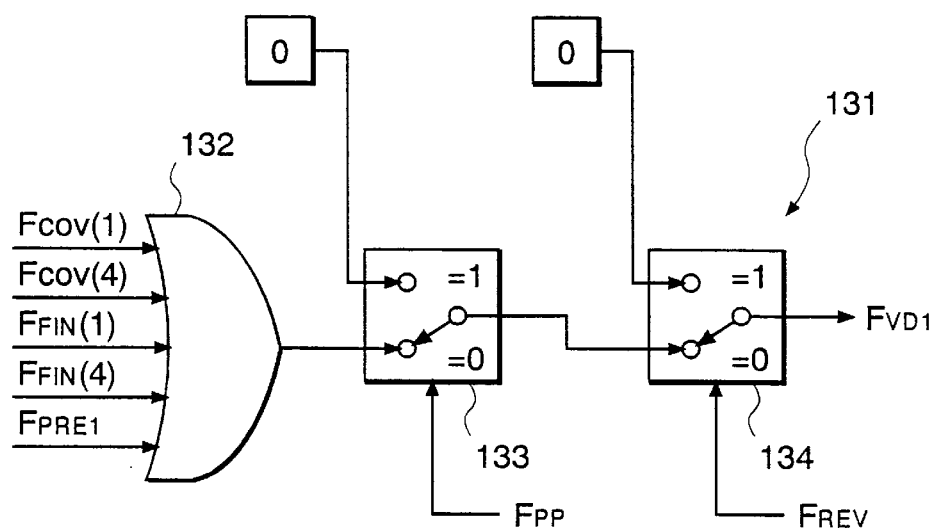
FIG. 37 is a block diagram showing part of the actuation determination section shown in FIG. 23.

Next, the actuation determination section 124 includes a determination circuit 131 shown in FIG. 37. The determination circuit 131 has an OR circuit 132. The OR circuit 132 outputs 1 as the value of the actuation flag $F_{VD1}$ for actuating the cutoff valve 19, if any of the values of request flags $F_{COV}(1)$ and $F_{COV}(4)$, termination flags $F_{FIN}(1)$ and $F_{FIN}(4)$, and pre-pressurization flag $F_{PRE1}$, which are associated with the cutoff valve 19 on the side of the front-left and rear-right wheels $FW_L$ and $RW_R$, is set at 1.

Switches 133 and 134 are disposed on the output line from the OR circuit 132. The switches 133 and 134 are shifted by the augmented depression flag $F_{PP}$ and the reverse flag $F_{REV}$, respectively. That is, if the augmented depression flag $F_{PP}$ or the reverse flag $F_{REV}$ is set at 1, the switch 133 or the switch 134 is shifted from the position shown in FIG. 37. In this case, even if the actuation flag $F_{VD1}$ is set at 1, the OR circuit 132 resets the actuation flag $FVD_1$ at 0 (noncontrol mode).

Figure 38:
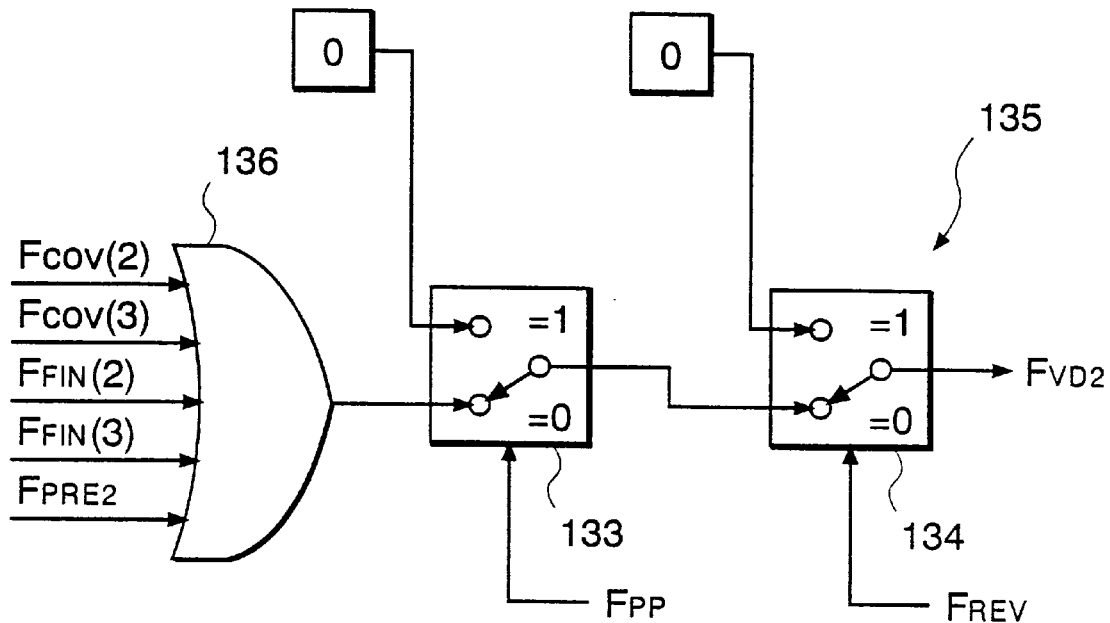
FIG. 38 is a block diagram showing part of the actuation determination section shown in FIG. 23.

Further, the actuation determination section 124 includes a determination circuit 135 shown in FIG. 38. This determination circuit 135 has the same construction and function as those of the determination circuit 131 of FIG. 37, but differs from the determination circuit 131 in the following respect. An OR circuit 136 in the determination circuit 135 outputs 1 as the value of the actuation flag $F_{VD2}$ for actuating the cutoff valve 20, if any of the values of request flags $F_{COV}(2)$ and $F_{COV}(3)$, termination flags $F_{FIN}(2)$ and $F_{FIN}(3)$, and pre-pressurization flag $F_{PRE2}$, which are associated with the cutoff valve 20 on the side of the front-right and rear-left wheels $FW_R$ and $RW_L$, is set at 1.

Figure 39:
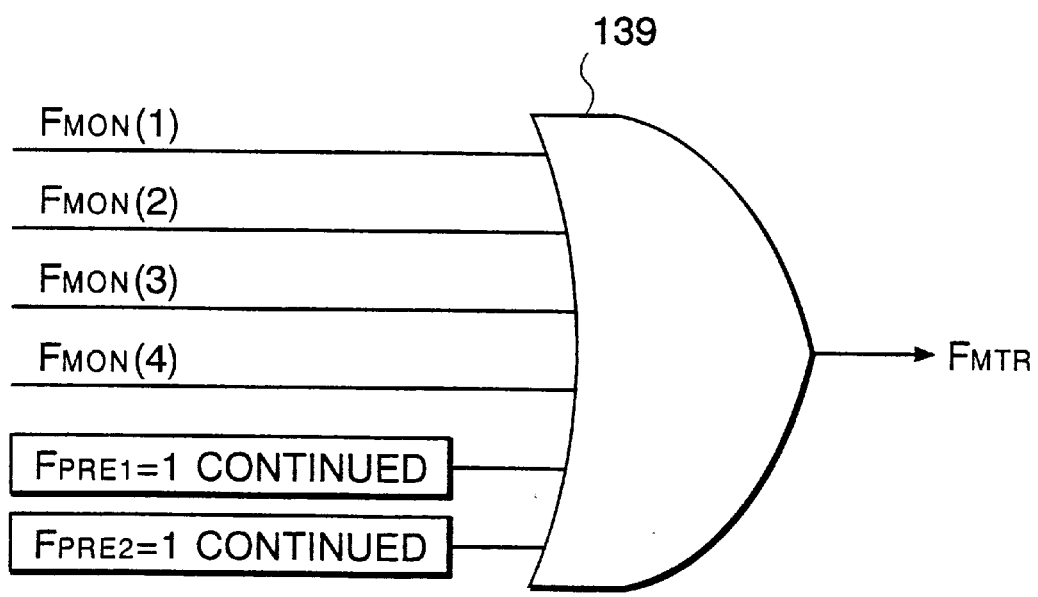
FIG. 39 is a block diagram showing part of the actuation determination section shown in FIG. 23.

The actuation determination section 124 further includes a determination circuit shown in FIG. 39. This determination section has an OR circuit 139, which outputs 1 as the value of the actuation flag $F_{MTR}$ for actuating the motor, if any of the values of request flags $F_{MON}(i)$ is set at 1 or if at least either of the pre-pressurization flags $F_{PRE1}$ and $F_{PRE2}$ is set at 1 and this state is continued.

Cooperation Control for ABS

When the actuation mode $M_y(i)$, pulse width $W_y(i)$, actuation flags $F_{VD1}$ and $F_{VD2}$, and flag $F_{MTR}$ are set in the above-described yaw moment control block 78 (see FIG. 3), the cooperation control for ABS is carried out. This cooperation control is shown in the determination block 78a in FIG. 3 and Step S7 in FIG. 4.

In the cooperation control, when the brake pressure control using ABS is started, the actuation modes $M_{ABS}(i)$ and pulse widths $W_{ABS}(i)$ are set to execute yaw moment control in cooperation with the brake pressure control by ABS. A detailed description of the setting of the actuation modes $M_{ABS}(i)$ and the pulse widths $W_{ABS}(i)$ will be omitted. It is to be noted, however, that the control by the aforesaid inhibitory section 90 (FIG. 29) and forced-modification 111 (FIG. 35) is also applied to the actuation modes $M_{ABS}(i)$ and pulse widths $W_{ABS}(i)$.

Figure 40:
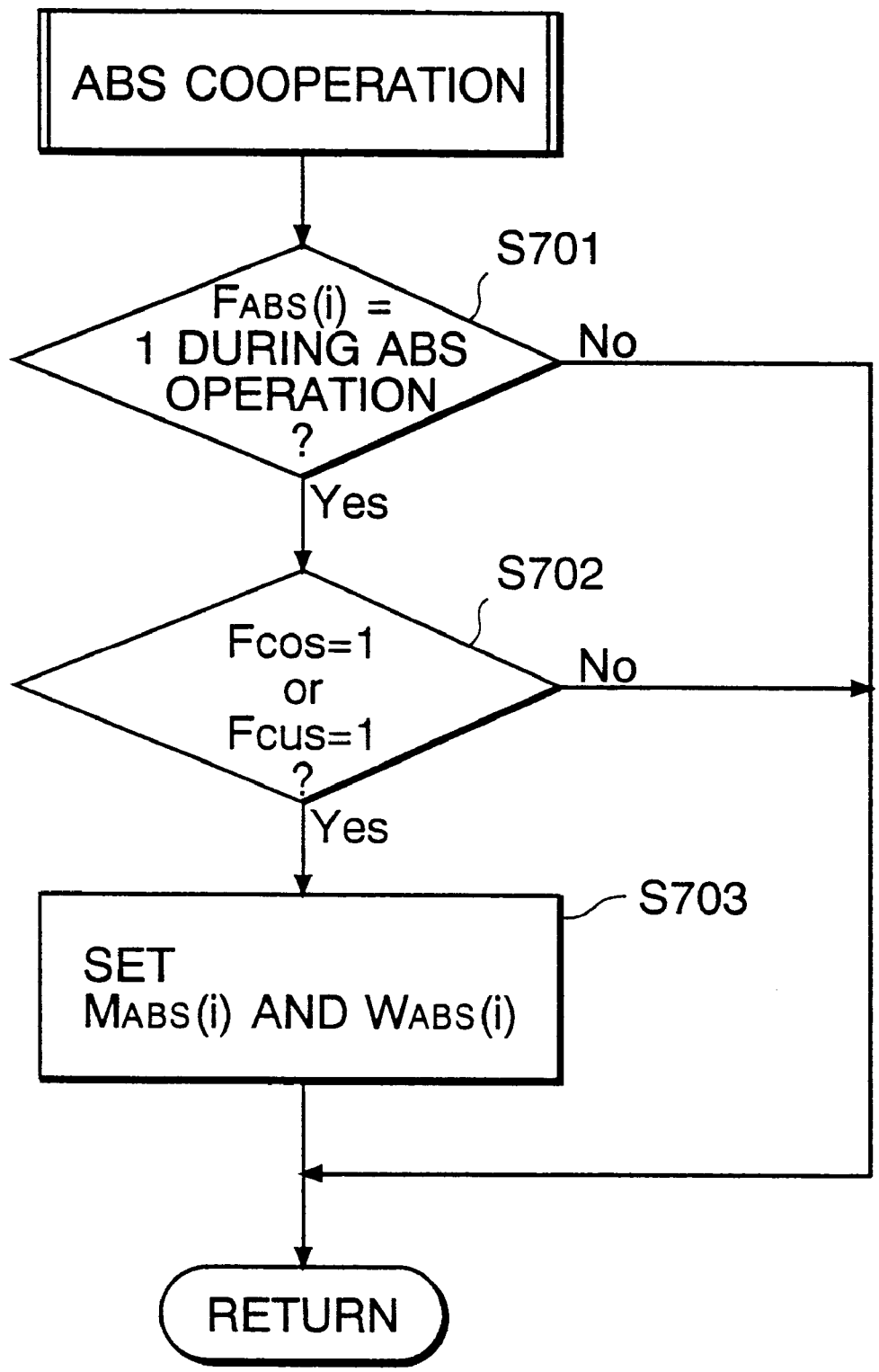
FIG. 40 is a flowchart showing an ABS cooperation routine.

The following is a description of a function of the cooperation control. In the case where the vehicle requires the turning moment or restoration moment while it is turning under the brake pressure control using ABS, the actuation modes $M_{ABS}(i)$ and pulse widths $W_{ABS}(i)$ are set in accordance with the cooperation routine shown in FIG. 40 in the cooperation control.

First, in Step S701, it is determined whether or not the vehicle is under the brake pressure control using ABS. A flag $F_{ABS}(i)$ is used for the determination, and is set at 1 when the corresponding wheel becomes the target wheel to be subjected to brake pressure control using ABS. That is, the flag $F_{ABS}(i)$ is set at 1 in accordance with the trend of the slip factor of the wheel in an ABS control routine (not shown).

If the result of determination in Step S701 is Yes, it is determined whether or not the control execution flag $F_{CUS}$ or $F_{COS}$ is 1 (Step S702). If the result of determination in Step S702 is Yes, that is, if it is concluded that the vehicle requires the turning moment or restoration moment while it is turning, the actuation modes $M_{ABS}(i)$ and pulse widths $W_{ABS}(i)$ are set in the following manner in Step S703, the next stage.

In the case where the yaw moment control is executed for a diagonal pair of wheels:

(1) To give the turning moment to the vehicle, the actuation mode $M_{ABS}(i)$ of the inside front wheel FW, viewed in the vehicle turn direction, is set in the reduce-pressure mode, and the pulse width $W_{ABS}(i)$ is set at the same value as the pulse width of the outside front wheel FW.

(2) To give the restoration moment to the vehicle, the actuation mode $M_{ABS}(i)$ of the outside rear wheel RW is set in the reduce-pressure mode, and the pulse width $W_{ABS}(i)$ is set at the same value as the pulse width of the inside rear wheel.

The yaw moment control can be executed to a parallel pair of wheels on the front or rear side, as well as to the diagonal pair. In executing the yaw moment control on the basis of the difference in braking force between left- and right-hand wheels, the restoration moment is given to the vehicle by setting the actuation mode $M_{ABS}(i)$ of the outside wheel and the actuation mode $M_{ABS}(i)$ of the inside wheel in the intensify-pressure mode and the reduce-pressure mode, respectively. On the other hand, the turning moment is given to the vehicle by setting the actuation mode $M_{ABS}(i)$ of the outside wheel and the actuation mode $M_{ABS}(i)$ of the inside wheel in the reduce-pressure mode and the intensify-pressure mode, respectively.

When the yaw moment control is executed for the left- and right-hand rear wheels, a front wheel can be added as the target wheel to be controlled. That is, to further give the turning moment to the vehicle, the actuation mode $M_{ABS}(i)$ of the outside front wheel is set in the reduce-pressure mode, and the pulse width $W_{ABS}(i)$ is set at the same value as the pulse width of the outside rear wheel.

Even when the yaw moment control is executed for the left- and right-hand side wheels, a rear wheel can be added as the target wheel to be controlled. In this case, to further give the restoration moment to the vehicle, the actuation mode $M_{ABS}(i)$. of the inside rear wheel is set in the reduce-pressure mode, and the pulse width $W_{ABS}(i)$ is set at the same value as the pulse width of the inside front wheel.

Selection of Valve Control Signal

Figure 41:
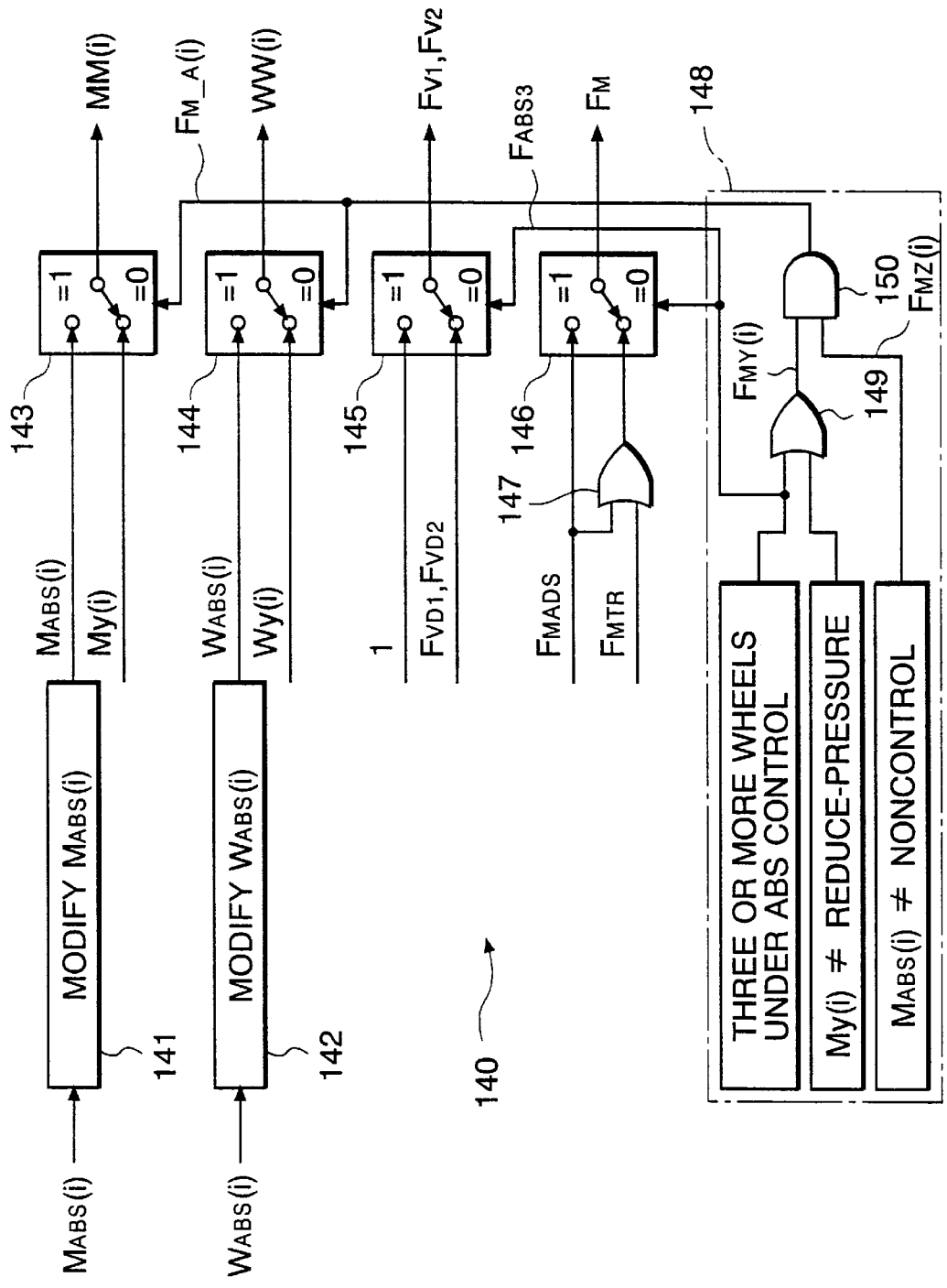
FIG. 41 is a block diagram showing the details of a selecting section shown in FIG. 3.

After the aforesaid cooperation routine (Step S7 in FIG. 4) has been executed, in the next Step S8, that is, in the selecting circuit 140 shown in FIG. 41, a valve control signal selection routine is executed. FIG. 41 also shows sections 141 and 142 for carrying out the routine of FIG. 40.

The selecting circuit 140 is provided with four switches 143, 144, 145 and 146. The switch 143 is supplied with the actuation mode $M_{ABS}(i)$ outputted from the section 141 and the actuation mode $M_y(i)$ set during the aforesaid yaw moment control. The switch 144 is supplied with the pulse width $W_{ABS}(i)$ outputted from the section 142 and the pulse width $W_y(i)$ set during the yaw moment control. The switch 145 is supplied with the actuation flags $F_{VD1}$ and $F_{VD2}$ set during the yaw moment control, and a value of 0 for resetting these flags $F_{VD1}$ and $F_{VD2}$. The switch 146 is supplied with the actuation flag $F_{MTR}$, set during the yaw moment control, through an OR circuit 147, and also with an actuation flag $F_{MABS}$. The actuation flag $F_{MABS}$ is also supplied to the OR circuit 147. The actuation flag $F_{MABS}$ is set at 1 when the brake pressure control using ABS is started.

The switches 143 to 146 are shifted in accordance with he values of flags delivered from a determination section 148. The determination section 148 includes an OR circuit 149. When the brake pressure control using ABS is executed for three or more wheels, or when the actuation mode $M_y(i)$ for the yaw moment control is not the reduce-pressure mode, among flags $F_{MY}(i)$ delivered from the OR circuit 149, the flag $F_{MY}(i)$ corresponding to the wheel in the reduce-pressure mode is set at 1. The flag $F_{MY}(i)$ is supplied to an AND circuit 150. When the brake pressure control using ABS is executed for three or more wheels, the switches 145 and 146 are supplied with a flag $F_{ABS3}$ whose value is set at 1.

The AND circuit, 150 is supplied with a flag $F_{MZ}(i)$ as well as the flag $F_{MY}(i)$. The flag $F_{MZ}(i)$ corresponding to the wheel number i not in the noncontrol mode, among the actuation modes $M_{ABS}(i)$ for the cooperation control, is set at 1. A flag $F_{M\_A}(i)$ is delivered from the AND circuit 150, and supplied to the switches 143 and 144. Among the flags $F_{M\_A}(i)$, the flag $F_{M\_A}(i)$ corresponding to the wheel number i for which both the flags $F_{MY}(i)$ and $F_{MZ}(i)$ are set at 1 is set at 1. That is, the flag $F_{M\_A}(i)$ corresponding to the wheel number 1 in the reduce-pressure mode is set at 1.

When the brake pressure control using ABS is being actuated for three or more wheels of the vehicle, the flag $F_{ABS3}$ supplied from the determination section 148 to the switches 145 and 146 is set at 1. Therefore, the switches 145 and 146 are shifted from the positions shown in FIG. 41. In this case, actuation flags $F_{V1}$ and $F_{V2}$ delivered from the switch 145 are both set at 1, and the switch 146 outputs the actuation flag $F_{MABS}$ as an actuation flag $F_M$. On the other hand, when the flag $F_{ABS3}$ is reset at 0, the switch 145 outputs the actuation flags $F_{VD1}$ and $F_{VD2}$ as $F_{V1}$ and $F_{V2}$, respectively, and the switch 146 outputs the actuation flag $F_{MTR}$ as $F_M$. Since the actuation flag $F_{MABS}$ is supplied to the switch 146 through the OR circuit 147, the actuation flag $F_M$ delivered from the switch 146 is set at 1 when either of the actuation flags $F_{MABS}$ and $F_{MTR}$ is set at 1 without respect to the shifting of the switch 146.

If input conditions of the AND circuit 150 are met, the switch 143 outputs one of the actuation modes $M_{ABS}(i)$ and $M_y(i)$ as the actuation mode MM(i) in accordance with the value of flag $F_{M\_A}(i)$ delivered from the AND circuit 150 to the switches 143 and 144 and according to the wheel number i. Also, the switch 144 outputs one of the pulse widths $W_{ABS}(i)$ and $W_y(i)$ as the pulse width WW(i).

Initial setting for Drive Signal

When the actuation mode MM(i) and the pulse width WW(i) are delivered from the valve control signal selecting circuit 140, they are supplied to the drive signal initial setting section 151 in FIG. 3 (Step S9 in FIG. 4). In this section 151, the actuation mode MM(i) and the pulse width WW(i) are set as an actual actuation mode $M_{EXE}(i)$ and an actual pulse width $W_{EXE}(i)$, respectively, and initial values are given to the actual actuation mode $M_{EXE}(i)$ and the actual pulse width $W_{EXE}(i)$, individually.

Figure 42:
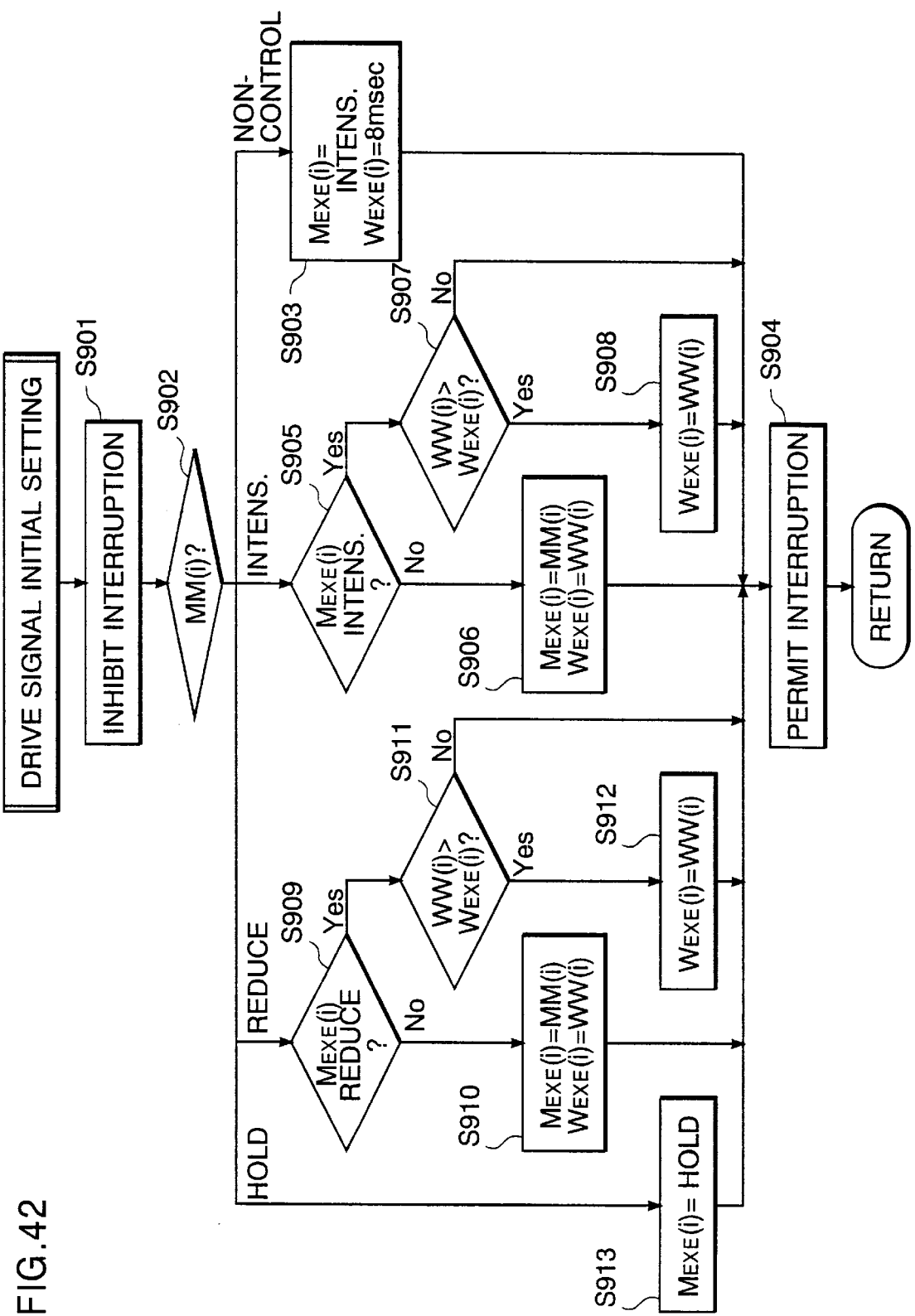
FIG. 42 is a flowchart showing a drive signal initial setting routine.

Step S9 is shown in detail in FIG. 42. As seen from FIG. 42, after an interruption inhibiting process is first executed (Step S901), the actuation mode MM(i) is discriminated (Step S902).

If the result of discrimination in Step S902 indicates the noncontrol mode, the intensify-pressure mode is established as the actual actuation mode $M_{EXE}(i)$, and the control period T (=8 msec) for the main routine is set as the actual pulse width $W_{EXE}(i)$ (Step S903). After an interruption permitting process is executed (Step S904), the routine concerned is finished.

If the result of discrimination in Step S902 indicates the intensify-pressure mode, it is determined whether or not he actual actuation mode $M_{EXE}(i)$ is the intensify-pressure mode (Step S905). Since the actual actuation mode $M_{EXE}(i)$ is not established at this point of time, the result of this determination is No. In this case, the actuation mode MM(i) or intensify-pressure mode is established as the actual actuation mode $M_{EXE}(i)$, and the pulse width WW(i) is set as the actual pulse width $W_{EXE}(i)$ (Step S906). Thereafter, the routine concerned is terminated after the execution of Step S904.

If it is concluded in Step S902 that the intensify-pressure mode is maintained when routine in the next cycle is executed repeatedly, the result of determination in Step S905 is Yes. In this case, it is determined whether or not the pulse width WW(i) is larger than the actual pulse width $W_{EXE}(i)$ (Step S907). Since the main routine is executed with every control period T, the pulse width WW(i) is newly set with every control period T. As mentioned later, however, the actual pulse width $W_{EXE}(i)$ decreases as the inlet or outlet valve 12 or 13 is actually actuated. If it is concluded in Step S907 that the newly set pulse width WW(i) is longer than the remaining actual pulse width $W_{EXE}(i)$ at the present point of time, therefore, a new pulse width WW(i) is set as the actual pulse width $W_{EXE}(i)$ (Step S908). If the result of determination in Step S907 is No, however, the remaining actual pulse width $W_{EXE}(i)$ is maintained without resetting the new pulse width WW(i) as the actual pulse width $W_{EXE}(i)$.

If the result of discrimination in Step S902 indicates the reduce-pressure mode, on the other hand, Steps S909 to S912 are executed, whereupon the actual actuation mode $M_{EXE}(i)$ and the actual pulse width $W_{EXE}(i)$ are set in the same manner as in the case of the intensify-pressure mode.

If the result of discrimination in Step S902 indicates the hold mode, moreover, the hold mode is established as the actual actuation mode $M_{EXE}(i)$ (Step S913).

Drive Signal Outputting

When the actual actuation mode $M_{EXE}(i)$ and the actual pulse width $W_{EXE}(i)$ are set in the manner described above, they are delivered from the drive signal initial setting section 151 to the valve actuating section 152, as shown in FIG. 3, and Step S10 (FIG. 4) is executed.

In Step S10, drive signals for driving the cutoff valves 19 and 20 and the motor 18 are also outputted in accordance with the actuation flags $F_{V1}$ and $F_{V2}$ and the flag $F_M$ set in the foregoing control signal selection routine, as well as the actual actuation mode $M_{EXE}(i)$ and the actual pulse width $W_{EXE}(i)$.

A drive signal for closing the cutoff valve 19 is outputted if the actuation flag $F_{V1}$ is set at 1, while a drive signal for closing the cutoff valve 20 is outputted if the actuation flag $F_{V2}$ is set at 1. If the actuation flags $F_{V1}$ and $F_{V2}$ are reset at 0, in contrast with this, the cutoff valves 19 and 20 are kept open. In the case where the motor actuation flag $F_M$ is set at 1, on the other hand, a drive signal for actuating the motor 18 is outputted. In the case where the actuation flag $F_M$ is reset at 0, the motor 18 is not actuated.

Actuation of Inlet and Outlet Valves

Figure 43:
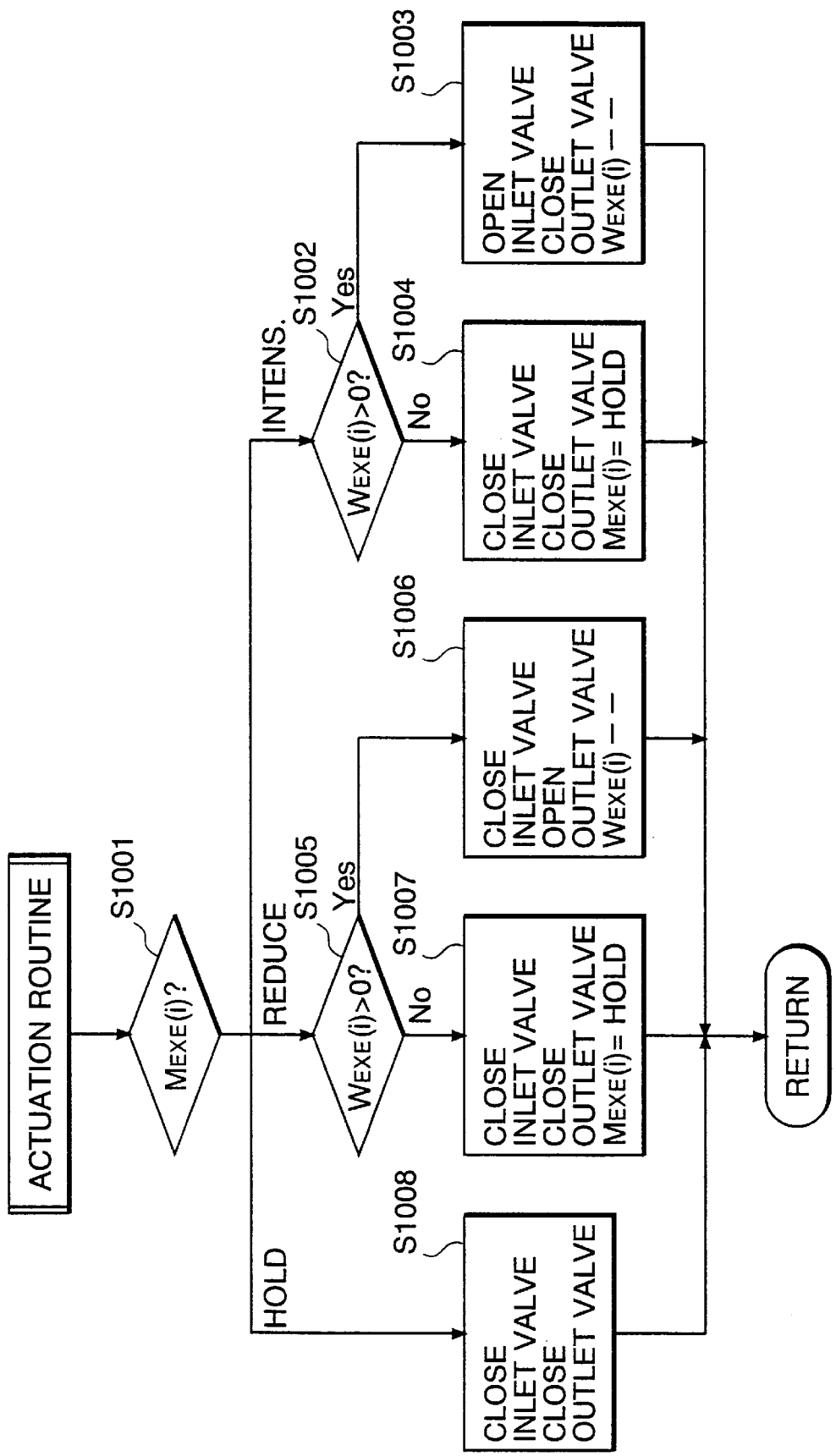
FIG. 43 is a flowchart showing an actuation routines.

When the valve actuating section 152 is supplied with the actual actuation mode $M_{EXE}(i)$ and the actual pulse width $W_{EXE}(i)$, it actuates the inlet and outlet valves 12 and 13 according to an actuation routine shown in FIG. 43. The actuation routine of FIG. 43 is executed independently of the main routine of FIG. 4, and its execution period is 1 msec.

In the actuation routine, the actual actuation mode $M_{EXE}(i)$ is first discriminated (Step S1001). If the actual actuation mode $M_{EXE}(i)$ is the intensify-pressure mode, in this discrimination, it is determined whether or not the actual pulse width $W_{EXE}(i)$ is greater than 0 (Step S1002). If the result of determination in Step S1002 is Yes, the inlet and outlet valves 12 and 13 for the corresponding wheel are opened and closed, respectively, and the actual pulse width $W_{EXE}(i)$ is reduced by a margin for its execution period (Step S1003). When Step S1003 is carried out, therefore, the brake pressure for the wheel concerned is increased if the motor 18 is already actuated and if the corresponding cutoff valve 19 or 20 is closed.

If the result of determination in Step S1002 becomes No in the condition that the actuation routine is executed repeatedly with the intensify-pressure mode maintained as the actual actuation mode $M_{EXE}(i)$, both the inlet and outlet valves 12 and 13 for the wheel concerned are closed, and the pressure-hold mode is established as the actual actuation mode $M_{EXE}(i)$ (Step S1004).

If it is concluded in Step S1001 that the actual actuation mode $M_{EXE}(i)$ is the reduce-pressure mode, it is determined whether or not the actual pulse width $W_{EXE}(i)$ is greater than 0 (Step S1005). If the result of determination in Step S1005 is Yes, the inlet and outlet valves 12 and 13 for the wheel concerned are closed and opened, respectively, and the actual pulse width $W_{EXE}(i)$ is reduced by a margin for its execution period (Step S1006). When Step S1006 is carried out, therefore, the brake pressure for the wheel concerned is decreased.

If the result of determination in Step S1005 becomes No in the condition that the actuation routine is executed repeatedly with the reduce-pressure mode maintained as the actual actuation mode $M_{EXE}(i)$, both the inlet and outlet valves 12 and 13 for the wheel concerned are closed, and the pressure-hold mode is established as the actual actuation mode $M_{EXE}(i)$ (Step S1007).

If it is concluded in Step S1001 that the actual actuation mode $M_{EXE}(i)$ is the pressure-hold mode, both the inlet and outlet valves 12 and 13 for the wheel concerned are closed (Step S1008).

Figure 44:
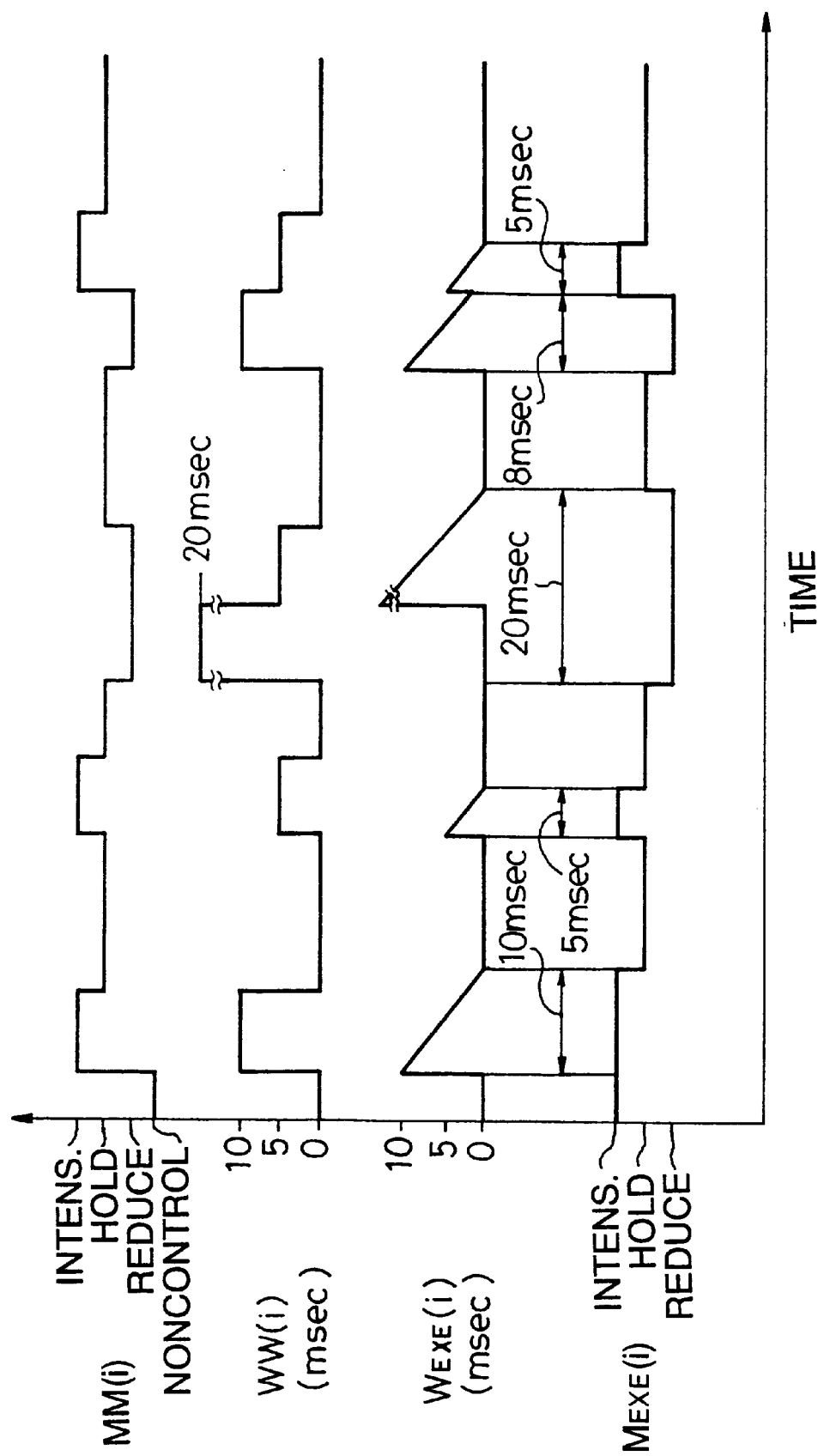
FIG. 44 is a time chart showing the relations between actuation mode, pulse width, actual actuation mode, and actual pulse width.

Referring to FIG. 44, the relations between the actuation mode MM(i), pulse width WW(i), actual actuation mode $M_{EXE}(i)$, and actual pulse width $W_{EXE}(i)$ are shown using a time chart.

Effectiveness of Yaw Moment Control

When yaw moment control is applied to diagonal wheels of the vehicle:

Let it be supposed that the vehicle is running and the main routine of FIG. 4 is being executed repeatedly. It can be concluded that the vehicle is turning clockwise if the turn flag $F_d$, which indicates a turn of the vehicle in accordance with the steering wheel angle θ and the yaw rate γ, is set at 1 in Step S3 or in a turn determination routine shown in FIG. 8.

(a) Clockwise turn of vehicle

Thereafter, the required yaw moment $\gamma_d$ is obtained by executing Step S5 in the main routine. When the yaw moment control is executed in Step S6, the control mode selection routine is executed on condition that the on-off flag $F_{ymc}$(see the determination circuit in FIG. 24) is set at 1. That is, the control mode M(i) for each wheel is set in accordance with the selection routine shown in FIG. 26.

Since the vehicle is supposed to be turning clockwise, the result of determination in Step S601, in the selection routine of FIG. 26, is Yes, whereupon Step S602 and the subsequent steps are carried out.

(b) Clockwise turn of understeer-prone vehicle

If the result of determination in Step S602 is Yes, that is, if the vehicle has a marked tendency to understeer with the control execution flag $F_{CUS}$ being set at 1, the reduce-pressure and intensify-pressure modes are established as the control modes M(1) and M(4) for the front-left (outside front) wheel $FW_L$ and the rear-right (inside rear) wheel $RW_R$, respectively, and the noncontrol mode as the control modes M(2) and M(3) for the other two wheels (see Table 1 and Step S603).

Based on the control mode M(i) and the required yaw moment $\gamma_d$ for each wheel, thereafter, the actuation mode $M_{PLS}(1)$ is set (see the setting routine in FIG. 28), and the pulse width $W_{PLS}(i)$ for each wheel is set. The actuation mode $M_{PLS}(i)$ and the pulse width $W_{PLS}(i)$ are changed into the actuation mode $M_y(i)$ and the pulse width $W_y(i)$, respectively, by the inhibitory section 90 and the forced-modification section 111 in FIG. 23.

In the determination circuit 125 (FIG. 36) of the actuation determination section 124 of FIG. 23 (the determination circuits shown in FIGS. 36 to 39), on the other hand, of the request flag $F_{MON}(i)$ outputted through the AND circuit 126 and the OR circuit 128 and of the request flag $F_{COV}(i)$ outputted through the flip-flop 130, the request flag corresponding to the target wheel to be controlled is set at 1 in the case where the brake flag $F_b$ is set at 1 (brakes on) and the actuation mode $M_y(i)$ is the intensify-pressure mode.

Specifically, when the vehicle is turning clockwise showing a marked tendency to understeer with the brake pedal 3 depressed, of the outputs from the determination circuit 125 (FIG. 36), $F_{MON}(4)$ and $F_{COV}(4)$ are set at 1. Also, the actuation flag $F_{VD1}$ outputted from the determination circuit 131 (OR circuit 132) in FIG. 37 is set at 1. Further, the actuation flag $F_{MTR}$ outputted from the determination circuit in FIG. 39, that is, the OR circuit 139 is set at 1. Since the request flags $F_{COV}(2)$ and $F_{COV}(3)$ are both reset at 0, the actuation flag $F_{VD2}$ outputted from the determination circuit 135 (OR circuit 136) in FIG. 38 is reset at 0.

Thereafter, therefore, the actuation flags $F_{V1}$ and $F_M$ outputted from the control signal selecting section 140 in FIG. 3 (switches 145 and 146 in FIG. 41) are set at 1, and the actuation flag $F_{V2}$ is reset at 0. These flags are supplied as drive signals to the cutoff valves 19 and 20 and the motor 18. Thus, the motor 18 is actuated in a state such that the cutoff valve 19, which is associated with the wheel brakes for the front-left and rear-right wheels $FW_L$ and $RW_R$, is closed, and the cutoff valve 20, which is associated with the wheel brakes for the front-right and rear-left wheels $FW_R$ and $RW_L$, is left open. As the motor 18 is driven in this manner, a pressurized fluid is discharged from the pumps 16 and 17.

When the brake pedal 3 is not depressed, that is, when the vehicle is not braked, the control modes M(1) and M(4) for the front-left and rear-right wheels $FW_L$ and $RW_R$, respectively, are not the noncontrol mode, so that the request flags $F_{MON}(1)$ and $F_{MON}(4)$ delivered from the OR circuit 128 of the determination circuit 125 are set at 1, and the request flags $F_{COV}(1)$ and $F_{COV}(4)$ delivered from the flip-flop 130 are set at 1. Also in this case, therefore, the actuation flag $F_{MTR}$ is set at 1, so that the motor 18 or the pumps 16 and 17 are actuated. Only the actuation flag $F_{VD1}$ is set at 1, whereupon only the cutoff valve 19 is closed.

If the actuation mode $M_{PLS}(i)$ is processed in the forced-modification section 111 (FIG. 23) when the vehicle is not braked, however, the flag $F_{HLD}(i)$ delivered from the hold determination section 118 (FIG. 35) is set at 1. In this case, the switch 112 is shifted, and the actuation mode $M_{PLS}(i)$ is compulsorily changed from the noncontrol mode to the hold mode.

When the vehicle is not braked ($F_b=0$), the correction value $C_{pi}$ of the required yaw moment $\gamma_d$ to be computed (see FIG. 10) is set at 1.5, which is greater than 1.0 for the case where the vehicle is braked, so that the required yaw moment $\gamma_d$ is increased. This increase shortens the pulse period $T_{PLS}$ during which the actuation mode $M_{PLS}$ (i) or $M_y(i)$ is executed. As a result, the pressure increase or decrease is executed positively if the actuation mode $M_y(i)$ is the intensify-pressure or reduce-pressure mode.

Thereafter, the actuation mode $M_y(i)$ and the pulse width $W_y(i)$ are set as the actuation mode MM(i) and the pulse width WW(i), respectively, by the control signal selecting section 140, as mentioned before, and moreover, the actual actuation mode $M_{EXE}(i)$ and the actual pulse width $W_{EXE}(i)$ are set in accordance with the set values. As a result, the corresponding inlet and outlet valves 12 and 13 of the vehicle are actuated in accordance with the actual actuation mode $M_{EXE}(i)$ and the actual pulse width $W_{EXE}(i)$ (see the actuation routine of FIG. 43).

Specifically, the actual actuation mode $M_{EXE}(1)$ for the front-left wheel $FW_L$ is the reduce-pressure mode when the vehicle is braked as it makes a clockwise turn showing a marked tendency to understeer. Accordingly, the inlet and outlet valves 12 and 13 for the front-left wheel $FW_L$ are closed and opened, respectively (Step S1006 in FIG. 43), so that the brake pressure for the front-left wheel $FW_L$ is decreased. On the other hand, the actual actuation mode $M_{EXE}(4)$ for the rear-right wheel $RW_R$ is the intensify-pressure mode, so that the inlet and outlet valves 12 and 13 for the rear-right wheel $RW_R$ are opened and closed, respectively (Step S1003 in FIG. 43). At this point of time, the cutoff valve 19 is closed, and the pumps 16 and 17 are actuated by the motor 18, as mentioned before. Accordingly, the pressure in the branch brake line 8 (see FIG. 1), which leads to the wheel brake for the rear-right wheel $RW_R$, is already raised independently of the master cylinder pressure, so that the wheel brake for the rear-right wheel $RW_R$ is supplied with the pressurized fluid from the brake branch line 8 through the inlet valve 12. Thus, the brake pressure for the rear-right wheel $RW_R$ is increased.

Figure 45:
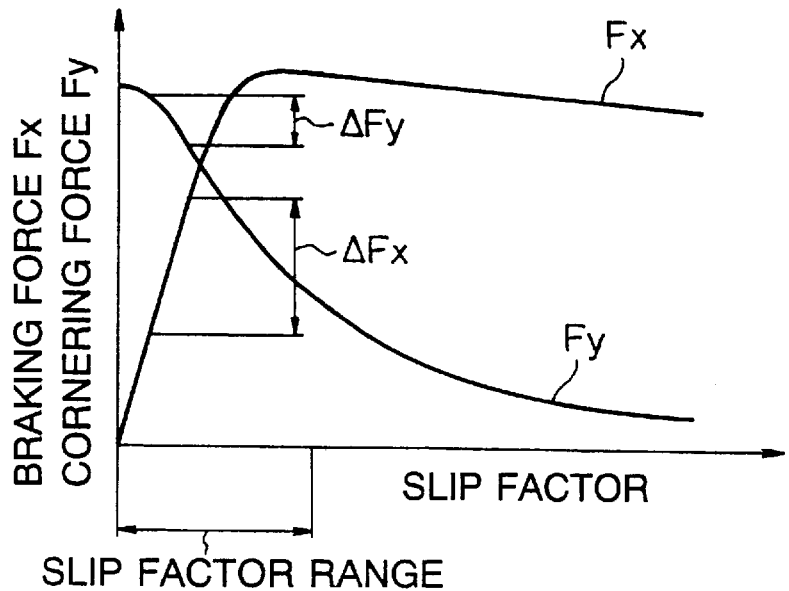
FIG. 45 is a graph showing braking force and cornering force characteristics versus the slip factor of wheel.

FIG. 45 shows braking force/cornering force characteristics of the vehicle compared with the slip factor. If the brake pressure or braking force $F_x$ for a wheel decreases, as seen from FIG. 45, the slip factor also decreases within a slip factor range for the case where the vehicle is in normal running conditions. If the cornering force $F_y$ increases, in contrast with this, the slip factor also increases. On the other hand, the decrease and increase of the slip factor cause the cornering force to increase and decrease, respectively.

Figure 46:
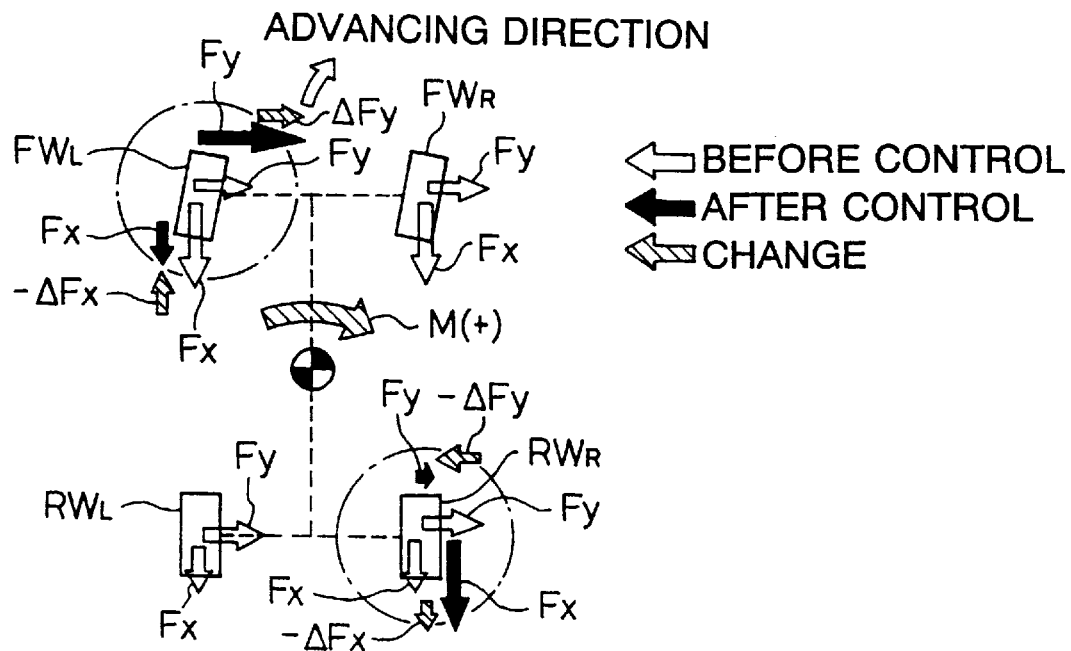
FIG. 46 is a view for illustrating the execution result of yaw moment control when the right turn of vehicle is in an understeer state during the braking of vehicle.

If the braking force $F_x$ for the front-left wheel $FW_L$ is decreased from the magnitude indicated by white arrow to the magnitude indicated by black arrow, as shown in FIG. 46, therefore, the cornering force $F_y$ for the front-left wheel $FW_L$ increases from the magnitude indicated by white arrow to the magnitude indicated by black arrow. If the braking force $F_x$ for the rear-right wheel $RW_R$ is increased as indicated by white and black arrows, on the other hand, the cornering force $F_y$ decreases from the magnitude indicated by white arrow to the magnitude indicated by black arrow. Thus, the smaller the braking force $F_x$ on the front-left wheel $FW_L$, the more heavily the cornering force $F_y$ acts on the wheel. The greater the braking force $F_x$ on the rear-right wheel $RW_R$, on the other hand, the smaller the cornering force $F_y$ on the wheel is. As a result, the vehicle is subjected to the turning moment M(+) in the direction of its turn. In FIG. 46, hatched arrows indicate variations $\pm\Delta F_x$ and $\pm\Delta F_y$ of the braking force $F_x$ and the cornering force $F_y$.

The inlet and outlet valves 12 and 13 for the front-left and rear-right wheels $FW_L$ and $RW_R$, a diagonal pair of vehicle wheels, are opened and closed in accordance with the actual actuation mode $M_{EXE}(i)$ and the actual pulse width $W_{EXE}(i)$ set on the basis of the required yaw moment $\gamma_d$, so that the turning moment M(+) can be applied properly to the vehicle. Thus, the tendency of the vehicle to understeer can be removed, so that the vehicle can be prevented from drifting out.

The increase amount and decrease amount of the brake pressure for the front-left wheel $FW_L$ and the rear-right wheel $RW_R$ are computed on the basis of the same required yaw moment $\gamma_d$, so that the absolute values of the increase amount and decrease amount are the same. Therefore, even if the brake pressures for the front-left and rear-right wheels $FW_L$ and $RW_R$ are decreased and increased, respectively, the braking force on the entire wheels does not change, and the braking feeling of the vehicle is not deteriorated.

Since the required yaw moment $\gamma_d$ is computed in consideration of the operating conditions and manipulations of the vehicle (see Steps S504 and S505 in the computation routine of FIG. 11), fine yaw moment control can be effected according to the way the vehicle turns by increasing or decreasing the wheel brakes on the diagonal pair of wheels in accordance with the required yaw moment $\gamma_d$.

The required yaw moment $\gamma_d$ is computed on the basis of the yaw rate deviation $\Delta\gamma$ and the derivative $\Delta\gamma_s$ of yaw rate deviation, so that the computed required yaw moment $\gamma_d$ exactly indicates the turning behavior of the vehicle at that time. If the braking force on a diagonal pair of vehicle wheels is increased or decreased according to the required yaw moment $\gamma_d$, therefore, unstable turning behavior of the vehicle is eliminated immediately, so that the vehicle can turn very stably.

In computing the required yaw moment $\gamma_d$, open control according to the lateral $G_Y$ or the vehicle speed V and steering angle $\delta$ may be used, without using the aforesaid yaw rate feedback control.

Since the turn direction of the vehicle is determined based on the output of the yaw rate sensor 30, the turn direction of the vehicle can be determined with a high accuracy, so the yaw moment control is carried out accurately.

When the aforesaid yaw moment control is being executed and the vehicle is being braked, the actual actuation modes $M_{EXE}(i)$ for the inlet and outlet valves 12 and 13 for the front-right wheel $FW_R$ and rear-left wheel $RW_L$ are set to the noncontrol mode. Therefore, the cutoff valve 20, which is associated with the wheel brakes for the front-right wheel $FW_R$ and rear-left wheel $RW_L$, is left open. Therefore, the wheel brakes for the front-right wheel $FW_R$ and rear-left wheel $RW_L$ can be subjected to the master cylinder pressure, so that the brake pressures of the front-right wheel $FW_R$ and rear-left wheel $RW_L$ are controlled by the operation of the brake pedal 3 performed by the driver. Consequently, the brake pressures of the front-right wheel $FW_R$ and rear-left wheel $RW_L$ are controlled by the driver's intention, and a fail-safe function for yaw moment control is fully assured.

When the vehicle is not braked during the execution of yaw moment control, the actual actuation modes $M_{EXE}(i)$ for the inlet and outlet valves 12 and 13 for the front-right wheel $FW_R$ and rear-left wheel $RW_L$ are compulsorily changed into the hold mode, so that both the inlet and outlet valves 12 and 13 are closed (see Step S1008 in the actuation routine of FIG. 43).

Even if the pump 16 Is actuated by the motor 18 at this time, therefore, the discharge pressure of the pump 16 is not applied to the wheel brakes for the front-right wheel $FW_R$ and rear-left wheel $RW_L$ via the inlet valve 12, so that the brake pressures of the front-right wheel $FW_R$ and rear-left wheel $RW_L$ are not increased undesirably.

Since the brake of the front-left wheel $FW_L$ is not raised when the vehicle is not braked, it is substantially impossible, in this case, to reduce the brake pressure of the front-left wheel $FW_L$, so that the turning moment M(+) to be given to the vehicle runs short. When the vehicle is not braked, however, as mentioned before, the required yaw moment $\gamma_d$ is increased in computing it, so that the brake pressure of the rear-right wheel $RW_R$ is increased more greatly than when the vehicle Is braked. Therefore, as the slip factor of the rear-right wheel $RW_R$ increases, the cornering force $F_y$ of the rear-right wheel $RW_R$ decreases further. As a result, the cornering force of the front-left wheel $FW_L$ acts relatively strongly, so that the turning moment M(+) as equal as when the vehicle Is braked is given to the vehicle.

When the driver depresses the brake pedal 3 at a speed higher than a predetermined pedal stroke speed (50 mm/s) during the execution of yaw moment control, the augmented depression flag $F_{PP}$ of the brake pedal 3 is set at 1 as explained regarding the setting routine of FIG. 6. In this case, in the forced-modification section 111 (see FIG. 23), the switch 116 (see FIG. 35) is shifted from the shown position, so that the actuation modes $M_y(i)$ of all wheels are compulsorily changed into the noncontrol mode.

Therefore, the request flags $F_{MON}$ and $F_{COV}(i)$ are both reset to 0 (see FIG. 36), and the actuation flags $F_{VD1}$ ($F_{V1}$) and $F_{MTR}$ ($F_M$) are also reset to 0 (see FIGS. 37 and 38). Thereupon, the cutoff valve 19 is opened, and on the other hand, the actuation of the motor 18 is stopped. The inlet valve 12 for each wheel is opened, and the outlet valve 13 therefor is closed. In this case, in the actuation routine of FIG. 43, Step S1003 on the intensify-pressure mode is executed, so that the wheel brake for each wheel can be supplied with the master cylinder pressure. Therefore, the brake pressure in accordance with the depression of the brake pedal 3 by the driver is raised in the wheel brake for each wheel, by which the braking force on the vehicle can be assured fully.

Clockwise turn of oversteer-prone vehicle:

If the results of determination in Steps S602 and S604 in the selection routine of FIG. 26 are No and Yes, respectively, the vehicle has a marked tendency to oversteer. In this situation, unlike the aforesaid case of the tendency to understeer, the intensify-pressure and reduce-pressure modes are established as the control mode M(1) and M(4) for the front-left wheel $FW_L$ and the rear-right wheel $RW_R$, respectively (see Table 1 and Step S605).

Figure 47:
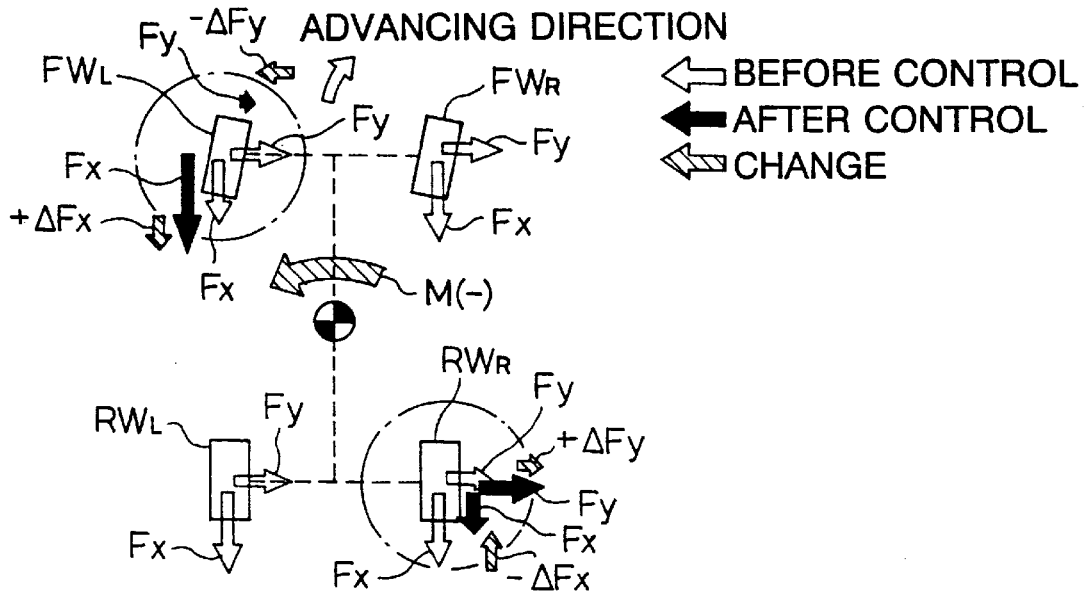
FIG. 47 is a view for illustrating the execution result of yaw moment control when the right turn of vehicle is in an oversteer state during the braking of vehicle.

When the vehicle is braked, the braking force $F_x$ and cornering force $F_y$ for the front-left wheel $FW_L$ increases and decreases, respectively, while the forces $F_x$ and $F_y$ for the rear-right wheel $RW_R$ decreases and increases, respectively, as shown in FIG. 47. In this case, therefore, the restoration moment M(−) is given to the vehicle. The restoration moment M(−) serves to remove the tendency of the vehicle to oversteer, thereby reliably preventing spinning of the vehicle attributable to a tack-in.

In the situation in which the clockwise turn of the vehicle is oversteer-prone, when the vehicle is not braked, or when the augmented depression flag $F_{PP}$ is set at 1, the operation similar to that in the case of understeer is achieved.

When clockwise turn of vehicle is not understeer and not oversteer:

In the selection routine of FIG. 26, when the results of determination in Steps S602 and S604 are both No, and when the turning tendency of the vehicle is neither understeer nor oversteer, the pressure-hold mode is established as the control modes M(1) and M(4) for the front-left wheel $FW_L$ and the rear-right wheel $RW_R$, respectively (see Table 1 and Step S606).

In this case, the inlet and outlet valves 12 and 13 for the front-left wheel $FW_L$ and the rear-right wheel $RW_R$ are both closed. Therefore, the brake pressures of the front-left wheel $FW_L$ and the rear-right wheel $RW_R$ are kept. Neither the turning moment M(+) nor the restoration moment M(−) is given to the vehicle.

Counterclockwise turn of vehicle:

When the aforementioned turn flag $F_d$ and on-off flag $F_{ymc}$ are set at 1, the yaw moment control is executed for a counterclockwise turn of the vehicle. In this case as well, the turning moment M(+) is given to the vehicle in the case where the vehicle has a marked tendency to understeer, as in the aforementioned case of the clockwise turn. If the vehicle has a marked tendency to oversteer, on the other hand, the brake pressures of the front-right and rear-left wheels $FW_R$ and the wheel $RW_L$ are controlled in order to give the restoration moment M(−). Thus, even when the vehicle is turned counterclockwise, the same effect for the case of the clockwise turn can be obtained (see Table 1 and Steps S607 to S611 in FIG. 26 and actuation routine of FIG. 43).

Figure 48:
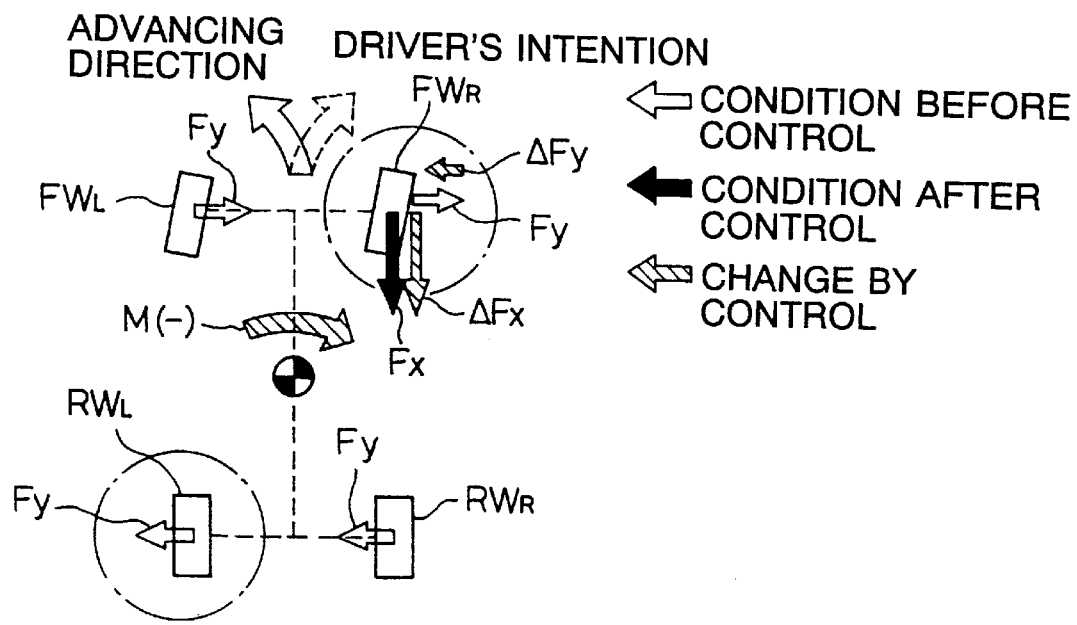
FIG. 48 is a view for illustrating the execution result of yaw moment control when the vehicle is not braked and the vehicle is in a countersteer state.

Countersteer of vehicle:

In a countersteer state in which the advancing direction of vehicle (solid line arrow mark: yawing direction) differs from the advancing direction intended by the driver (broken line arrow mark: operating direction of steering wheel), as shown in FIG. 48, when the vehicle is not braked, that is, in the case where the driver himself also requires the restoration moment of the vehicle, the values of turn direction flags $F_{dy}$ and $F_s$ do not agree with each other in the turn determination routine of FIG. 8. In this case, a countersteer flag $F_{cs}$ showing the countersteer state is set at 1 (Step S314).

In such a situation, even if the turn direction of the vehicle is determined based on the output of the yaw rate sensor 30, it is concluded that the turn direction of the vehicle is counterclockwise, and the control execution flag $F_{cos}$ is set at 1 (see Table 1 and selection routine of FIG. 26). In this case, the braking force on the front-right wheel $FW_R$, which is the outside wheel viewed in the vehicle turn direction, is increased. Therefore, the restoration moment M(−) is given to the vehicle, so that the vehicle can be turned stably. Since the vehicle is not braked, the reduction in pressure for the rear-left wheel $RW_L$ is not executed.

However, when the vehicle turns while being braked, and further the vehicle is in the critical braking condition such that the brake pressure using ABS is applied, since the slip factor of the front-right wheel $FW_R$ is already high, even if the brake pressure of the front-right wheel $FW_R$ is increased, that is, even if the slip factor of the front-right wheel $FW_R$ is increased, the cornering force of the front-right wheel $FW_R$ is further decreased (see FIG. 45). As a result, an effective restoration moment cannot be given to the vehicle.

Figure 49:
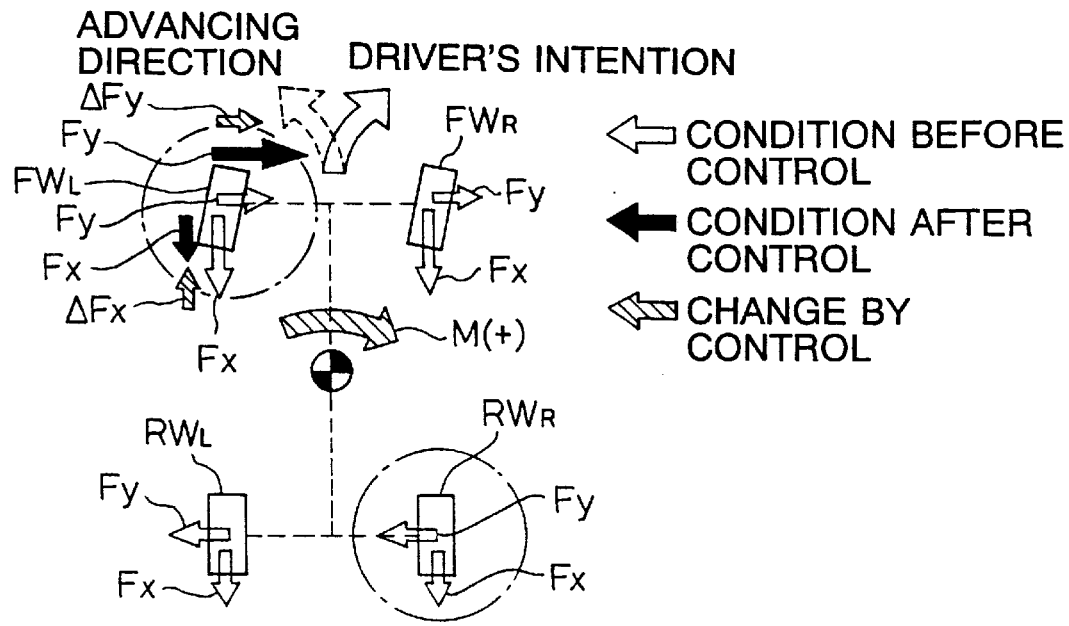
FIG. 49 is a view for illustrating the execution result of yaw moment control when the vehicle is in a critical braking state and countersteer state.

When the front wheel is in the critical braking region, therefore, the result of determination in Step S309 is Yes as shown in the turn determination routine of FIG. 8, and the turn flag $F_d$ is set based on the steering wheel angle θ (Step S311). In this case, it is concluded that even if the advancing direction (broken line arrow mark) of the vehicle is left, the turn direction is right (solid line arrow mark) as shown in FIG. 49.

When the turn direction of vehicle is determined in this manner, the positive and negative of the yaw rate deviation Δγ are reversed as explained in the description of the computation of the required yaw moment $γ_d$, so that the control execution flag $F_{cus}$, not the execution control flag $F_{cos}$, is set at 1. In this case, therefore, as seen from Table 1 and the selection routine of FIG. 26, the brake pressure of the front-left wheel $FW_L$ is decreased, and the slip factor thereof is decreased. Accordingly, as shown in FIG. 49, the cornering force $F_y$ of the front-left wheel $FW_L$ increases, so that the turning moment M(+) is given to the vehicle. This turning moment M(+) acts in the same direction as that of the restoration moment M(−) in FIG. 48, so that the vehicle is effectively subjected to the restoration moment as a consequence, by which the turn of vehicle can be stabilized.

According to Table 1 and the selection routine of FIG. 26, when the brake pressure of the front-left wheel $FW_L$ is decreased, the brake pressure of the rear-right wheel $RW_R$ should be increased at the same time. However, in the countersteer state, the increase in brake pressure at the rear-right wheel $RW_R$ is inhibited. That is, when the aforementioned countersteer flag $F_{cs}$ is set at 1, in the setting section 94 in FIG. 29 (inhibitory section 90), the input conditions of the AND circuit 97 are met, so that the inhibiting flag $F_{K1}(i)$ supplied from the AND circuit 97 to the switch 91 is set at 1, by which the switch 91 is shifted. In this case, therefore, the pulse width $W_{PLS}(4)$ of the rear-right wheel $RW_R$ in the intensify-pressure mode is compulsorily changed to 0. Accordingly, even if the brake pressure control using ABS is carried out, the pulse width $W_{PLS}(4)$ in the yaw moment control is outputted as a pulse width WW(4), and the brake pressure of the rear-right wheel $RW_R$ is not increased.

If the slip factor of the rear-right wheel $RW_R$ is increased by increasing the braking force thereof, the cornering force of the rear-right wheel $RW_R$ decreases. In this case, the increase in slip factor at the rear-right wheel $RW_R$ does not contribute at all to the addition of the turning moment M(+), or exerts an adverse influence on it. In this case, however, since the increase in brake pressure at the rear-right wheel $RW_R$ is inhibited, the apparatus does not suffer the above-mentioned disadvantage.

Excessive slip:

In the setting section 95 in FIG. 29 (inhibitory section 90), when the state in which all inputs of the AND circuit are on is reached, that is, when the slip factor $S_L(i)$ of a wheel in the intensify-pressure mode becomes higher than the allowable slip factor $S_{LMAX}(i)$, the inhibiting flag $F_{K2}(i)$ supplied from the AND circuit 98 to the switch 92 is set at 1, so that the switch 92 is shifted. As a result, the pulse width $W_{PLS}(i)$ is compulsorily changed to 0. Therefore, with the execution of the yaw moment control, the braking force on a wheel in the intensify-pressure mode is increased. Consequently, if the slip factor exceeds the allowable value, the braking force on the wheel in not increased further. Thereupon, an excessive slip does not occur on the wheel, and the brake pressure control using ABS is not carried out undesirably.

The allowable slip factor $S_{LMAX}(i)$ is set based on the required yaw moment $γ_d$ as shown in FIG. 32, so that in the state in which the required yaw moment $γ_d$ is large, and the vehicle strongly requires the yaw moment control, the inhibiting flag $F_{K2}(i)$ is less prone to be set at 1. Therefore, the increase in brake pressure is not inhibited undesirably at the wheel in the intensify-pressure mode, so that the yaw moment control can be executed effectively.

On the other hand, as the yaw moment control is executed, the brake pressure of the wheel is continuously controlled in the intensify-pressure mode, so that the brake pressure control using ABS is sometimes started on the wheel. In this case, the maximum value of the allowable slip factor $S_{LMAX}(i)$ is set at a slip factor of vehicle at the time when the brake pressure control using ABS is started, that is, the determination slip factor $S_{LST}(i)$ (or 95% of $S_{LST}(i)$), and the increase rate thereof is also set based on the new maximum value (see setting routine for inhibiting flag $F_{K2}(i)$ in FIG. 31). Therefore, the vehicle locking tendency is eliminated by ABS, and even if the vehicle control has been restored from ABS to yaw moment control, the intensify-pressure mode of vehicle is inhibited in the subsequent yaw moment control. Accordingly, the wheel does not reach the locking tendency again, or the control is not changed frequently between brake pressure control using ABS and yaw moment control.

Figure 50:
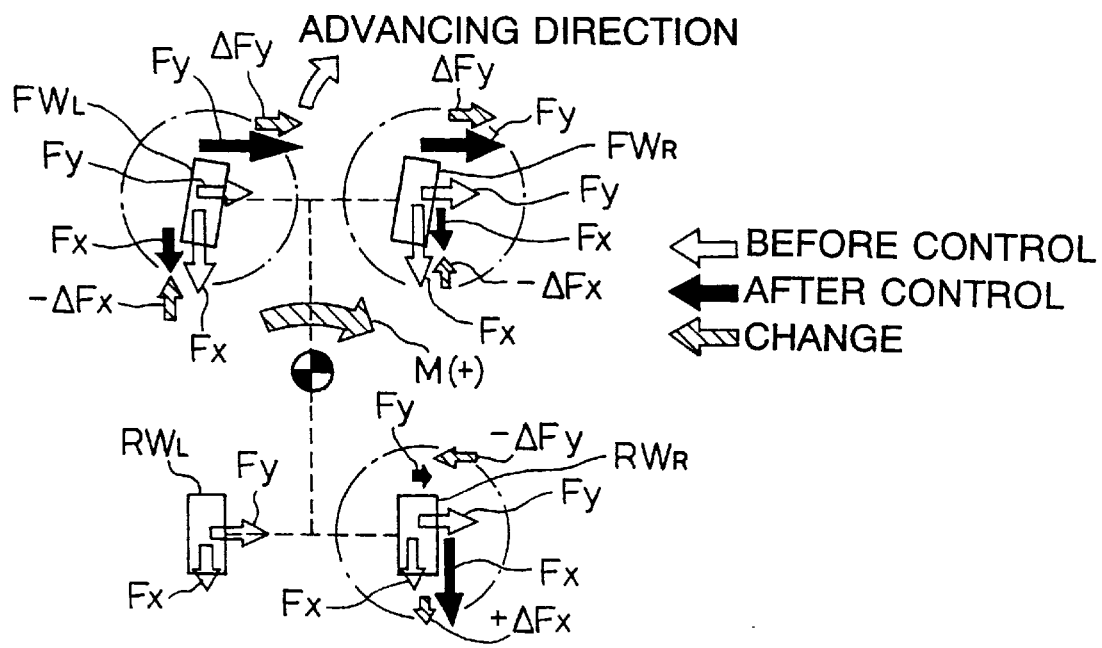
FIG. 50 is a view for illustrating the execution result of yaw moment control when brake pressure control is carried out by an ABS and when the right turn of vehicle is in an understeer state.

Cooperation with ABS:

It is assumed that when the ABS is operated and the brake pressure of each wheel is controlled based on the aforesaid actuation mode $M_{ABS}(i)$ and pulse width $W_{ABS}(i)$, the vehicle turns clockwise and the turn has an understeer tendency as shown in FIG. 50. In this case, in addition to two wheels subjected to control in the yaw moment control, that is, the front-left wheel $FW_L$ and rear-right wheel $RW_R$, the front-right wheel $FW_R$ is also subjected to control, and this front-right wheel $FW_R$ is controlled in the reduce-pressure mode.

When the brake pressure using ABS is carried out on the rear-right wheel $RW_R$, the increase in braking force $F_x$ at the rear-right wheel $RW_R$, that is, the decrease in cornering force $F_y$ cannot be expected. However, if the cornering force $F_y$ of the front-right wheel $FW_R$ increases with the decrease in the braking force thereof, the turning moment M(+) can fully be given to the vehicle mainly based on the difference in the cornering force $F_y$ between the front and rear of the vehicle.

Figure 51:
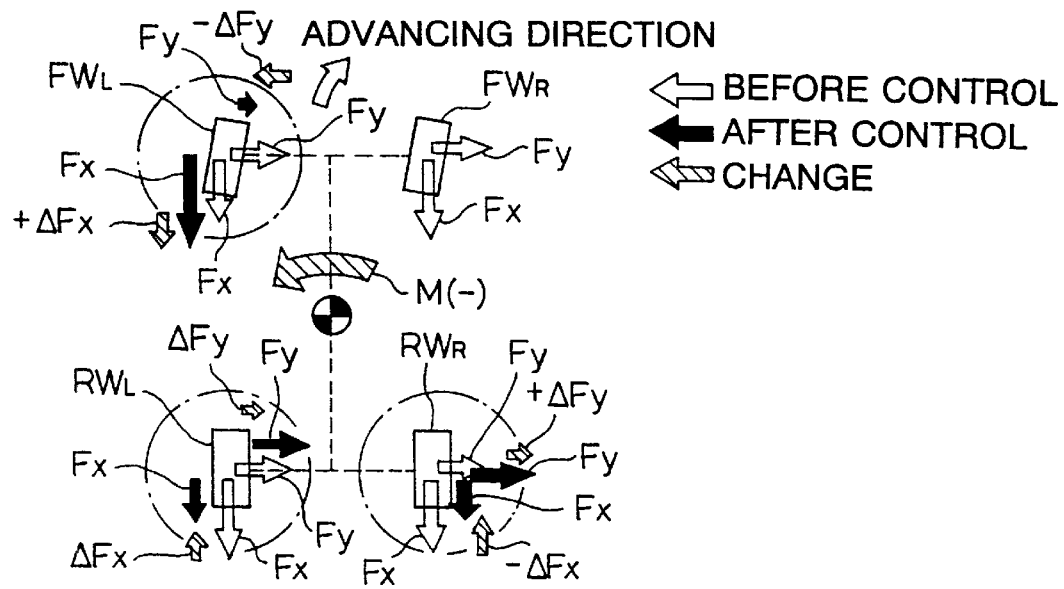
FIG. 51 is a view for illustrating the execution result of yaw moment control when brake pressure control is carried out by an ABS and when the right turn of vehicle is in an oversteer state.

When the vehicle turns clockwise and the turning tendency is oversteer as shown in FIG. 51, the rear-left wheel $RW_L$ is also controlled in addition to the front-left wheel $FW_L$ and the rear-right wheel $RW_R$, which are subjected to control in yaw moment control, and the rear-left wheel $RW_L$ is controlled in the reduce-pressure mode. In this case, even if the decrease in the cornering force $F_y$ at the front-left wheel $FW_L$ is not exhibited effectively by the brake pressure control using ABS, the restoration moment M(−) is fully given to the vehicle mainly based on the difference in cornering force $F_y$ before and after the vehicle, like the aforementioned case.

Figure 52:
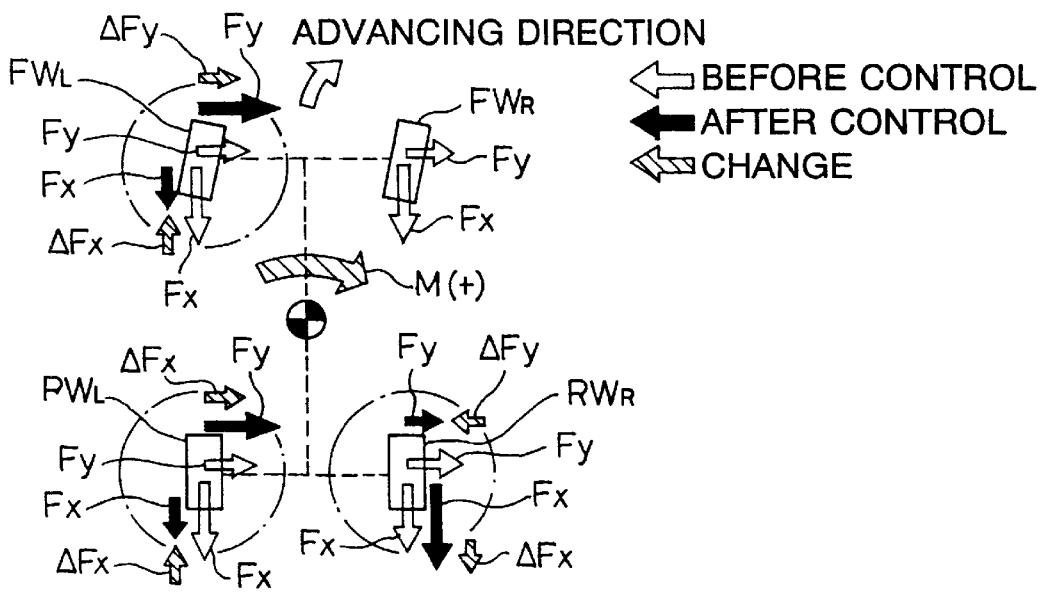
FIG. 52 is a view for illustrating the execution result of yaw moment control when brake pressure control is carried out by an ABS and when the right turn of vehicle is in an understeer state.
Figure 53:
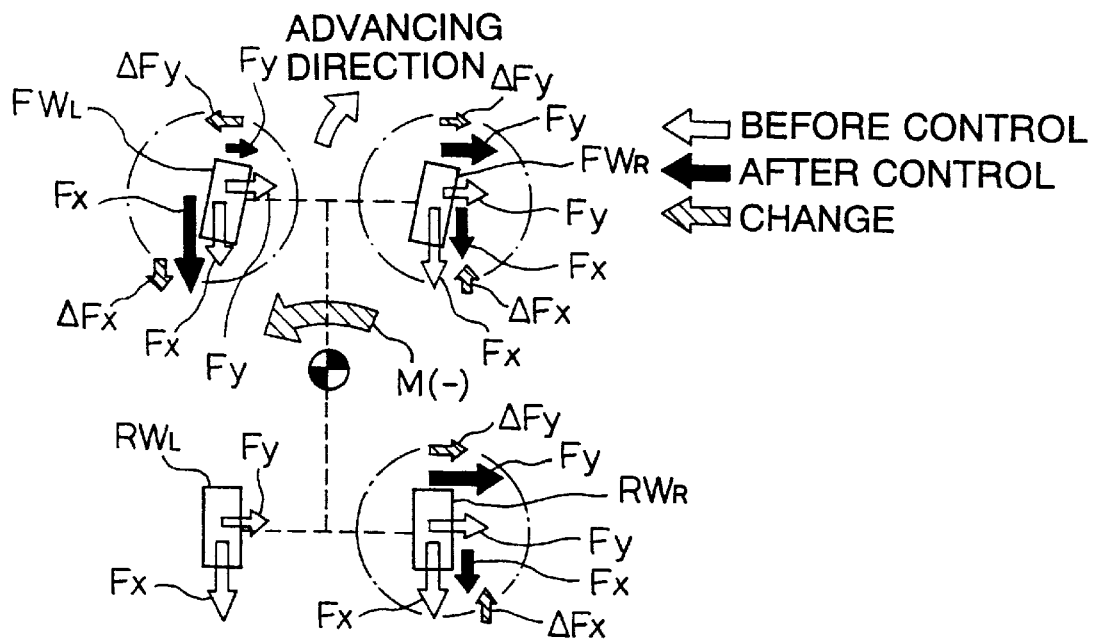
FIG. 53 is a view for illustrating the execution result of yaw moment control when brake pressure control is carried out by an ABS and when the right turn of vehicle is in an oversteer state.

Further, in the case where the rear-right and left wheels are set to be the target wheels to be controlled in yaw moment control, when the vehicle turns clockwise and the turning tendency is understeer as shown in FIG. 52, the front-left wheel $FW_L$ is also added as the target wheel to be controlled, and the front-left wheel $FW_L$ is controlled in the reduce-pressure mode. Consequently, even if the increase in the braking force on the rear-right wheel $RW_R$ does not work due to the brake pressure control using ABS, the cornering force $F_y$ of the front-left wheel $FW_L$ is increased accordingly, so that the turning moment M(+) can be given to the vehicle. When the vehicle turns clockwise and the turning tendency is oversteer as shown in FIG. 53, the rear-right wheel $RW_R$ is added as the target wheel to be controlled, and the rear-right wheel $RW_R$ is controlled in the reduce-pressure mode. In this case, even if the increase in braking pressure at the front-left wheel $FW_L$ cannot be achieved, the cornering force $F_y$ of the rear-right wheel $RW_R$ is increased accordingly, so that the restoration moment M(−) can be given to the vehicle.

What is claimed is:

1. A turn control apparatus for a vehicle, comprising:

determining means for determining a turning condition of the vehicle, said determining means including turn detecting means for detecting a turn of the vehicle and outputting a turn signal indicative of a turn direction of the vehicle and braking detecting means for detecting the braking of the vehicle and outputting a braking signal indicative of a braking condition of the vehicle;

selecting means for selecting the outside front and inside rear wheels viewed in the vehicle turn direction as two target wheels to be controlled based on said turn signal from said turn detecting means; and first braking control means for increasing the braking force on one of said target wheels to be controlled and decreasing the braking force on the other of said target wheels to be controlled in accordance with said vehicle turning condition determined by said determining means when the braking detecting means indicates the vehicle is being braked, wherein said first braking control means sets the increase amount of braking force on said one of the target wheel to be controlled and the decrease amount of braking force on said other of the target wheel to be controlled at the same absolute value.

2. A turn control apparatus for a vehicle according to claim 1, wherein said braking detecting means includes augmented depression detecting means for detecting augmented depression of vehicle brake pedal and outputting an augmented depression signal, and said first braking control means includes a hydraulic pressure control valves which are changed over from the noncontrol position to control the brake pressure of the corresponding wheel brake by cooperating with the wheel brake for each wheel, respectively, and returning means for returning all of said hydraulic pressure control valves to the noncontrol position when said augmented depression signal is received.

3. A turn control apparatus for a vehicle according to claim 1, wherein said determining means further includes vehicle condition detecting means for detecting a vehicle operating condition and manipulation condition, and said first braking control means includes setting means for setting the increase amount and decrease amount of braking force on said target wheels to be controlled based on the detected vehicle operating condition and manipulation condition.

4. A turn control apparatus for a vehicle according to claim 3, wherein said vehicle condition detecting means includes means for setting a target yaw rate of the vehicle, and said setting means of said first braking control means sets the increase amount and decrease amount of braking force on said target wheels to be controlled based on a yaw rate deviation between said target yaw rate and the actual yaw rate of the vehicle.

5. A turn control apparatus for a vehicle according to claim 4, wherein said setting means of said first braking control means sets the increase amount and decrease amount of braking force on said target wheels to be controlled based on said yaw rate deviation and the derivative of said yaw rate deviation.

6. A turn control apparatus for a vehicle according to claim 1, wherein said turn detecting means includes a yaw rate sensor for detecting a vehicle yaw rate and discriminating means for discriminating the vehicle turn direction based on the output of said yaw rate sensor.

7. A turn control apparatus for a vehicle according to claim 1, wherein said first braking control means includes a first brake line for supplying a brake pressure to wheel brakes for the front-left and rear-right wheels and a second brake line for supplying a brake pressure to wheel brakes for the front-right and rear-left wheels.

8. A turn control apparatus for a vehicle according to claim 1, wherein said turn control turn control apparatus further comprises second braking control means for increasing the braking force on one of said target wheels to be controlled in accordance with the vehicle turning condition determined by said determining means when the vehicle turns while being not braked.

9. A turn control apparatus for a vehicle according to claim 8, wherein said determining means further includes vehicle condition detecting means for detecting a vehicle operating condition and manipulation condition, and said first and second braking control means include computing means for computing a controlled variable to be given to the vehicle, during the turn of vehicle, based on the vehicle operating condition and manipulation condition detected by said vehicle condition detecting means, said computing means having a gain for computing said controlled variable, which gain is set so as to be larger when the vehicle is not braked than when the vehicle is braked, and setting means for setting the increase amount and decrease amount of braking force on said target wheels to be controlled based on the controlled variable from said computing means.

10. A turn control apparatus for a vehicle according to claim 1, wherein said first braking control means includes hydraulic pressure control valves for controlling a brake pressure of wheel brake for each wheel by cooperating with the corresponding wheel brake, respectively, a pump for supplying a pressurized fluid to the wheel brake for each wheel, and holding means for changing over said hydraulic pressure control valve to hold the brake pressure of wheel brake for the wheel other than said target wheels to be controlled.

11. A turn control apparatus for a vehicle, comprising:

determining means for determining a turning condition of the vehicle, said determining means including turn detecting means for detecting a turn of the vehicle and outputting a turn signal indicative of a turn direction of the vehicle and braking detecting means for detecting the braking of the vehicle and outputting a braking signal indicative of a braking condition of the vehicle;

selecting means for selecting the outside front and inside rear wheels viewed in the vehicle turn direction as two target wheels to be controlled based on said turn signal from said turn detecting means; and first braking control means for increasing the braking force on one of said target wheels to be controlled and decreasing the braking force on the other of said target wheels to be controlled in accordance with said vehicle turning condition determined by said determining means when the braking detecting means indicates the vehicle is being braked, wherein said braking detecting means includes augmented depression detecting means for detecting augmented depression of vehicle brake pedal and outputting an augmented depression signal, and said first braking control means includes hydraulic pressure control valves which are changed over from the noncontrol position to control the brake pressure of the corresponding wheel brake by cooperating with the wheel brake for each wheel, respectively, and returning means for returning all of said hydraulic pressure control valves to the noncontrol position when said augmented depression signal is received.

* * * * *